(12) United States Patent
Watanabe et al.

(10) Patent No.: US 6,658,208 B2
(45) Date of Patent: Dec. 2, 2003

(54) FOCAL-LENGTH ADJUSTING UNIT FOR PHOTOGRAPHING APPARATUSES

(75) Inventors: Yoji Watanabe, Fuchu (JP); Takeshi Nakane, Hachioji (JP); Kimihiko Nishioka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/961,396

(22) Filed: Sep. 25, 2001

(65) Prior Publication Data

US 2002/0102102 A1 Aug. 1, 2002

(30) Foreign Application Priority Data

Jan. 30, 2001 (JP) .......................................... 2001-022410

(51) Int. Cl.[7] .............................. G03B 3/00; G02B 17/00
(52) U.S. Cl. ........................................ 396/89; 359/726
(58) Field of Search ............................... 396/85, 89, 97, 396/129, 726

(56) References Cited

U.S. PATENT DOCUMENTS 6,437,925 B1 * 8/2002 Nishioka ................... 359/726
6,449,434 B1 * 9/2002 Fuss ............................ 396/97

FOREIGN PATENT DOCUMENTS

JP 10062609 * 3/1998 ............ G02B/3/14

OTHER PUBLICATIONS

Satoh, S., "Liquid Crystal Microlens", O Plus E, Oct. 1998, vol. 20, No. 10, pp. 1118–1124.*
Rad–Choudhury, "Handbook of Microlithography, Micromachining and Microfabrication, vol. 2: Micromachinign and Microfabrication," Pie Press, pp. 484–497.

Vdovin, G. "Quick Focusing of Imaging Optics Using Micromachined Adaptive Mirrors," Optics Communication, vol. 140, Aug. 1, 1997, pp. 187–190.

Wilson et al., "Transmission Variation Using Scattering/transparent Switching Films," Solar Energy Materials and Solar Cells, vol. 31, 1993, Eleesvier Science Publishers B.V., pp. 197–214.

Mukai et al., "Iwanami Sciene Library 8, Asteroids are coming," 1994, Iwanami Shoten, pp. 58–50.

* cited by examiner

*Primary Examiner*—Russell Adams
*Assistant Examiner*—Arthur A Smith
(74) *Attorney, Agent, or Firm*—Pillsbury & Winthrop LLP

(57) ABSTRACT

A focal-length adjusting unit for photographing apparatuses includes a distance-measuring means for detecting the amount of defocus to an object by using a light beam of the object passing through a photographing optical system; at least two optical elements located in an optical path for distance measurement, deflecting incident light from the object to introduce the light into an image sensor or a distance-measuring sensor; a variable optical-property element constituting at least one of the optical elements, capable of changing the deflection of light in accordance with an applied voltage or an applied current; and a voltage applying means or a current applying means for applying a voltage or a current in accordance with the distance-measuring output of the distance-measuring means. In this case, before a distance measurement is made by the distance-measuring means, the function of light deflection of the variable optical-property element is set to a predetermined value.

77 Claims, 39 Drawing Sheets

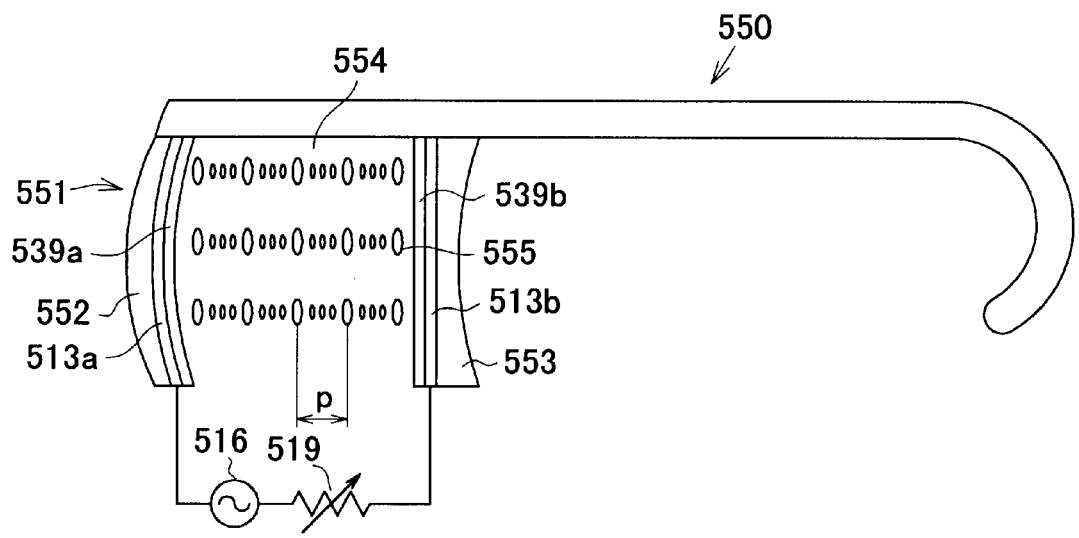
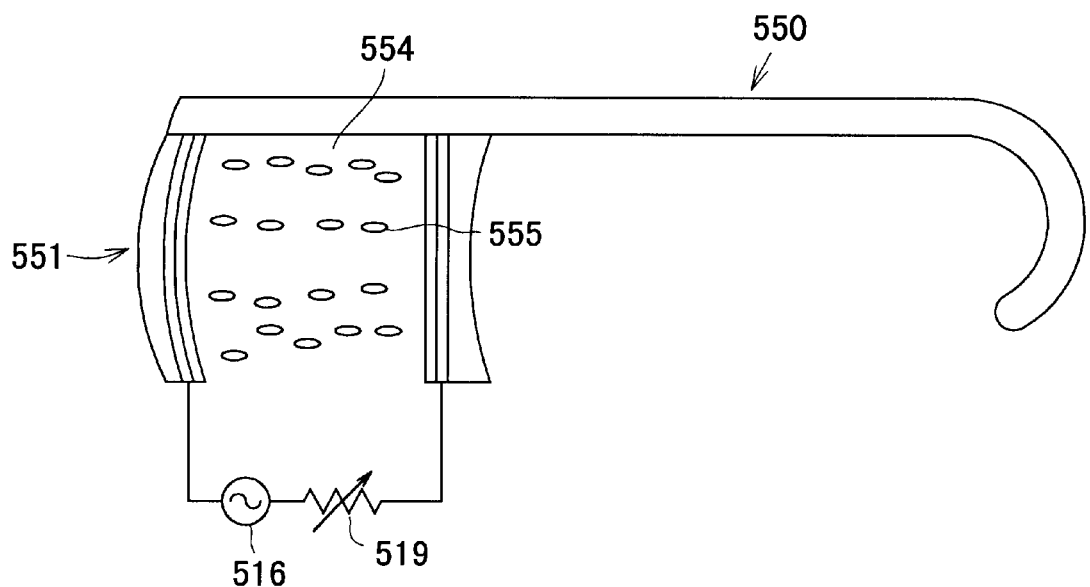

TRANS-TYPE

CIS-TYPE

FOCAL-LENGTH ADJUSTING UNIT FOR PHOTOGRAPHING APPARATUSES

BACKGROUND OF THE INVENTION

1. Field of the Invention

This invention relates to a focal-length adjusting unit for photographing apparatuses, provided with an optical system including a variable optical-property element such as a variable focal-length lens or a variable focal-length mirror.

2. Description of Related Art

A lens used for a focusing or variable magnification means of a photographing apparatus or for prevention of the shake thereof has been fabricated by grinding glass. The focal length of the lens cannot be changed by the lens itself, and thus, for example, for focusing, zoom, or a magnification change of a camera, it is necessary to provide a complicated mechanical structure for moving a lens unit along the optical axis.

FIG. 1 shows a camera provided with a conventional focal-length adjusting mechanism. This camera has a lens unit 51 constructed as a photographing lens system in a lens barrel, and includes a movable mirror 10, a pentagonal roof prism 5, an eyepiece 6, a sub-mirror 8, a distance-measuring sensor 9, and an image sensor 7 in a camera body.

The movable mirror 10 is mounted in the camera body to be rotatable around its one side 10a as an axis so that it is inserted in or removed out of the optical path connecting the photographing lens system 51 and the image sensor 7. When the movable mirror 10 is inserted in the optical path, a nearly middle area thereof through which light having passed through the photographing lens system 51 travels, constructed with a half mirror 10b, reflects half of light incident through the photographing lens system 51 to introduce it into the pentagonal roof prism 5 and transmits a remaining half to introduce it into the sub-mirror 8. A one side 8a of the sub-mirror 8 is mounted so that the sub-mirror 8 can be opened and closed with respect to the surface of the movable mirror 10. Specifically, the sub-mirror 8, as shown in FIG. 1, is opened when the movable mirror 10 lies on the optical path, so that it reflects light transmitted through the movable mirror 10 to introduce the light into the distance-measuring sensor 9. When the movable mirror 10 is removed out of the optical path, the sub-mirror 8 is folded and removed out of the optical path.

The pentagonal roof prism 5 is designed to internally reflect three times light reflected by the movable mirror 10 and to introduce an image of an object, as an erect image, into an observer's pupil through the eyepiece 6.

In such an arrangement, when focusing, zoom, or a magnification change is carried out, at least one part of a lens unit constituting the photographing lens system 51 is moved mechanically along the optical axis so that spacings between lenses of the lens unit are changed to thereby vary the focal length of the whole of photographing lens system 51.

Such a conventional camera, which uses a motor to move the lens unit for focal-length adjustment, increases power consumption and makes a loud noise when the focal-length adjustment is made. Furthermore, there are drawbacks that a response time is long and much time is required to move lenses. There are further drawbacks that even when the camera shake is prevented, as in the above description, lenses are moved mechanically by a motor or a solenoid, and thus power consumption is increased and a mechanical structure is complicated to raise cost.

SUMMARY OF THE INVENTION

It is, therefore, an object of the present invention to provide a focal-length adjusting unit for photographing apparatuses which is simple in structure, small in power consumption, and soft in sound, and which is capable of performing zoom, focal-length adjustment, and shake prevention at a short response time, without moving lenses mechanically.

In order to achieve this object, the focal-length adjusting unit for photographing apparatuses of the present invention includes a distance-measuring means for detecting the amount of defocus to an object by using a light beam of the object passing through a photographing optical system; at least two optical elements located in an optical path for distance measurement, deflecting incident light from the object to introduce the light into an image sensor or a distance-measuring sensor; a variable optical-property element constituting at least one of the optical elements, capable of changing the deflection of light in accordance with an applied voltage or an applied current; and a voltage applying means or a current applying means for applying a voltage or a current in accordance with the distance-measuring output of the distance-measuring means. In this case, before a distance measurement is made by the distance-measuring means, the function of light deflection of the variable optical-property element is set to a predetermined value.

Further, the present invention includes a distance-measuring means for detecting the amount of defocus to an object by using a light beam of the object passing through a photographing optical system; at least two mirrors located in an optical path for distance measurement, reflecting incident light from the object to introduce the light into an image sensor or a distance-measuring sensor; a deformable mirror constituting at least one of the mirrors, capable of changing the profile of a reflecting surface in accordance with an applied voltage or an applied current; and a voltage applying means or a current applying means for applying a voltage or a current in accordance with the distance-measuring output of the distance-measuring means. In this case, before a distance measurement is made by the distance-measuring means, the reflecting surface of the deformable mirror is set to a predetermined profile.

Still further, the present invention includes a distance-measuring means for detecting the amount of defocus to an object by using a light beam of the object passing through a photographing optical system; at least two optical elements located in an optical path for distance measurement, refracting incident light from the object to introduce the light into an image sensor or a distance-measuring sensor; a variable focal-length lens constituting at least one of the optical elements, capable of changing the refraction of light in accordance with an applied voltage or an applied current; and a voltage applying means or a current applying means for applying a voltage or a current in accordance with the distance-measuring output of the distance-measuring means. In this case, before a distance measurement is made by the distance-measuring means, the function of refraction of the variable focal-length lens is set to a predetermined value.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 37 is a view showing variable focal-length spectacles, each having a variable focal-length lens which uses a twisted nematic liquid crystal;

FIG. 38 is a view showing the orientation of liquid crystal molecules where a voltage applied to a twisted nematic liquid crystal layer in FIG. 37 is increased:

DETAILED DESCRIPTION OF THE PREFERRED EMBODIMENTS

In accordance with the drawings, the embodiments of the present invention will be described below.

Figure 1:
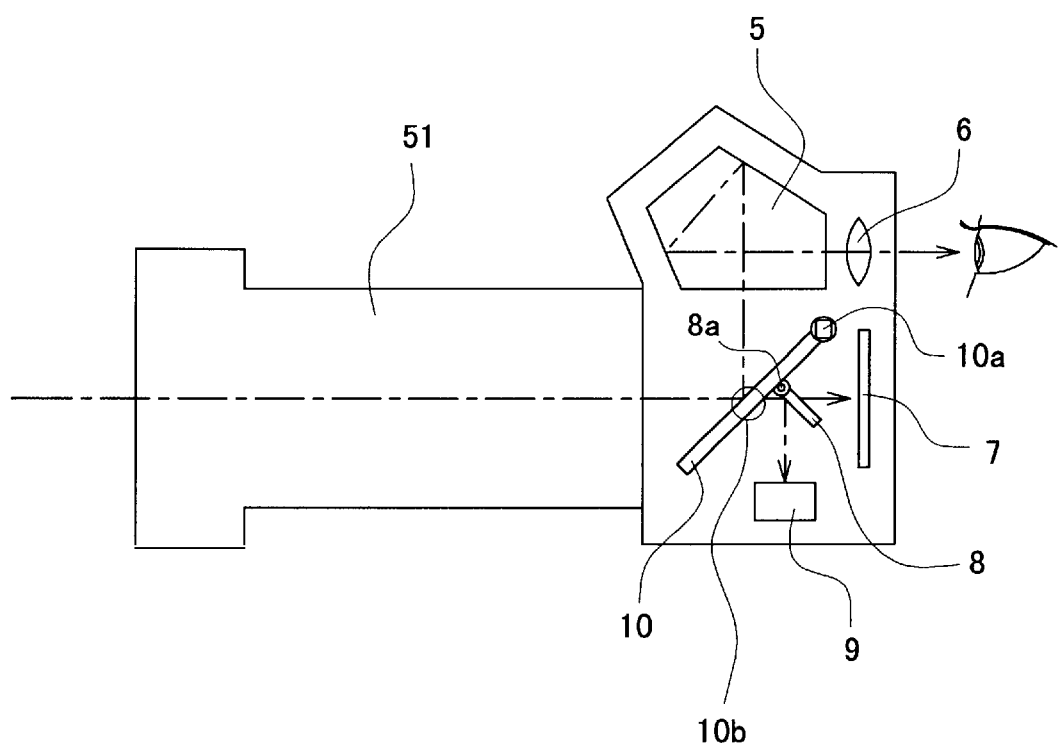
FIG. 1 is a view showing schematically a camera provided with a conventional focal-length adjusting mechanism.
Figure 2:
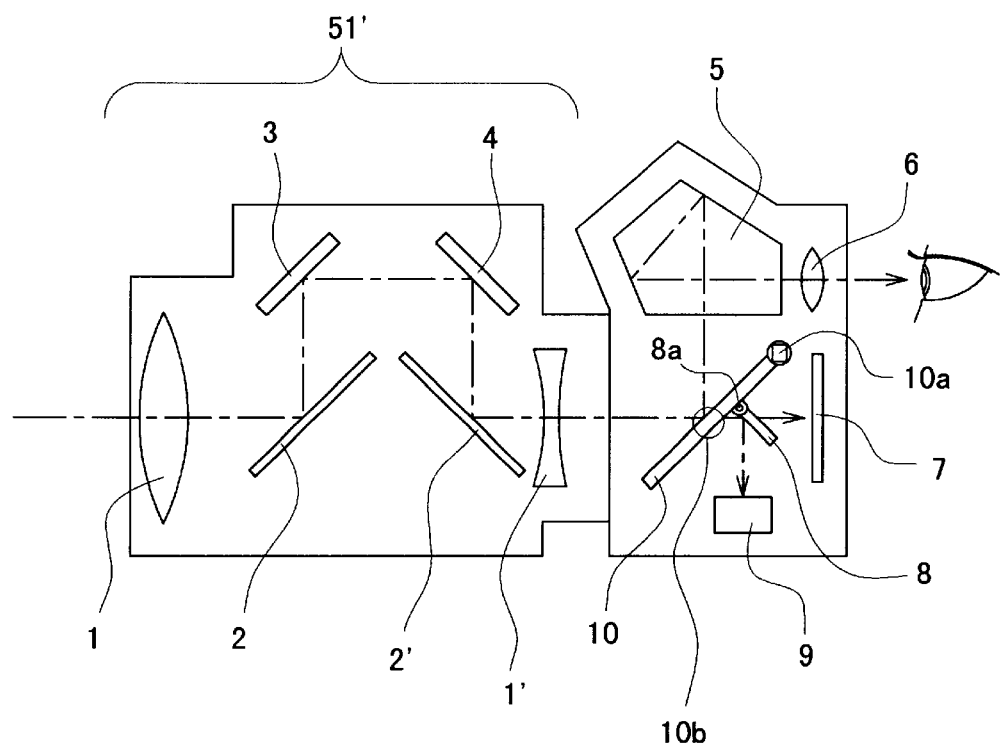
FIG. 2 is a sectional view showing one embodiment of the focal-length adjusting unit according to the present invention.

FIG. 2 shows one embodiment of the focal-length adjusting unit according to the present invention. The focal-length adjusting unit of this embodiment includes a photographing lens system 51' having a lens 1, mirrors 2 and 3, a deformable mirror 4, a mirror 2', and a lens 1' in the lens barrel, and the movable mirror 10, the pentagonal roof prism 5, the eyepiece 6, the sub-mirror 8, the distance-measuring sensor 9, and the image sensor 7 in the camera body.

The mirrors 2 and 3, the deformable mirror 4, and the mirror 2' are arranged on the optical path of the photographing lens system 51' so that light from an object, not shown, passing through the lens 1, after being reflected a plurality of times (four times in the figure), is introduced into the lens 1' and is conducted though the lens 1' to the image sensor 7 which is one of imaging media.

The movable mirror 10 is mounted in the camera body to be rotatable around its one side 10a as an axis so that it is inserted in or removed out of the optical path connecting the photographing lens system 51' and the image sensor 7. When the movable mirror 10 is inserted in the optical path, a nearly middle area thereof through which light having passed through the photographing lens system 51' travels, constructed with a half mirror 10b, reflects half of light incident through the photographing lens system 51' to introduce it into the pentagonal roof prism 5 and transmits a remaining half to introduce it into the sub-mirror 8. The one side 8a of the sub-mirror 8 is mounted so that the sub-mirror 8 can be opened and closed with respect to the surface of the movable mirror 10. Specifically, the sub-mirror 8, as shown in FIG. 2, is opened when the movable mirror 10 lies on the optical path, so that it reflects light transmitted through the movable mirror 10 to introduce the light into the distance-measuring sensor 9. When the movable mirror 10 is removed out of the optical path, the sub-mirror 8 is folded and removed out of the optical path.

The pentagonal roof prism 5 is designed to internally reflect three times light reflected by the movable mirror 10 and to introduce an image of an object, as an erect image, into an observer's pupil through the eyepiece 6.

In the embodiment, when the distance measurement is made before image formation, the movable mirror 10, as shown in FIG. 2, is inserted in the optical path connecting the photographing lens system 51' and the image sensor 7, and the sub-mirror 8 is opened. The light from the object, after passing through the lens 1, is reflected and deflected by the mirror 2, the mirror 3, the deformable mirror 4, and mirror 2' and then is incident through the lens 1' on the half mirror portion 10b of the movable mirror 10. Half of light incident on the half mirror portion is reflected, and is further reflected three times by the pentagonal roof prism 5 so that an erect image is formed to enter the observer's pupil through the eyepiece 6. A remaining half of light is transmitted through the half mirror portion 10b and, after being reflected by the sub-mirror 8, is imaged on the light-receiving surface of the distance-measuring sensor 9. In accordance with an image signal obtained from the distance-measuring sensor 9, the distance-measuring calculation of a well-known phase difference system is performed by a central processing unit, not shown, to detect the amount of defocus of the photographing lens. Also, each of the distance-measuring sensor 9 and the image sensor 7 is a light-receiving element.

In a photographing process, on the basis of the amount of defocus detected in this way, the profile of the reflecting surface of the deformable mirror 4 in the photographing lens system 51' is changed so that the amount of defocus detected through the distance-measuring sensor 9 becomes zero.

After that, the movable mirror 10 is turned toward the pentagonal roof prism 5 and at the same time, the sub-mirror 8 is folded on the surface of the movable mirror and is removed out of the optical path of the photographing lens system 51'. Whereby, light from the photographing lens system 51' is introduced into the image sensor 7 and is imaged.

Figure 3:
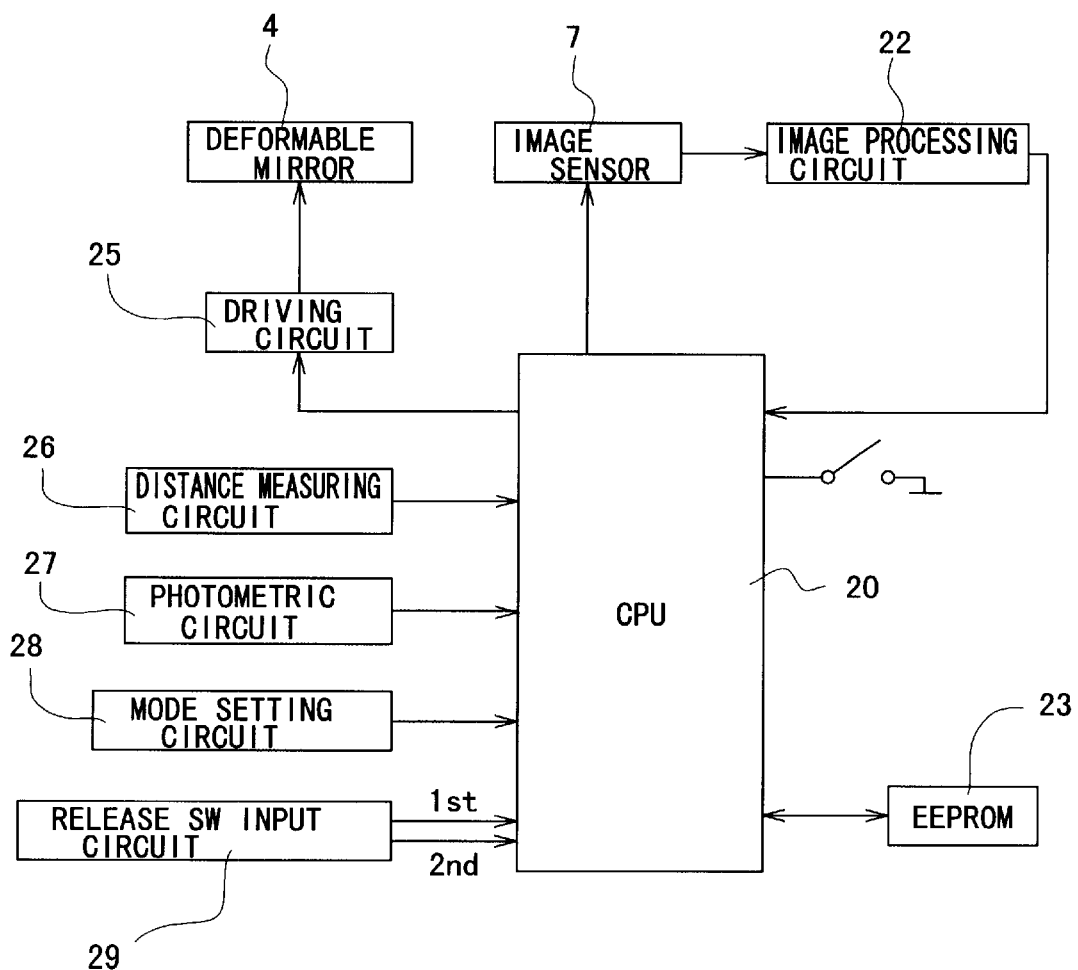
FIG. 3 is a block diagram showing circuits of a camera applying the focal-length adjusting unit of the embodiment.

A camera to which the focal-length adjusting unit of the embodiment is applied, as shown in FIG. 3, is designed to connect the image sensor 7, an image processing circuit 22, a driving circuit 25, a distance-measuring circuit 26, a photometric circuit 27, a mode setting circuit 28, a release switch input circuit 29, and an EEPROM 23 to a central processing unit 20. In the EEPROM 23, adjustable data for positioning the deformable mirror 4 are stored.

Figure 4:
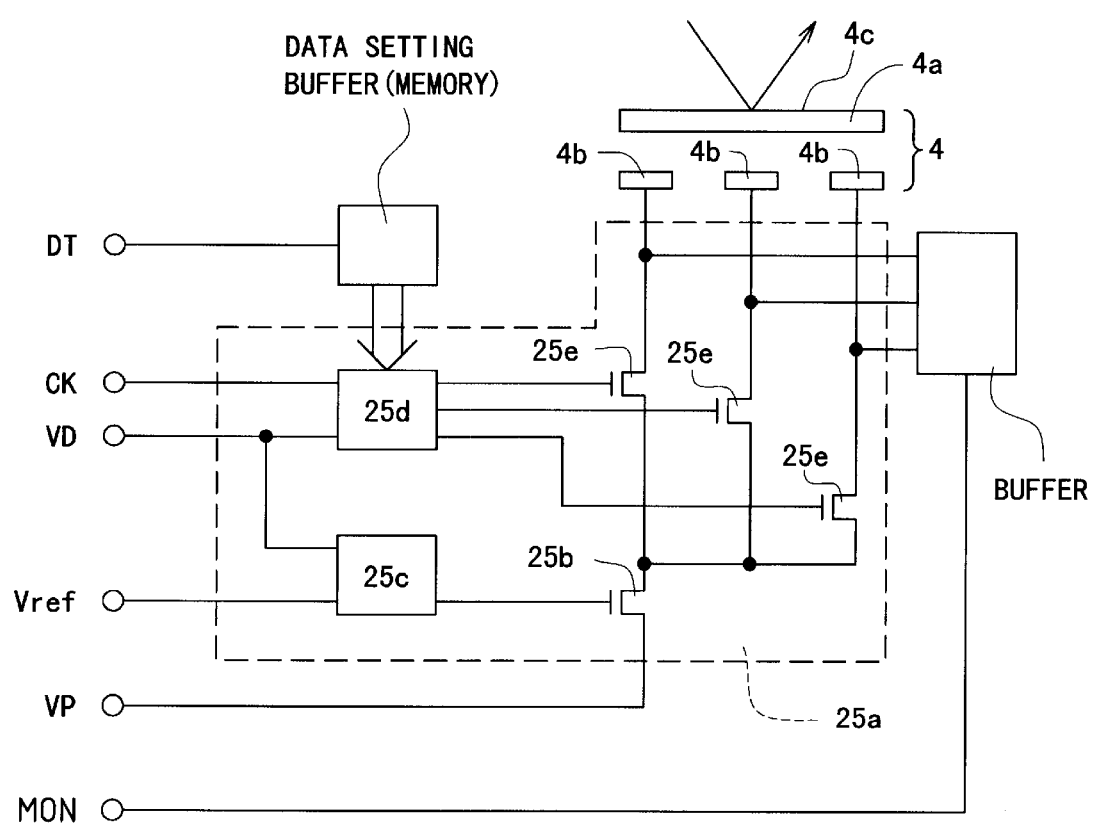
FIG. 4 is a block diagram showing the positional relationship between electrodes constituting a deformable mirror used in the focal-length adjusting unit of the embodiment and the power circuit of the deformable mirror for voltage control.

The deformable mirror 4, as shown in FIG. 4, has an upper electrode 4a, lower electrodes 4b divided into a plurality of segments, and a flexible reflecting surface 4c provided on the upper electrode 4a so that the driving circuit 25 shown in FIG. 3 is connected to the lower electrodes 4b.

In FIG. 4, a high-voltage source Vp is a constant-voltage source of about 100 V, and a reference voltage Vref is a variable voltage of approximately 5 V. A driving voltage source VD is a voltage source for driving a voltage control circuit section 25a. Voltages from the high-voltage source Vp and the driving voltage source VD, and the reference voltage Vref are applied and supplied to the voltage control circuit section 25a. A high-resistance voltage control transistor 25b and a control circuit 25c are configured in the voltage control circuit section 25a, and the high-voltage source Vp is controlled by the voltage control circuit section 25a so as to obtain an output voltage corresponding to the reference voltage Vref which is a low voltge, and voltages are applied to the lower electrodes 4b which are control electrodes. A clock input terminal CK produces a timing pulse which is a pulse voltage synchronized with a change of the reference voltage Vref. In addition to the high-resistance voltage control transistor 25b and the control circuit 25c, a timing producing circuit 25d and high-resistance switching transistors 25e are configured in the voltage control circuit section 25a.

In the deformable mirror (including the voltage control circuit section) constructed as mentioned above, the reference voltage Vref is input which corresponds to a voltage applied to any one of the lower electrodes 4b which are divided control electrodes, and the output voltage is controlled by the voltage control transistor 25b and the control circuit 25c. The timing pulse is input at a period synchronous with this, and the switching transistor 25e corresponding to the control electrode is brought to an on condition by the output of the timing producing circuit 25d. After a constant time, the switching transistor 25e is put to an off condition, and the connection between the output of the voltage control transistor 25b and the control electrode is cut so that the voltage applied to the control electrode is kept constantly. Whereby, a controlled voltage is applied to the corresponding control electrode. The voltage control by this reference voltage and the on-off operation of the switching transistor 25e by the timing pulse are performed in time series, and thereby any voltage can be applied to each of divided electrodes.

Figure 5:
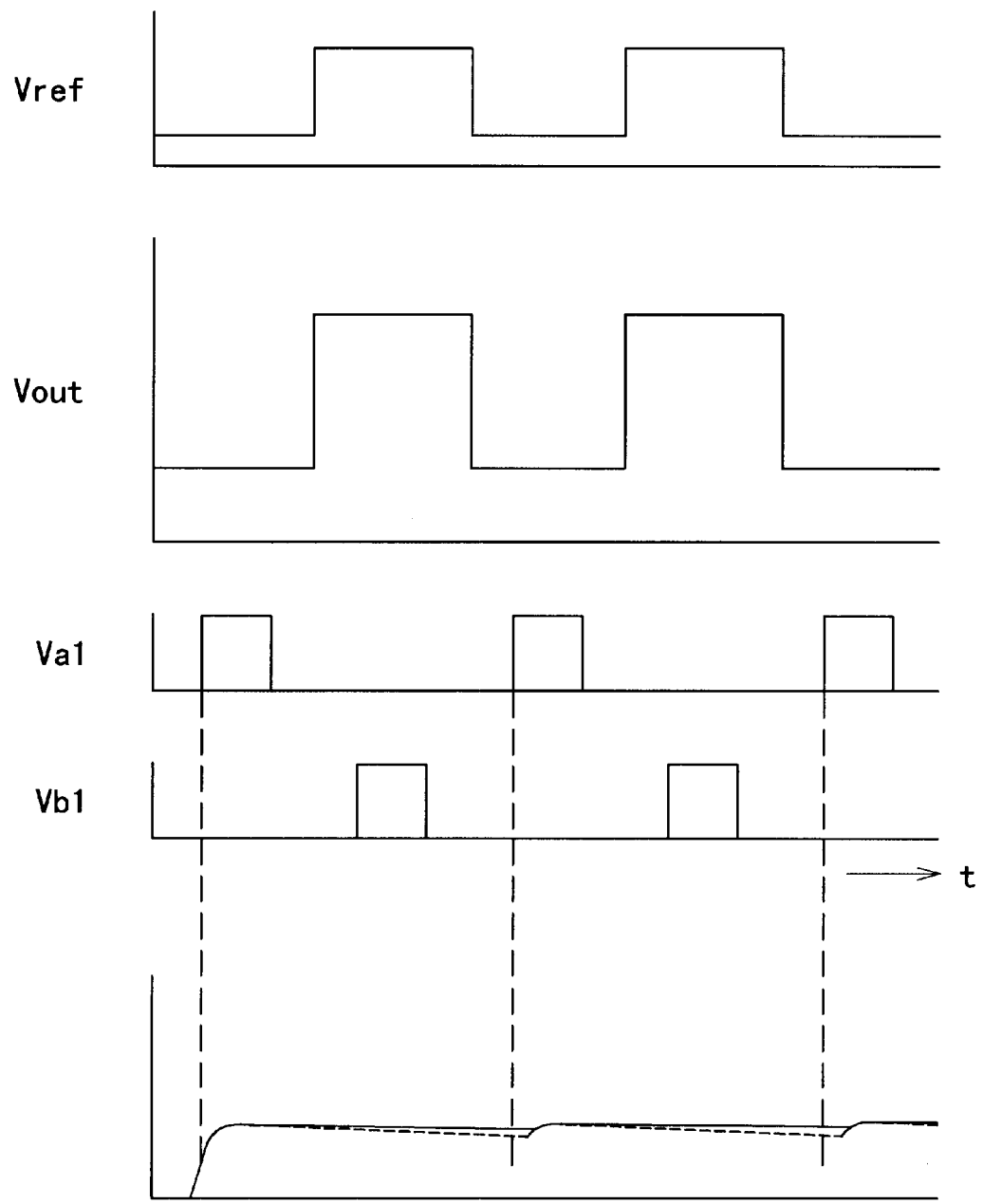
FIG. 5 is a timing chart where a plurality of electrodes of the deformable mirror are driven.

The timing chart of the voltage control circuit in this case is shown in FIG. 5. In this figure, two of the divided electrodes are arbitrarily given.

Here, in the deformable mirror, a load component is a capacitance component by an opposed electrode, and the voltage applied to the opposed electrode is a direct voltage. Thus, even when the applied voltages of the divided electrodes are controlled in time series, the voltages applied to individual electrodes can be kept constantly in great ease. By this integrated voltage control circuit, the deformable mirror with a plurality of divided control electrodes can be driven by merely supplying a power and a control signal from the exterior. Even though the number of divided control electrodes is increased, there is no need to increase the number of control circuits accordingly, and it is possible to control the voltage by simply changing the timing producing circuit and increasing the switching transistor. Consequently, space can be saved and a deformable mirror suitable for compactness can be provided.

Also, in FIG. 4, the single upper electrode 4a and the plurality of lower electrodes 4b are used. Conversely, the deformable mirror may be designed so that the upper electrode 4a is divided into a plurality of segments, which are connected to the circuits shown in FIG. 3, and the lower electrode 4b is constructed as a single segment and has the reflecting surface 4c.

Figure 6A:
FIGS. 6A–6G are views for explaining the electrodes of the deformable mirror used in the focal-length adjusting unit of the embodiment.
Figure 6B:
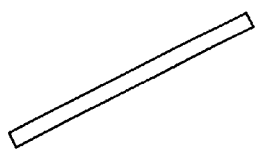
Figure 6F:
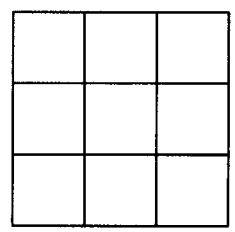
Figure 6C:
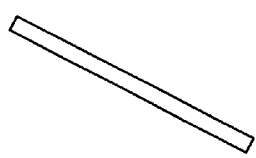
Figure 6D:
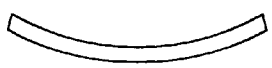
Figure 6G:
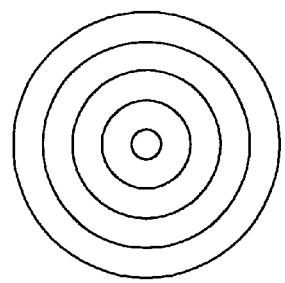

The lower electrodes 4b of the deformable mirror, as illustrated in FIG. 6F, may be arrayed like checkers, or as in FIG. 6G, in a concentric pattern. Also, the lower electrodes of the deformable mirror of the embodiment are arrayed like checkers in which the pattern of FIG. 6F is subdivided.

Figure 6E:

The upper electrode 4a, as shown in FIG. 6A, may be driven so that the whole is pulled parallel to the opposed electrodes, or as in FIGS. 6B and 6C, may be driven so that its one side is pulled toward the opposed electrodes. Alternatively, as shown in FIGS. 6D and 6E, it may be deformed to be concave or convex with respect to the opposed electrodes.

Subsequently, a description will be given of flowcharts showing the operation sequence of a camera provided with the automatic focal-length unit of the embodiment constructed as mentioned above, using FIGS. 7–10.

When the power of the camera is turned on, initialized data stored in the EEPROM 23 shown in FIG. 3 are read out and transferred to the buffer, and control information is initialized. In this case, the power is supplied to the voltage control circuit section, and the direction and deformation of the reflecting mirror are also initialized (Step S1). Subsequently, a mode selecting image is displayed, for example, on the finder section of the camera, and a photographer makes the mode selection. The mode selected by the photographer is checked (Step S2), and when a photographing mode is selected, a photographing process is performed (Step S4), while when an adjusting mode is selected, an adjusting process is performed (Step S3). Also, for the mode selection, in addition to the photographing mode and the adjusting mode, there are a reproducing mode for photographing images and a setting mode for various numerical values. For convenience of description, however, reference is here made to the case where the photographing mode and the adjusting mode are selected.

Figure 8:
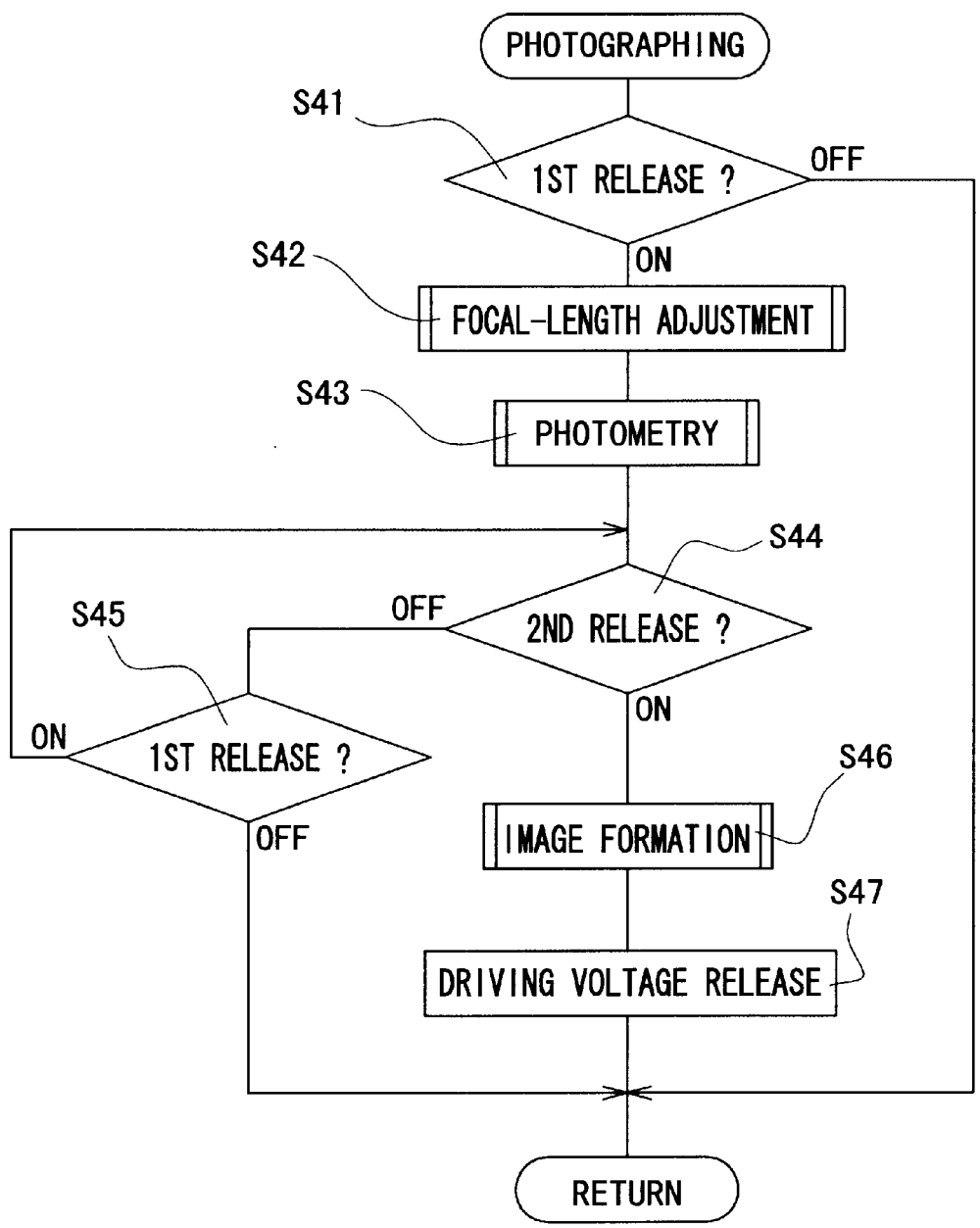
FIG. 8 is a flowchart where a photographing mode is selected in the camera provided with the automatic focal-length unit of the embodiment.

In the photographing process, as shown in FIG. 8, whether a release button is half-pushed is first checked (Step S41). When the release button is not pushed, the photographing process is completed. When the release button is half-pushed, a focal-length adjusting process is executed (Step S42).

Figure 9:
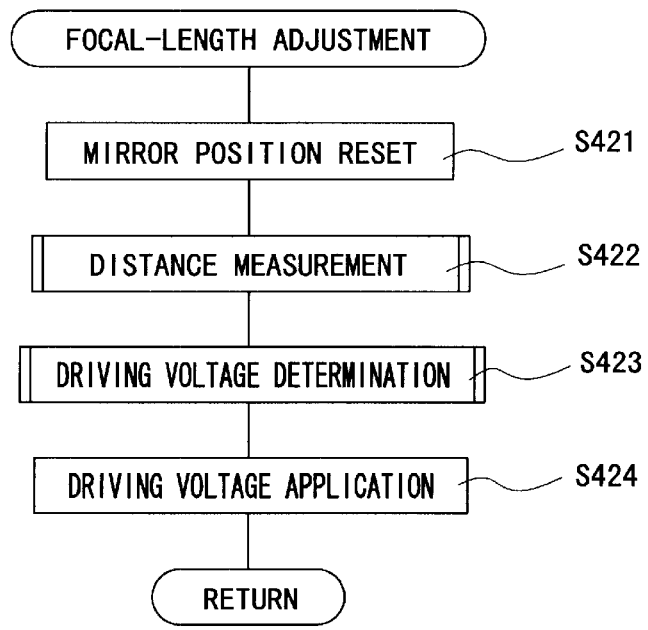
FIG. 9 is a flowchart of a focal-length adjusting subroutine in the camera provided with the automatic focal-length unit of the embodiment.

In the focal-length adjusting process shown in FIG. 9, the power is first supplied to the voltage control circuit section 25a in accordance with the initialized data, and the direction and deformation of the reflecting mirror are initialized. At the same time, the movable mirror 10 and the sub-mirror 8, as shown in FIG. 2, are set on the optical path of the photographing lens system 51' (Step S421). Next, a distance-measuring process is performed (Step S422).

Also, the reflecting mirror in an initial state may be shaped into a plane surface or a curved surface. It is only necessary to select a proper shape.

In the distance-measuring process, a well-known phase difference system is used to detect the amount of defocus of the photographing lens, and thereby the process is completed. Alternatively, light from a light source for measurement, not shown, such as a laser, provided in the camera body is projected toward an object, and the light reflected by the object, after passing through the lens 1, is reflected and deflected by the mirrors 2 and 3, the deformable mirror 4, and the mirror 2' and is rendered incident through the lens 1' on the half mirror portion 10b of the movable mirror 10 so that its transmitted light is reflected by the sub-mirror 8 and is introduced into the distance-measuring sensor 9. Whereby, the distance of the object is detected and the distance-measuring process is completed. Such a distance-measuring technique may be used.

Figure 10:
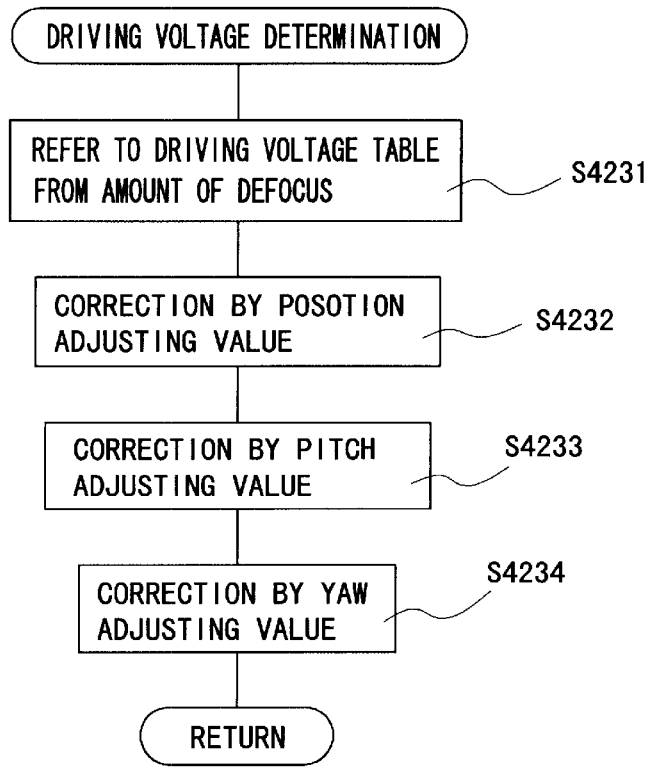
FIG. 10 is a flowchart of a driving voltage determination subroutine in the camera provided with the automatic focal-length unit of the embodiment.

After the distance-measuring process has been completed, as shown in FIG. 9, a driving voltage determination process of the deformable mirror is executed (Step S423). In the driving voltage determination process, as depicted in FIG. 10, the amount of defocus available is calculated to refer to a driving voltage table of the deformable mirror which is initial data, from the amount of defocus (Step S4231). By voltage values corrected by an infinite focal position adjusting value, a pitch adjusting value, and a yaw adjusting value, voltages supplied to individual electrodes of the deformable mirror which is divided like checkers (Steps S4232–S4234).

The driving voltage, after being determined, is applied to the power circuit of the driving section of the deformable mirror (Step S424), and the reflecting surface is deformed into a desired shape so that the image of the object is formed on the image sensor 7. Whereby, the focal-length adjusting process is completed.

After the completion of the focal-length adjusting process, as shown in FIG. 8, a photometric process is performed (Step S43). Then, whether the release button is fully pushed is checked (Step S44). When the release button is not fully pushed, whether the half-pushed state of the release button is kept is checked (Step S45). When it is kept, whether the release button is fully pushed is checked again. When the half-pushed state of the release button is released, the photographing process is completed.

When the release button is fully pushed, the movable mirror 10 shown in FIG. 2 is turned on the side of the pentagonal roof prism 5 and the sub-mirror 8 is folded on the surface of the movable mirror so that they are removed out of the optical path of the photographing lens system. Consequently, light from the object, after being reflected by the mirrors 2 and 3 through the lens 1, is further reflected by the deformable mirror 4 whose reflecting surface is deformed into the desired shape. After being still further reflected by the mirror 2', the light emerges through the lens 1' from the photographing lens system 51', the light from which is introduced into the image sensor 7 and imaged (Step S45). After that, the application of the driving voltage to each electrode of the deformable mirror 4 is released (Step S47), and the photographing process of one frame is completed.

Figure 7:
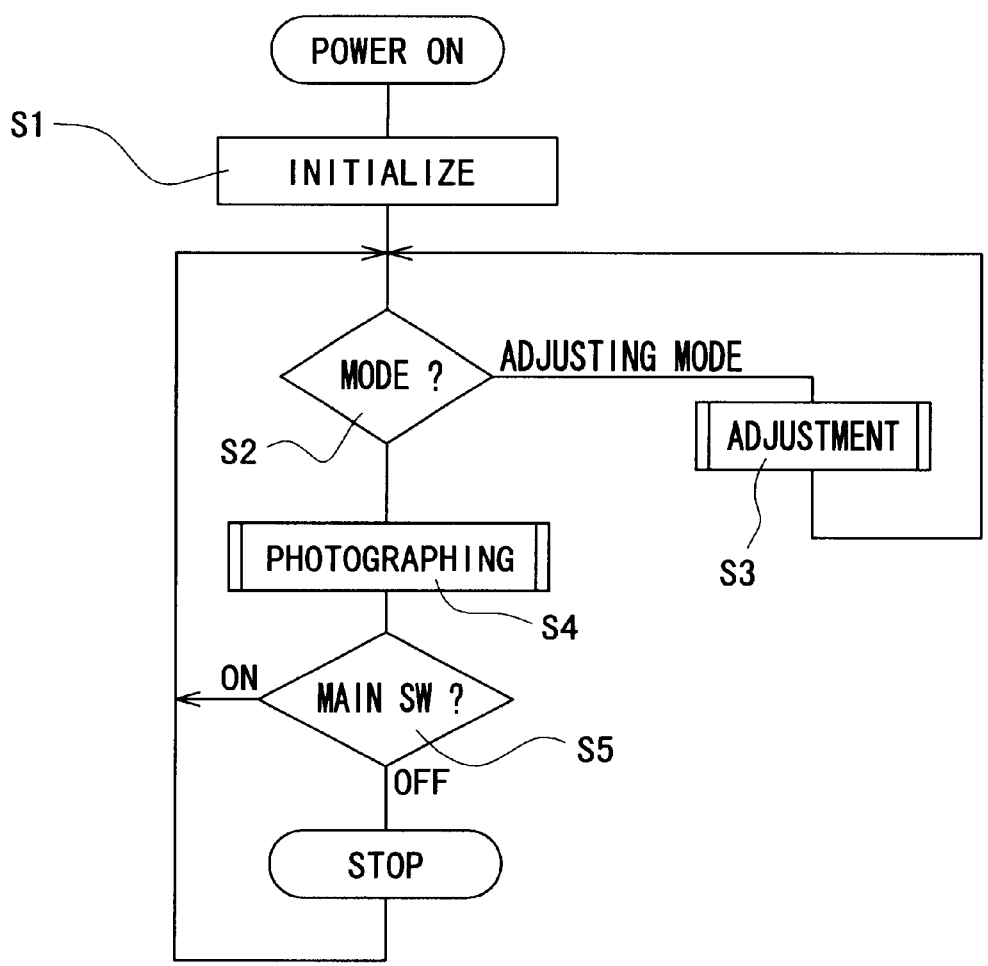
FIG. 7 is a sequence flowchart of the entire camera provided with an automatic focal-length unit of the embodiment.

After the photographing process has been completed, as shown in FIG. 7, whether a main switch is in an on or off condition is checked (Step S5). The embodiment is designed so that an operator is capable of arbitrarily setting an energy-saving mode and the time where setting is started. When the energy-saving mode is set, the main switch is controlled to be in an off condition in the case where the operation is not performed for a predetermined time. When the predetermined time does not pass in a state where the operation is not performed, when the energy-saving mode is not selected, or when a certain operation is performed by the operator, the main switch is in an on condition.

When the main switch is turned off, for example, only an absolutely necessary power for holding a data store state of the memory and for driving the central processing unit is turned on, and other powers are turn off to await the next mode selecting operation from the operator. When the main switch is on, the powers are turned on to await the next mode selecting operation from the operator.

Figure 11:
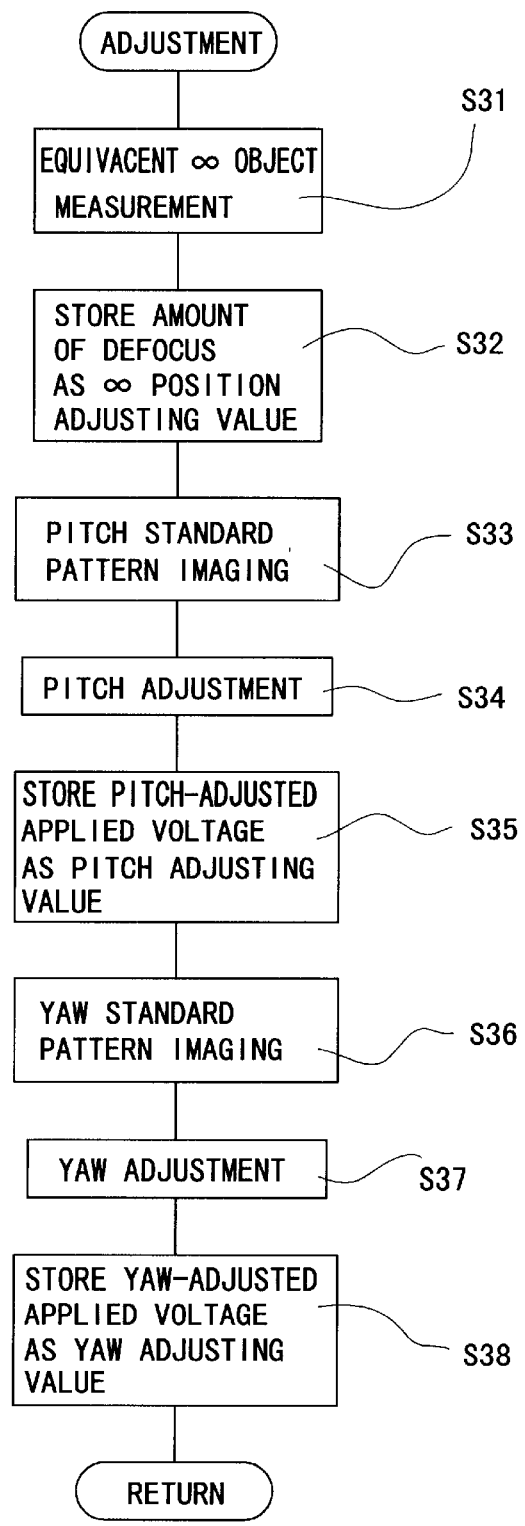
FIG. 11 is a flowchart where an adjusting mode is selected in the camera provided with the automatic focal-length unit of the embodiment.

In the adjusting process where the adjusting mode is selected in FIG. 7, as shown in FIG. 11, the distance of an object at a position equivalent to an infinite focal length is measured by the above-mentioned sequence control (Step S31). At the same time, the operator observes light reflected by the half mirror portion 10b of the movable mirror 10, through the pentagonal roof prism 5 and the eyepiece 6, and adjusts the voltage supplied to the driving section of the deformable mirror to perform focusing. In this case, the amount of shift (defocus) between the driving voltage of the deformable mirror calculated from the distance obtained by the distance-measuring sensor and the driving voltage of the deformable mirror adjusted by actually observing the object through the eyepiece 6 is stored in the memory as the infinite focal position adjusting value (Step S32).

Subsequently, the sub-mirror 8 is folded and removed out of the optical path of the photographing lens system 51', and a pitch standard pattern is imaged (Step S33). By observing the standard pattern of the object through the pentagonal roof prism 5 and the eyepiece 6, the voltage value of the deformable mirror is adjusted, and the shift of the pitch is controlled so that the standard pattern is located at the middle of the photographing image (Step S34). The applied voltage in this case is stored in the memory as a pitch adjusting value (Step S35).

Next, a yaw standard pattern is imaged (Step S36). By observing the standard pattern of the object through the pentagonal roof prism 5 and the eyepiece 6, the voltage value of the deformable mirror is adjusted, and the shift of the yaw is controlled so that the standard pattern is located at the middle of the photographing image (Step S37). The applied voltage in this case is stored in the memory as a yaw adjusting value (Step S38).

Whereby, the adjusting process is completed. This adjusting value is stored in the EEPROM 203, and when the voltage is applied to the driving section of the deformable mirror after this, the voltage applied to the deformable mirror is adjusted by this corrected voltage value in the initial process.

According to the focal-length adjusting unit of the embodiment, the shape of the deformable mirror of the photographing lens system is merely changed and thereby focusing, zoom, or the magnification change can be carried out. Hence, a complicated mechanical structure for moving lenses as in a conventional camera becomes unnecessary, and there is no need to use a motor for moving the lenses. Therefore, optical components are simplified, cost is saved, power consumption becomes low, the noise of lens movement caused by the motor is eliminated, and the response time is reduced.

In the focal-length adjusting unit of the embodiment, by providing the adjusting process of the deformable mirror, it becomes possible to adjust the fabrication error of the deformable mirror, an error caused when the deformable mirror is incorporated in the focal-length adjusting unit, and an error when a photographing lens barrel provided with the focal-length adjusting unit is housed in the body of a single-lens reflex camera. Whereby, individual products can be compensated for the shift of the optical axis to the image sensor 7 and the eclipse of light, caused by the positional shift of mounting of the photographing lens system 51', the mirrors 2, 2', and 3, and the deformable mirror 4.

Also, although in the focal-length adjusting unit of the embodiment the deformable mirror is provided at one place, all the mirrors or a plurality of mirrors may, of course, be constructed with deformable mirrors. In the embodiment, the deformable mirror is used as a deformable optical element which is deformed by an electric force, but, without providing the reflecting surface of the deformable mirror, a variable focal-length lens may be used which is designed to change the focal position in such a way that a flexible transparent member is configured by covering a transparent fluid with a transparent film and is deformed.

For the distance-measuring process and the focal-length adjusting process, in addition to the above systems, the following systems can be used. An object image formed by the imaging optical system is caused to fall on the image sensor, and the focal length of the deformable mirror or the variable focal-length lens is changed to find such a condition that a high-frequency component of the object image is maximized. Whereby, the distance-measuring process and the focal-length adjusting process are completed. This system is suitable for the single-lens reflex camera which does not require the distance-measuring sensor and the sub-mirror. An optical system for distance measurement and a light-receiving element are provided independently to make the distance measurement as the distance-measuring process. This system is suitable for a twin lens reflex camera.

The control processes shown in FIGS. 7–10 are applicable to observation apparatuses such as telescopes and binoculars, in addition to photographing apparatuses such as digital cameras, and can be widely used in the whole range of optical apparatuses.

Figure 12:
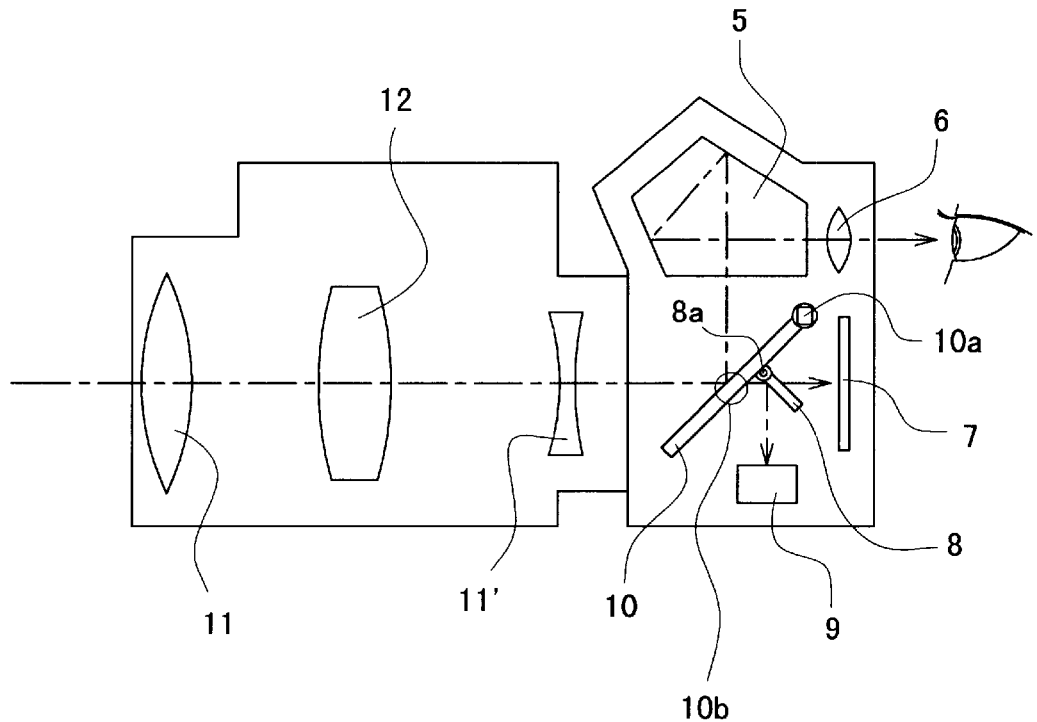
FIG. 12 is a view showing schematically another embodiment of the variable focal-length unit of the present invention.

FIG. 12 shows another embodiment of the variable focal-length unit of the present invention. In this embodiment, the photographing lens system in the lens barrel has lenses 11 and 11' and a variable focal-length lens 12 constructed so that its thickness and shape can be changed in accordance with a voltage applied across the lenses. The construction, function, and effect, except for the above description, are almost the same as in the embodiment of FIG. 2. According to this embodiment, it is only necessary to place a single variable focal-length lens between the lenses, and hence the arrangement is simpler than that of the embodiment of FIG. 2.

Figure 13:
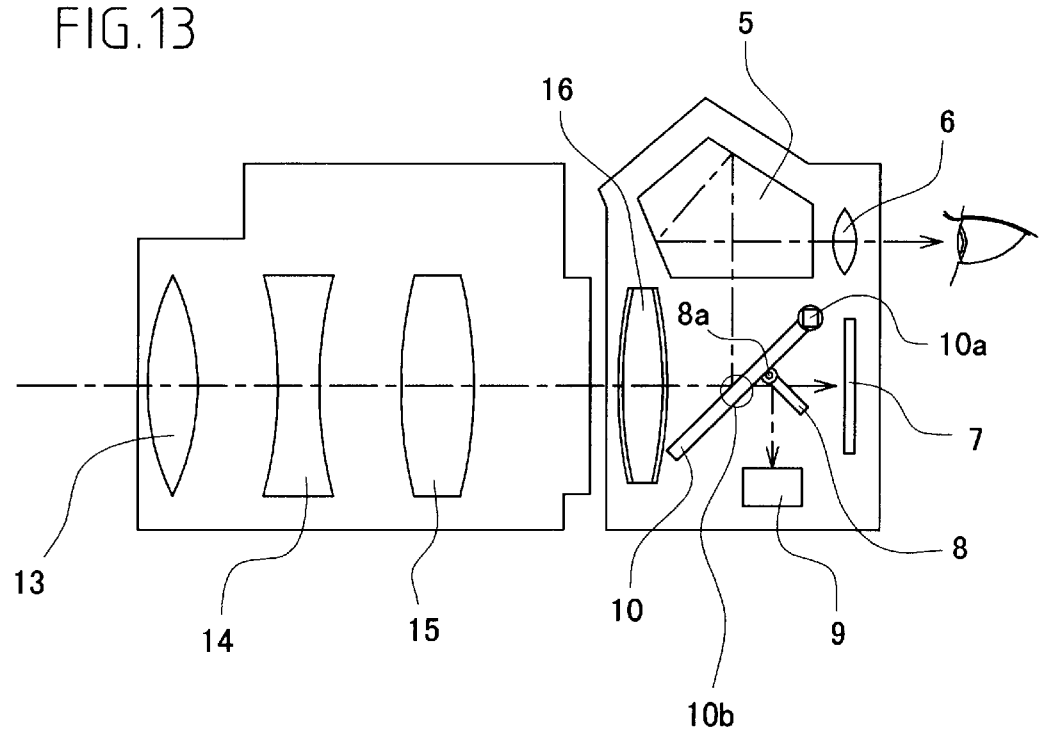
FIG. 13 is a view showing schematically still another embodiment of the variable focal-length unit of the present invention.

FIG. 13 shows still another embodiment of the variable focal-length unit of the present invention. In this embodiment, lenses 13, 14, and 15 are arranged in the lens barrel and a variable focal-length lens 16 is placed in the camera body, thereby constituting the photographing lens system. According to the embodiment, lenses for the single-lens reflex camera of exchangeable lens type are mounted to or dismounted from the camera body, and a zooming effect can be secured. The construction, function, and effect, except for the above description, are almost the same as in the embodiment of FIG. 2.

Figure 14:
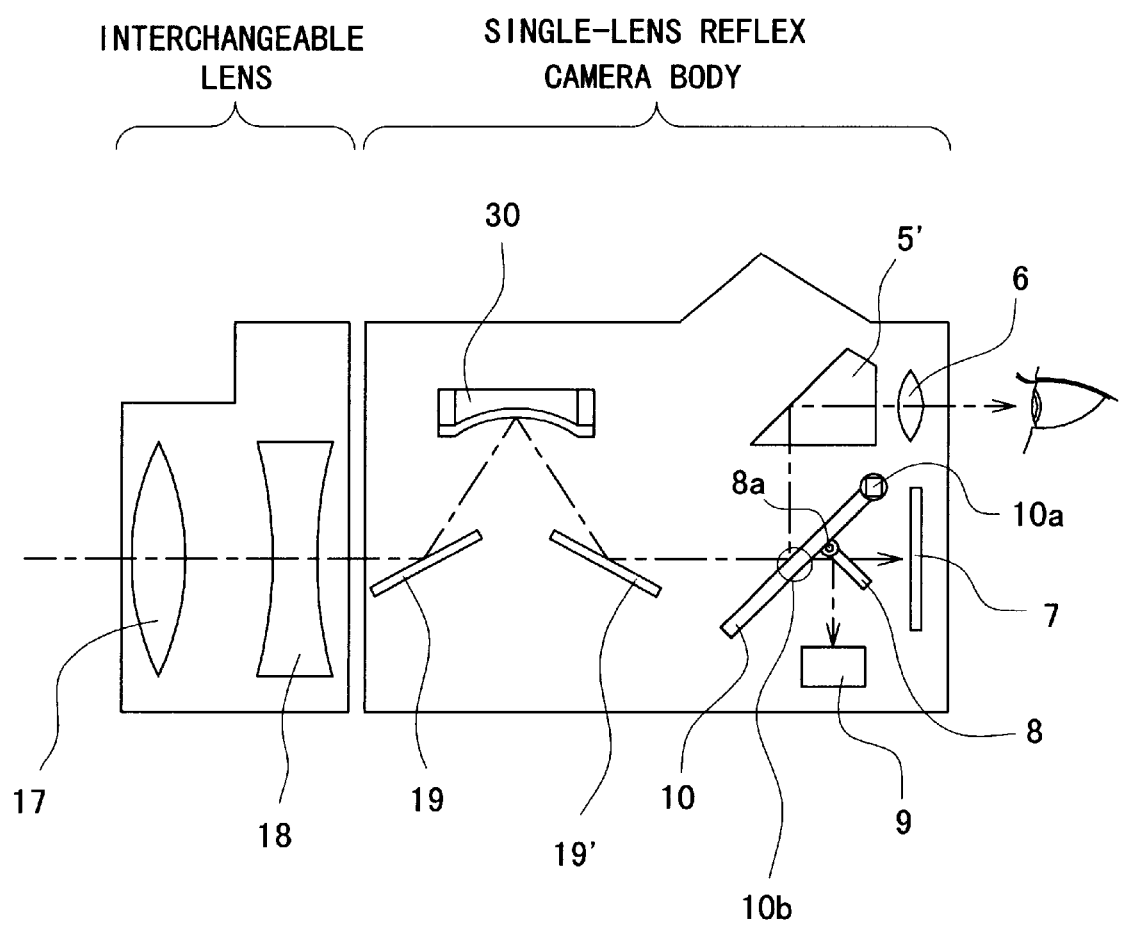
FIG. 14 is a view showing schematically a further embodiment of the variable focal-length unit of the present invention.

FIG. 14 shows a further embodiment of the variable focal-length unit of the present invention. In this figure, reference symbol 5' represents a roof prism. In this embodiment, ordinary lenses 17 and 18 are arranged in the lens barrel, and a mirror 19, a deformable mirror 30, and a mirror 19' are arranged in the camera body, thereby constituting the photographing lens system. Light from the photographing lens system is imaged on the image sensor in a state of an inverted image and is controlled so that image data after an image is formed are processed through the image processing circuit shown in FIG. 3 and the image is inverted and can be displayed as an erect image. The construction, function, and effect except for the above description are almost the same as in the embodiment of FIG. 2.

According to the embodiment, as compared with the case where the variable focal-length lens is used, an optical path length can be obtained by bending the optical path of the photographing lens system, and the length of the lens barrel can be reduced accordingly. Moreover, the number of parts can be set to be smaller than that of the embodiment of FIG. 2.

The focal-length adjusting unit of the embodiment may use an optical unit providing a reflecting mirror or a transparent member to a plate spring actuator in which a flexible thin film provided in one of two electrodes is configured into a plate spring form, at the position of the deformable mirror or the variable focal-length lens of each of the above embodiments.

Figure 15A:
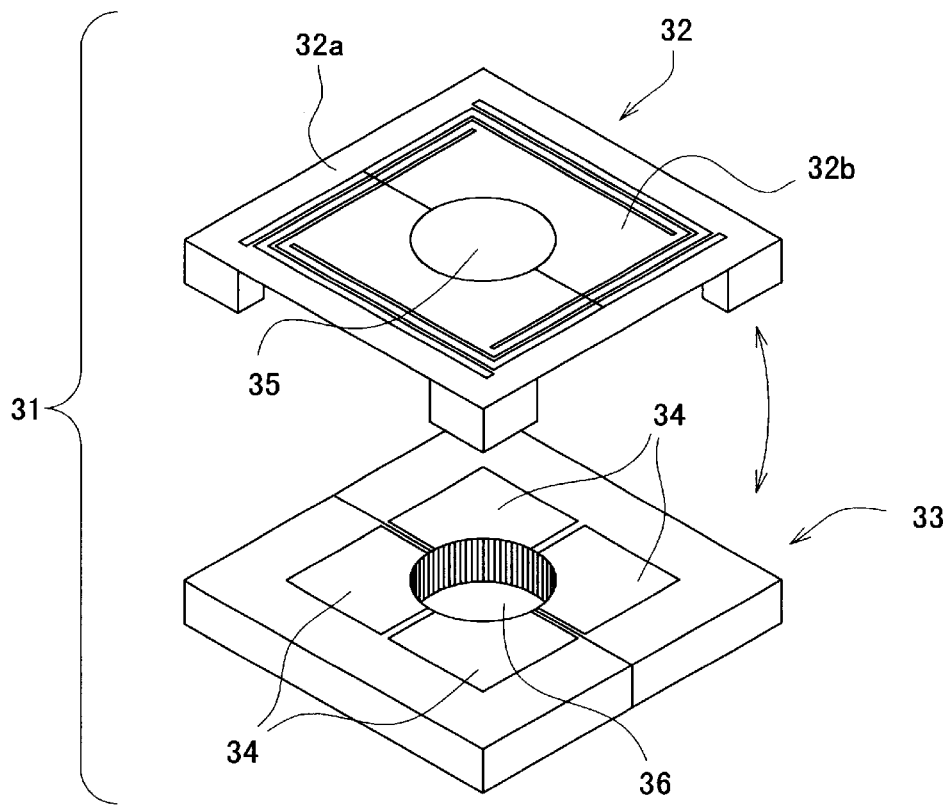
FIG. 15A is an exploded perspective view showing a fundamental structure of a plate spring actuator which is applicable to the focal-length adjusting unit of the present invention.
Figure 15B:
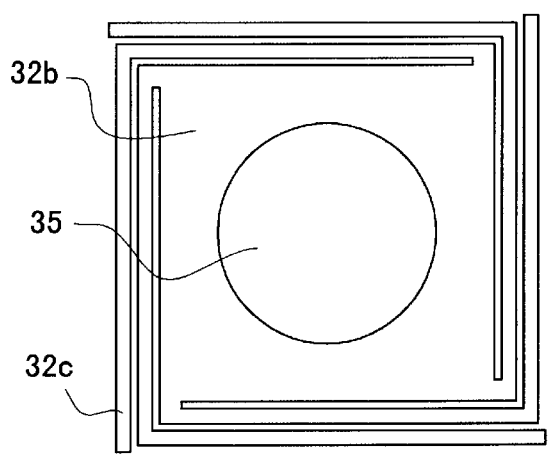
FIG. 15B is a plan view showing a plate spring portion of FIG. 15A.
Figure 15C:
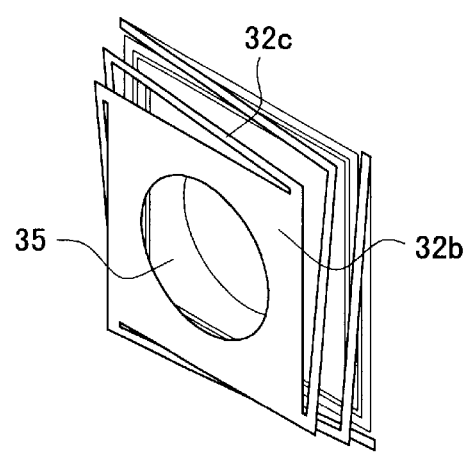
FIG. 15C is an explanatory view showing a deformed state of the plate spring portion of FIG. 15A.

In FIGS. 15A and 15B, a plate spring actuator 31 is constructed in such a way that a substrate 32 with movable electrodes is cemented to a substrate 33 with fixed electrodes. The substrate 32 includes a frame member 32a, a thin plate member 32b, and four crank-like beam members 32c connecting both members 32a and 32b. The thin plate member 32b and the beam members 32c are made with conductive materials and constitute the movable electrodes. The beam members 32c are connected to four corners of the thin plate member 32b, each having a crank-like shape so as to surround the thin plate member 32b. Consequently, since the length of each beam can be increased with a small occupied area, a small spring constant is obtained so that the thin plate member 32b, for example, as shown in FIG. 15C, can be displaced by less electrostatic force. Also, although in these figures each of the beam members has the shape of the letter "L", it may be shaped into a U form or an arc form. In the substrate 33, as shown in FIG. 15A, four divided control electrodes 34 are fixed. Each of the electrodes has an area corresponding to each of the beam members 32c of the substrate 32 and an area corresponding to the thin plate member 32b.

When the movable electrodes are grounded and a high voltage is applied to a desired control electrode 34 in the substrate 33, electrostatic attractive forces are exerted at a part of the thin plate member 32b corresponding to the control electrode 34 and the beam member 32c connected thereto. Here, when other three electrodes of the substrate 33 are grounded, the electrostatic attractive force is not produced in the remaining area of the substrate 32, and thus, as a result, the thin plate member 32b is attracted toward the substrate 33 to incline with respect to the substrate 33. At the same time, a distance between the thin plate member 32b and the substrate 33 is reduced even at the center of the thin plate member 32b.

When the substrate 32 is grounded to apply a voltage equivalent to the four electrodes 34 of the substrate 33, identical electrostatic forces are exerted in the thin plate member 32b and the four beam members 32c, and hence the thin plate member 32b is moved in parallel toward the substrate 33.

In this way, the plate spring actuator 31 is constructed so that the voltages applied to the four electrodes 34 of the substrate 33 with the fixed electrodes are controlled and thereby the inclination and vertical displacement of the thin plate member 32b can be arbitrarily adjusted.

Holes 35 and 36 are provided at the centers of the substrates 32 and 33, respectively, so that when an optical element, such as a lens, is mounted in the hole 35 of the substrate 32, it can be displayed to change conditions, such as the focal length, of light passing through the holes 35 and 36. Also, the thin plate member 32b of the substrate 32 is also used as an optical element support.

The plate spring actuator used in the present invention, as mentioned above, has a substrate with at least one fixed electrode and a substrate with at least one movable plate-spring-like electrode (movable electrode). Any actuator having the substrate with the fixed electrode and the substrate with the movable electrode may be constructed so that two substrates with fixed electrodes are arranged to interpose the substrate with the movable electrode between them. The number of substrates is not limited.

Instead of using the electrostatic force, two electrodes may be replaced by coils, for example, thin-film coils, so that the plate spring is deformed by using an electromagnetic force. Alternatively, the plate spring actuator may be constructed so that one electrode is replaced by a permanent magnet and the other electrode is replaced by a coil to deform the plate spring with the electromagnetic force. The plate spring actuator designed as described above has the merit that the direction of deformation can be changed by merely varying the polarity of the current. Also, in the present invention, it is assumed that the coil falls within the electrode.

The plate spring actuator, which can be fabricated by a semiconductor manufacturing technique, is advantageous for miniaturization, and notably for low rigidity of the spring member. When the plate spring actuator is used, the force (electrostatic force) is exerted in the entire region of the reflecting mirror, and thus strain caused when the reflecting mirror is displaced can be minimized, or a thin reflecting mirror can be used. Consequently, the inertia mass becomes less, and the response property of the optical unit can be improved. Even when the optical unit is constructed with the plate spring actuator, the number of parts is small and cost can be reduced.

The deformable mirror or the variable focal-length lens may be deformed with the electromagnetic force, in addition to the electrostatic force, or may be designed so that a piezoelectric material is contained in the substrate with electrodes.

Instead of the deformable mirror, a variable focal-length mirror which uses a liquid crystal and is not deformed may be used. In the present invention, it is assumed that such a variable focal-length mirror also falls within the deformable mirror. The deformable mirror or the variable focal-length lens may be designed so that its deforming electrode portion is also used as a reflecting mirror.

Instead of applying the voltage to deform the deformable mirror or the variable focal-length lens, the deformable mirror or the variable focal-length lens may be such that the driving circuit of the deformable mirror or the variable focal-length is configured to apply the current, and in the adjusting process where the adjusting mode is selected, the current is applied to adjust the infinite focal position and the shifts of the pitch and yaw of the deformable mirror or the variable focal-length lens.

In the present invention, instead of the deformable mirror or the variable focal-length lens, a diffraction element in which a diffraction surface is deformed with the electric force may be placed in the photographing lens system so that the direction of diffraction is changed and thereby the focal length of the photographing lens is adjusted.

Any of deformable mirrors and variable focal-length lenses which will be described below can be used in the present invention.

A description will be given of construction examples of the deformable mirror and the variable focal-length lens which are applicable to the focal-length adjusting unit of the present invention.

Figure 16:
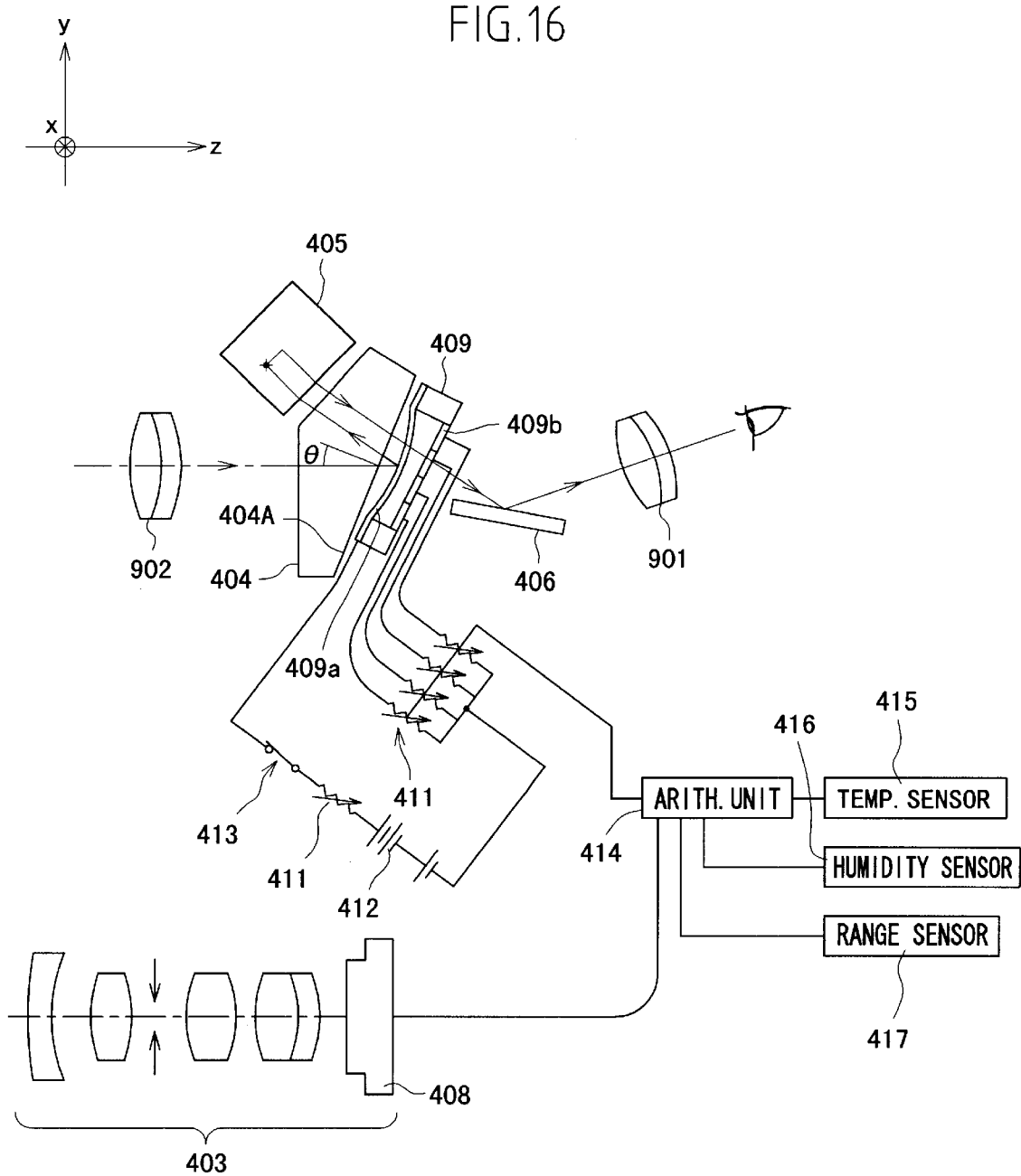
FIG. 16 is a view showing schematically another embodiment of an optical apparatus applying the focal-length adjusting unit of the present invention.

The deformable mirror applicable to the focal-length adjusting unit of the present invention is first explained. FIG. 16 shows a Keplerian finder for a digital camera using an optical-property mirror in another embodiment of the optical apparatus applying the focal-length adjusting unit of the present invention. It can, of course, be used for a silver halide film camera. Reference is first made to an optical-property deformable mirror 409.

The optical-property deformable mirror 409 refers to an optical-property deformable mirror (which is hereinafter simply called a deformable mirror) comprised of a thin film (reflecting surface) 409a coated with aluminum and a plurality of electrodes 409b. Reference numeral 411 denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror need not necessarily be planar, and may have any shape such as a spherical or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

Figure 18:
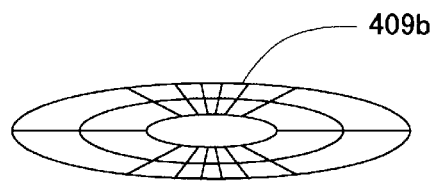
FIG. 18 is an explanatory view showing one aspect of electrodes used in the deformable mirror in the embodiment of FIG. 17.
Figure 19:
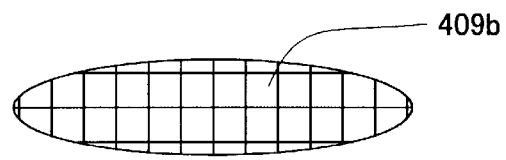
FIG. 19 is an explanatory view showing another aspect of electrodes used in the deformable mirror in the embodiment of FIG. 17.

The thin film 409a, like a membrane mirror set forth, for example, in "Handbook of Michrolithography, Michromachining and Michrofabrication", by P. Rai-Choudhury, Volume 2: Michromachining and Michrofabrication, p. 495, FIG. 8.58, SPIE PRESS, or Optics Communication, Vol. 140, pp. 187–190, 1997, is such that when the voltage is applied across the plurality of electrodes 409b, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 901 and 902 and/or the prism 404, the isosceles rectangular prism 405, and a mirror 406, or the degradation of imaging performance by the expansion and deformation of a lens frame and assembly errors of parts, such as optical elements and frames. In this way, a focusing adjustment and correction for aberration produced by the focusing adjustment can be always properly made. Also, the configuration of the electrodes 409b, for instance, as illustrated in FIGS. 18 and 19, may be selected in accordance with the deformation of the thin film 409a.

According to the embodiment, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 16, a mark + on the optical path indicates that a ray of light travels toward the back side of the plane of the page), and is reflected by the mirror 406 to enter the eye through the eyepiece 901. As mentioned above, the lenses 901 and 902, the prisms 404 and 405, and the deformable mirror 409 constitute the observing optical system of the optical apparatus in the embodiment. The surface profile and thickness of each of these optical elements is optimized and thereby aberration can be minimized.

Specifically, the configuration of the thin film 409a, as the reflecting surface, is controlled in such a way that the resistance values of the variable resistors 411 are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411 so that voltages by which the configuration of the thin film 409a is determined are applied to the electrodes 409b. Thus, since the thin film 409a is deformed with the voltages applied to the electrodes 409b, that is, the electrostatic force, it assumes various shapes including an aspherical surface, according to circumstances, and can be set to a convex surface if the polarity of the applied voltage is changed. The range sensor 417 need not necessarily be used, and in this case, it is only necessary that an imaging lens 403 of the digital camera is moved so that a high-frequency component of an image signal from a solid-state image sensor 408 is roughly maximized, and the object distance is calculated from this position so that an observer's eye is able to focus upon the object image by deforming the deformable mirror.

When the deformable mirror 409 is made by means of lithography, it is easy to obtain high fabrication accuracy and good quality.

When the thin film 409a is made of synthetic resin, such as polyimide, it can be considerably deformed even at a low voltage, which is advantageous. Also, the prism 404 and the deformable mirror 409 can be integrally configured into a unit.

Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the photographing apparatus of the embodiment, the lenses 901 and 902 are arranged separately from the prism 404. However, if the prisms 404 and 405, the mirror 406, and the deformable mirror 409 are designed so that aberration can be eliminated without providing the lenses 901 and 902, the prisms 404 and 405 and the deformable mirror 409 will be configured as one optical block, and the assembly is facilitated. A part or all of the lenses 901 and 902, the prisms 404 and 405, and the mirror 406 may be made of glass. By doing so, a photographing apparatus with a higher degree of accuracy is obtained.

Also, although in FIG. 16 the arithmetical unit 414, the temperature sensor 415, the humidity sensor 416, and the range sensor 417 are provided so that the deformable mirror 409 compensates for the changes of the temperature, humidity, and the object distance, this is not necessarily required. That is, the arithmetical unit 414, the temperature sensor 415, the humidity sensor 416, and the range sensor 417 may be eliminated so that the deformable mirror 409 compensates for only a change of an observer's diopter.

Figure 17:
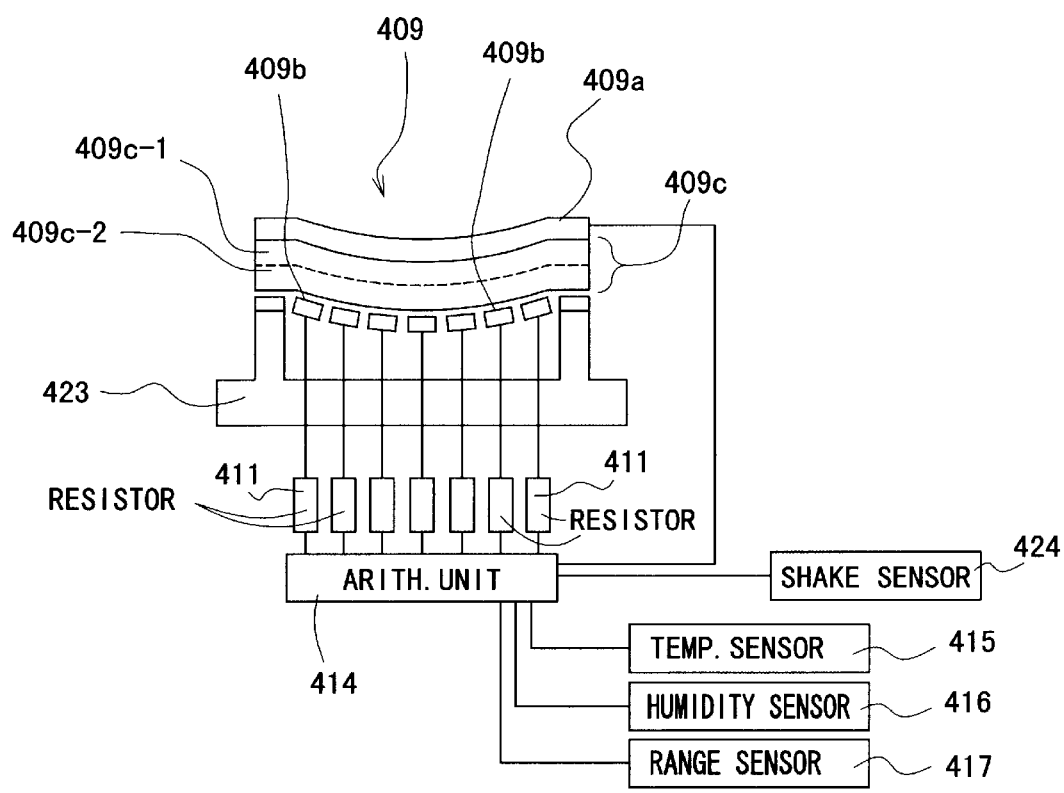
FIG. 17 is a view showing schematically another embodiment of the deformable mirror applicable to the focal-length adjusting unit of the present invention.

Subsequently, reference is made to other structures of the deformable mirror 409. FIG. 17 shows another embodiment of the deformable mirror 409 applicable to the focal-length adjusting unit of the present invention. In this embodiment, a piezoelectric element 409c is interposed between the thin film 409a and the electrodes 409b, and these are placed on a support 423. A voltage applied to the piezoelectric element 409c is changed in accordance with the individual electrodes 409b, and thereby the piezoelectric element 409c causes expansion or contraction which is partially different so that the shape of the thin film 409a can be changed. The configuration of the electrodes 409b, as illustrated in FIG. 18, may have a concentric division pattern, or as in FIG. 19, may be a rectangular division pattern. As other patterns, proper configurations can be chosen. In FIG. 17, reference numeral 424 represents a shake sensor connected to the arithmetical unit 414. The shake sensor 424, for example, detects the shake of a digital camera and changes the voltages applied to the electrodes 409b through the arithmetical unit 414 and the variable resistors 411 in order to deform the thin film 409a to compensate for the blurring of an image caused by the shake. At this time, the signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 20:
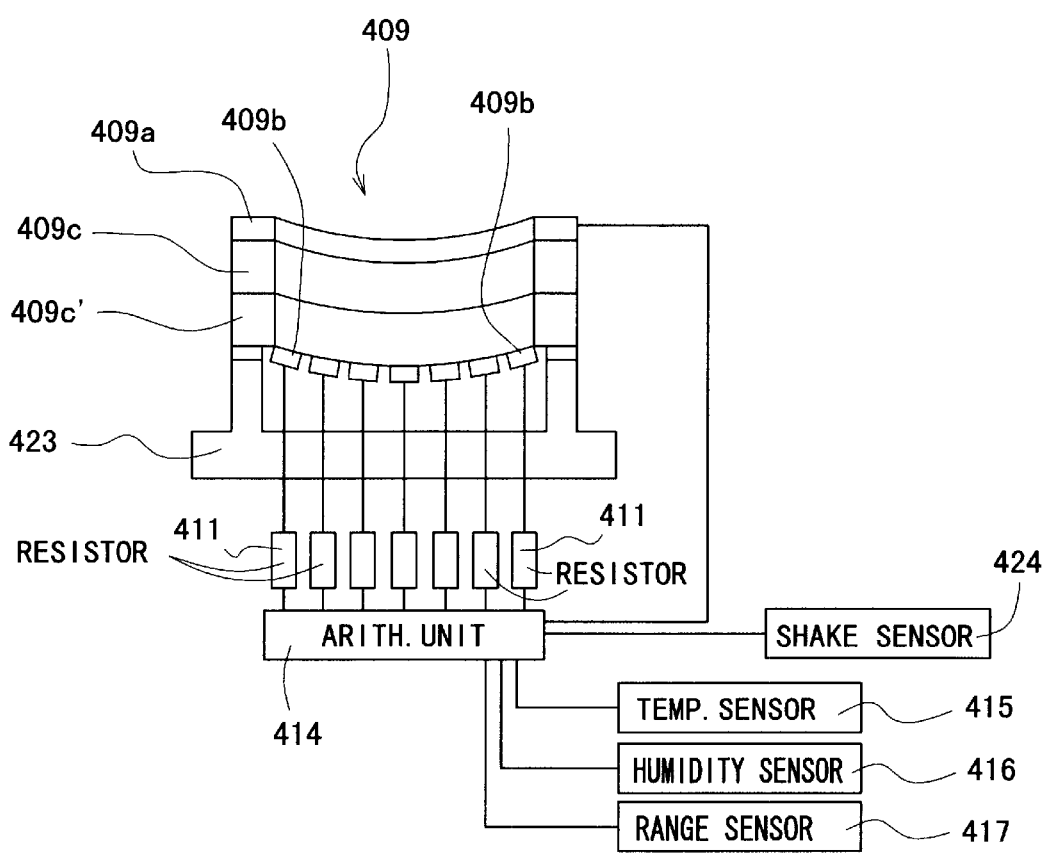
FIG. 20 is a view showing schematically another embodiment of the deformable mirror applicable to the focal-length adjusting unit of the present invention.

FIG. 20 shows another embodiment of the deformable mirror 409 applicable to the focal-length adjusting unit of the present invention. This embodiment has the same construction as the embodiment of FIG. 17 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the embodiment of FIG. 17 and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When such a piezoelectric element is used, it is also possible to properly deform the thin film 409a if its thickness is made uneven.

For materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the deformable mirror surface, which is favorable.

When an electrostrictive substance, for example, acrylic elastomer or silicon rubber, is used for the piezoelectric element 409c shown in FIGS. 17 and 20, the piezoelectric element 409c, as indicated by a broken line in FIG. 17, may be constructed by cementing another substrate 409c-1 to an electrostrictive substance 409c-2.

Figure 21:
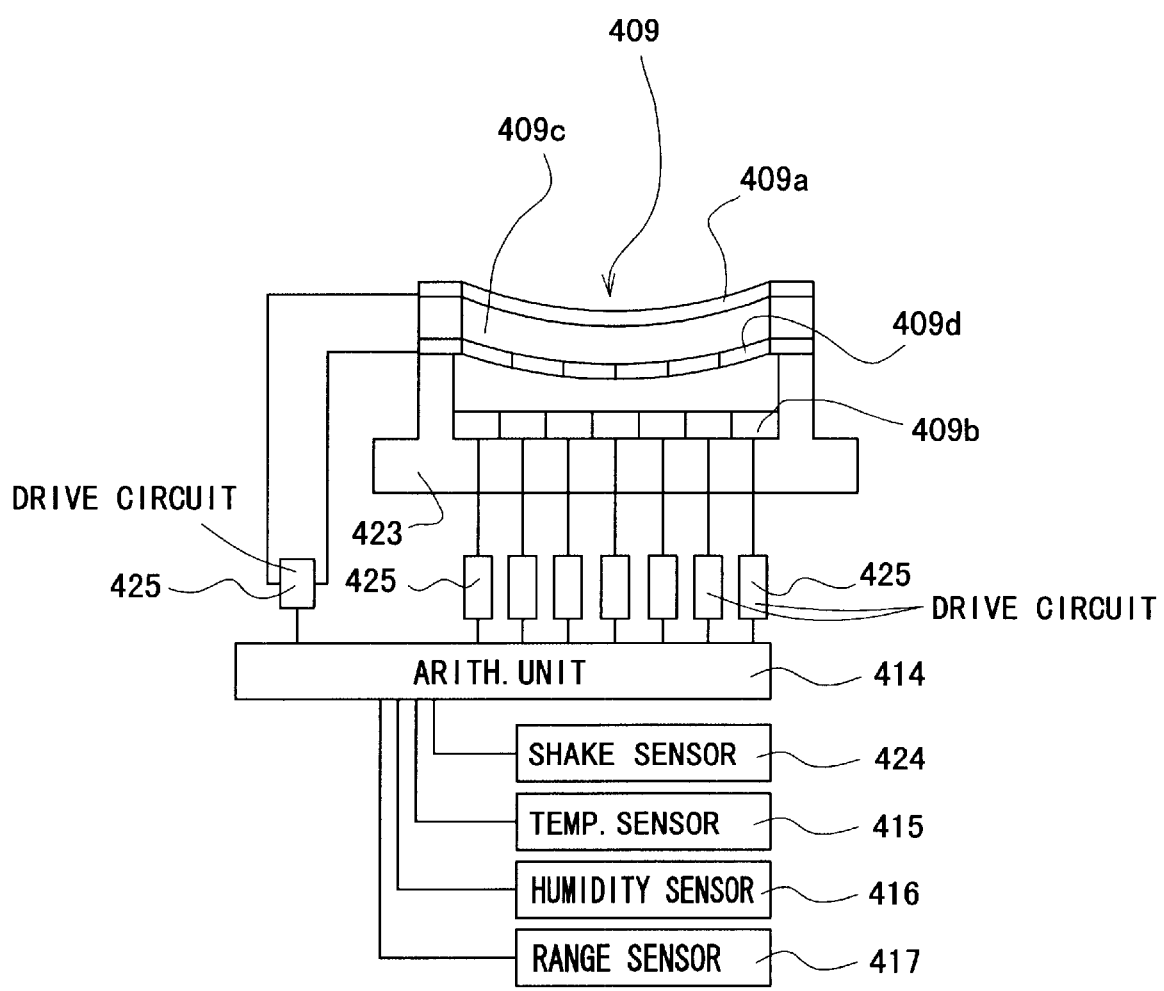
FIG. 21 is a view showing schematically another embodiment of the deformable mirror applicable to the focal-length adjusting unit of the present invention.

FIG. 21 shows another embodiment of the deformable mirror 409 applicable to the focal-length adjusting unit of the present invention. This embodiment is designed so that the piezoelectric element 409c is sandwiched between the thin film 409a and an electrode 409d, and voltages are applied between the thin film 409a and the electrode 409d through driving circuits 425 controlled by the arithmetical unit 414. Furthermore, voltages are also applied to the electrodes 409b provided on the support 423, through the driving circuits 425 controlled by the arithmetical unit 414.

In this embodiment, therefore, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above embodiments.

By changing the signs of the voltages applied between the thin film 409a and the electrode 409d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 409d may be constructed as a plurality of electrodes like the electrodes 409b. This condition is shown in FIG. 21. In the present invention, all of the piezoelectric effect, the electrostrictive effect, and electrostriction are generally called the piezoelectric effect. Thus, it is assumed that the electrostrictive substance is included in the piezoelectric substance.

Figure 22:
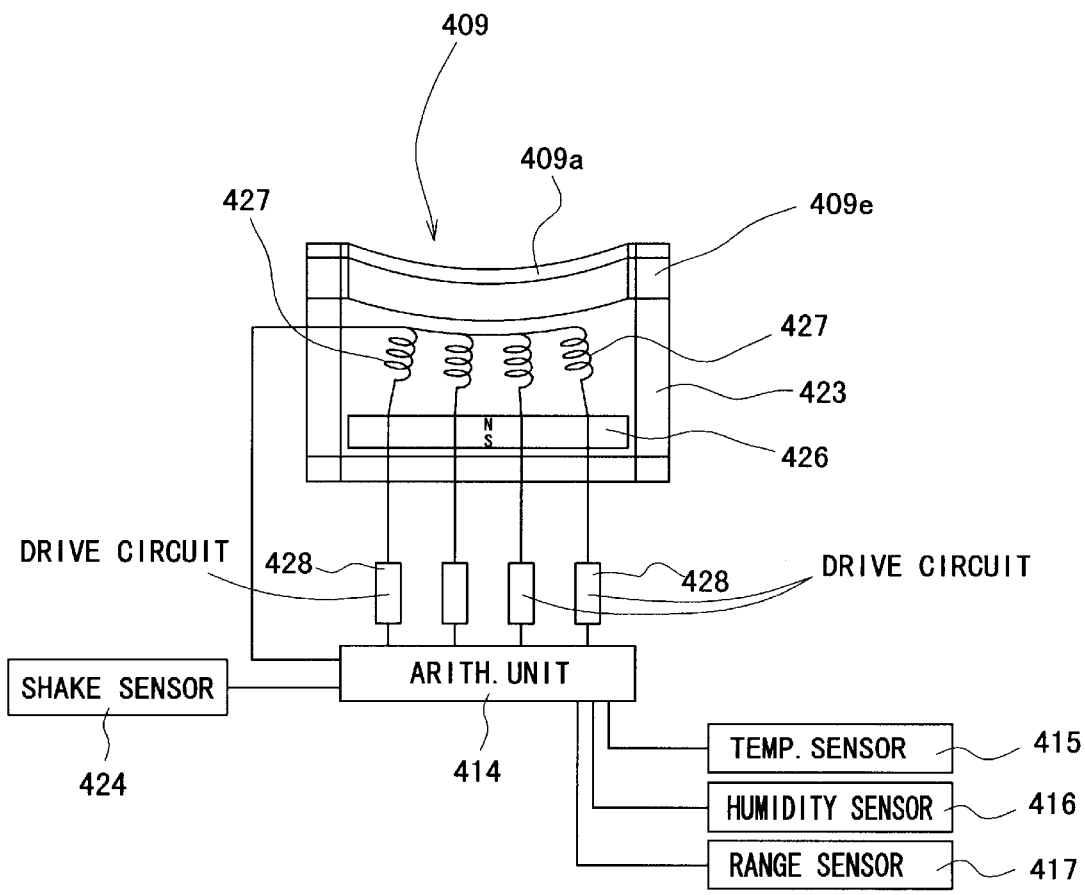
FIG. 22 is a view showing schematically another embodiment of the deformable mirror applicable to the focal-length adjusting unit of the present invention.

FIG. 22 shows another embodiment of the deformable mirror 409 applicable to the focal-length adjusting unit of the present invention. This embodiment is designed so that the shape of the reflecting surface can be changed by utilizing an electromagnetic force. A permanent magnet 426 mounted and fixed on a bottom surface inside the support 423, and the periphery of a substrate 409e made with silicon nitride or polyimide is mounted on the top surface thereof. The thin film 409a consisting of the coating of metal, such as aluminum, is deposited on the surface of the substrate 409e, thereby constituting the deformable mirror 409. Below the substrate 409e, a plurality of coils 427 are arranged and connected to the arithmetical unit 414 through driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used, and the permanent magnet 426 may be provided on the substrate 409e so that the coils 427 are arranged on the bottom side in the support 423. It is desirable that the coils 427 are fabricated by a lithography process. A ferromagnetic core (iron core) may be encased in each of the coils 427.

Figure 23:
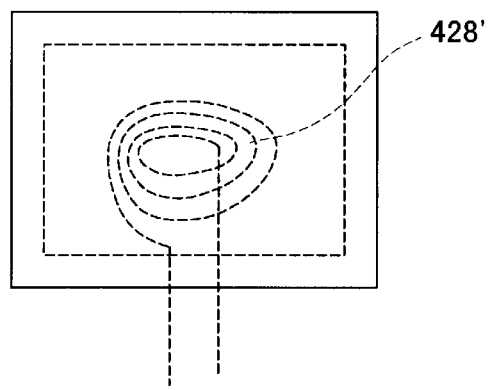
FIG. 23 is an explanatory view showing the winding density of a thin-film coil in the embodiment of FIG. 22.

In this case, each of the coils 427, as illustrated in FIG. 23, can be designed so that a coil density varies with place and thereby a desired deformation is brought to the substrate 409e and the thin film 409a. A single coil 427 may be used, and a ferromagnetic core (iron core) may be encased in each of the coils 427.

Figure 24:
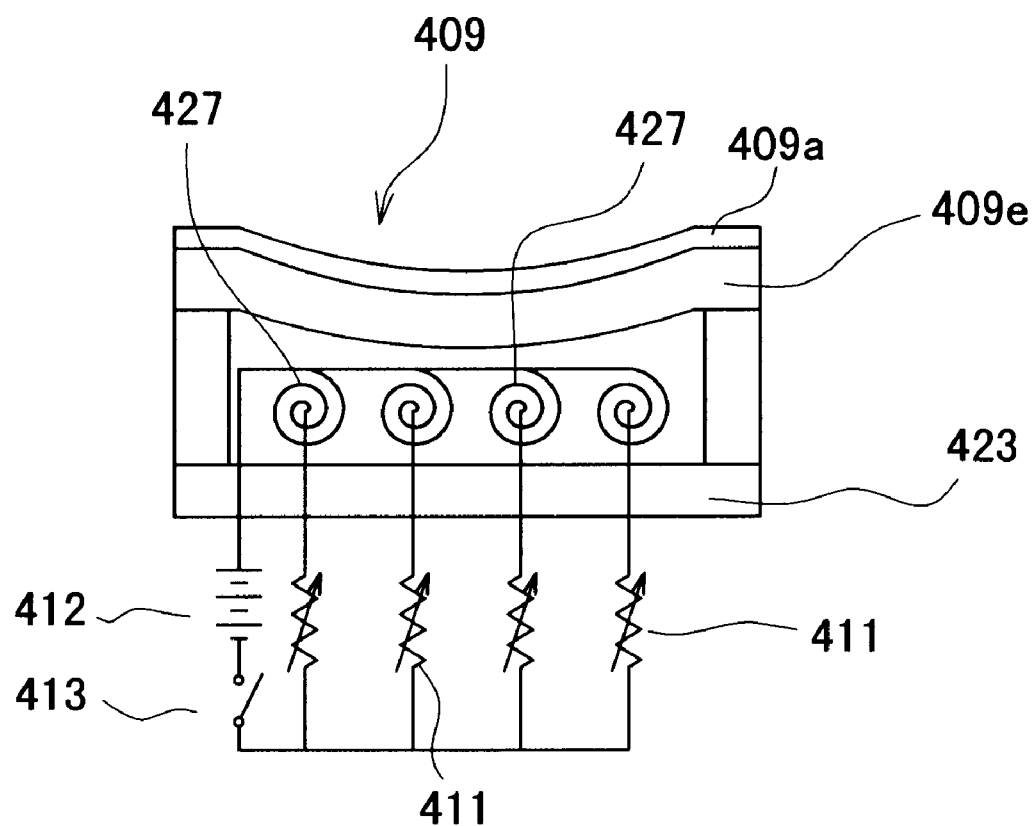
FIG. 24 is a view showing schematically another embodiment of the deformable mirror applicable to the focal-length adjusting unit of the present invention.
Figure 25:
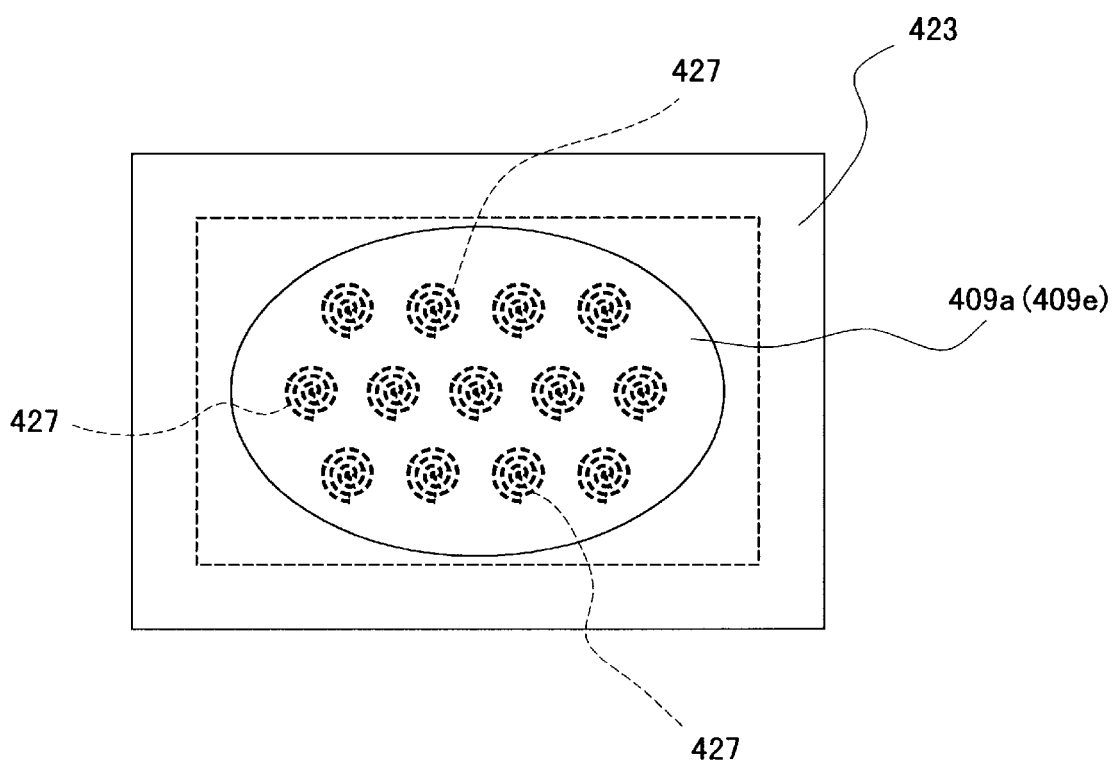
FIG. 25 is an explanatory view showing an example of an array of coils in the embodiment of FIG. 24.
Figure 26:
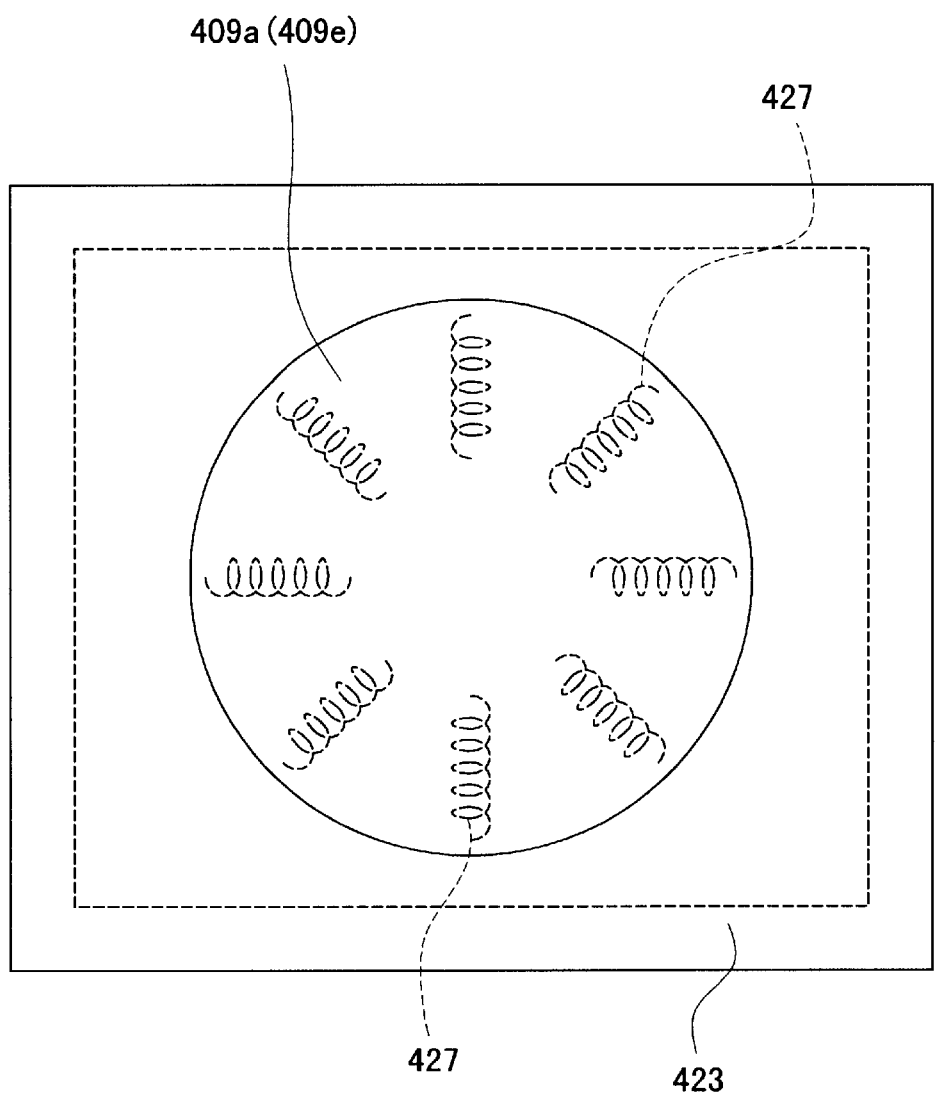
FIG. 26 is an explanatory view showing another example of the array of coils in the embodiment of FIG. 24.
Figure 27:
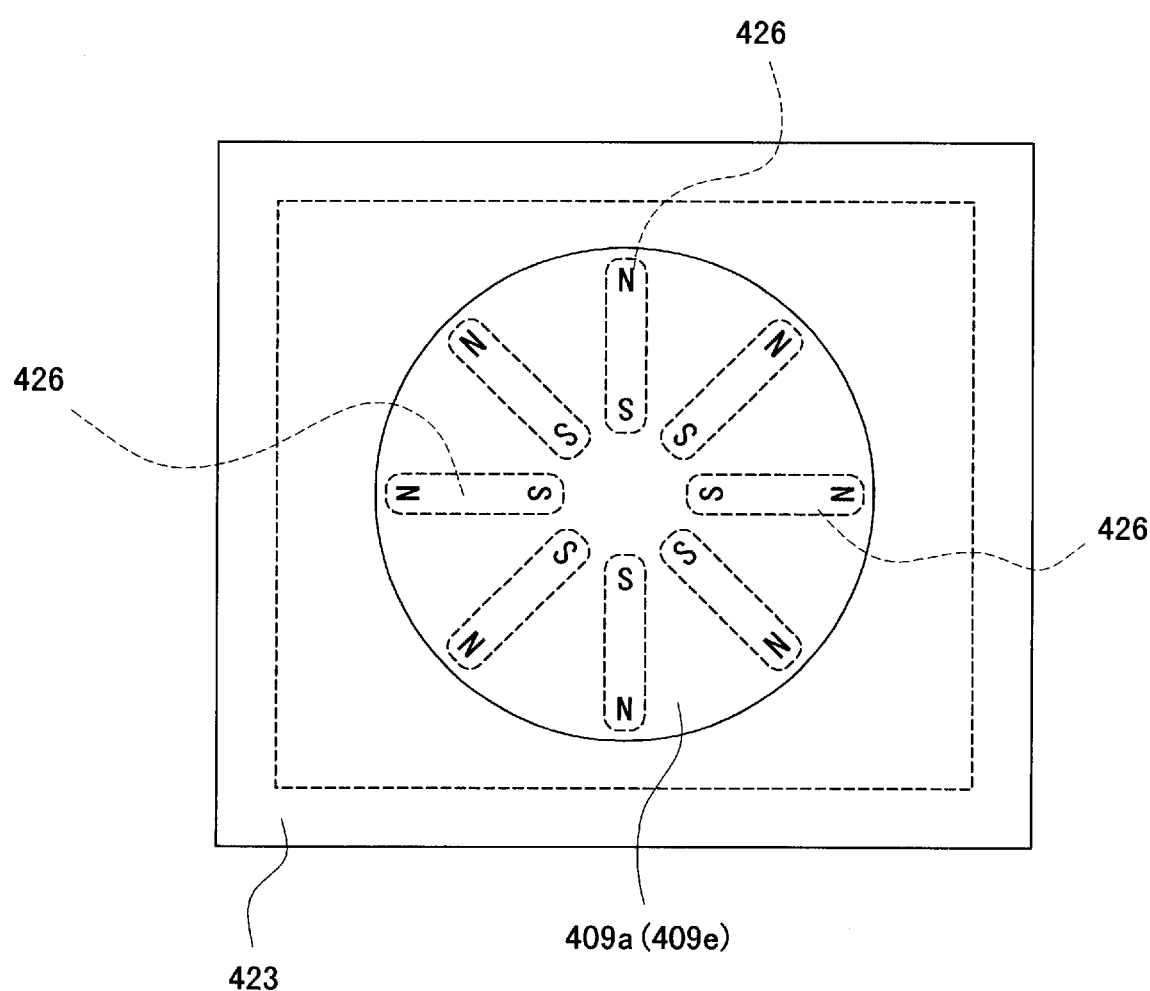
FIG. 27 is an explanatory view showing an array of permanent magnets suitable for the array of coils of FIG. 26 in the embodiment of FIG. 22.

FIG. 24 shows another embodiment of the deformable mirror 409 applicable to the focal-length adjusting unit of the present invention. In this embodiment, the substrate 409e is made with a ferromagnetic such as iron, and the thin film 409a as a reflecting film is made with aluminum. In this case, since the thin film coils need not be used, the structure is simple and the manufacturing cost can be reduced. If the power switch 413 is replaced with a changeover and power on-off switch, the directions of currents flowing through the coils 427 can be changed, and the configuration of the substrate 409e and the thin film 409a can be changed at will. FIG. 25 shows an array of the coils 427 in this embodiment, and FIG. 26 shows another array of the coils 427. These arrays are also applicable to the embodiment of FIG. 22. FIG. 27 shows an array of the permanent magnets 426 suitable for the array of the coils of FIG. 26 in the embodiment of FIG. 22. Specifically, when the permanent magnets 426, as shown in FIG. 27, are radially arranged, a delicate deformation can be provided to the substrate 409e and the thin film 409a in contrast with the embodiment of FIG. 22. As mentioned above, when the electromagnetic force is used to deform the substrate 409e and the thin film 409a (in the embodiments of FIGS. 22 and 24), there is the advantage that they can be driven at a lower voltage than in the case where the electrostatic force is used.

Some embodiments of the deformable mirror have been described, but as shown in FIG. 21, at least two kinds of forces may be used in order to deform the mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 28:
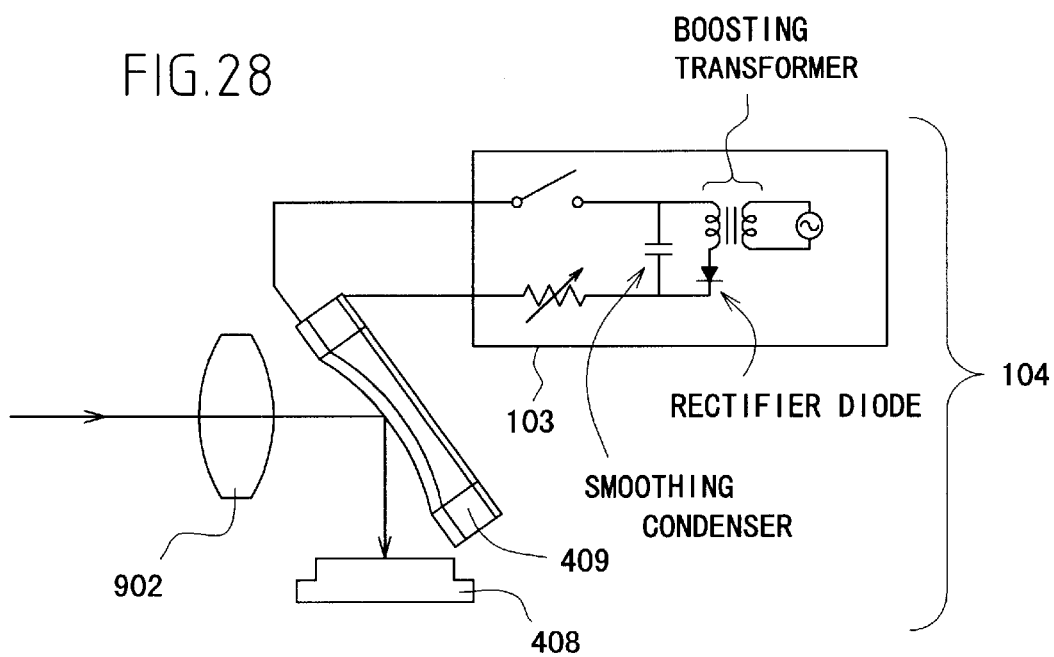
FIG. 28 is a view showing schematically an imaging system which uses the deformable mirror applicable to the focal-length adjusting unit in another embodiment of the present invention.

FIG. 28 shows an imaging system which uses the deformable mirror 409 applicable to the focal-length adjusting unit in another embodiment of the present invention, and which is used, for example, in a digital camera of a cellular phone, a capsule endoscope, an electronic endoscope, a digital camera for personal computers, or a digital camera for PDAs.

In the imaging system of this embodiment, one imaging unit 104 is constructed with the deformable mirror 409, the lens 902, the solid-state image sensor 408, and a control system 103. In the imaging unit 104 of the embodiment, light from an object passing through the lens 902 is condensed by the deformable mirror 409 and is imaged on the solid-state image sensor 408. The deformable mirror 409 is a kind of variable optical-property element and is also referred to as the variable focal-length mirror.

According to this embodiment, even when the object distance is changed, the deformable mirror 409 is deformed and thereby the object can be brought into a focus. The embodiment need not use the motor to move the lens and excels in compact and lightweight design and low power consumption. The imaging unit 104 can be used in any of the embodiments as the imaging system of the present invention. When a plurality of deformable mirrors 409 are used, a zoom or variable magnification imaging system or optical system can be constructed.

In FIG. 28, an example of a control system which includes the boosting circuit of a transformer using coils in the control system 103 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 29:
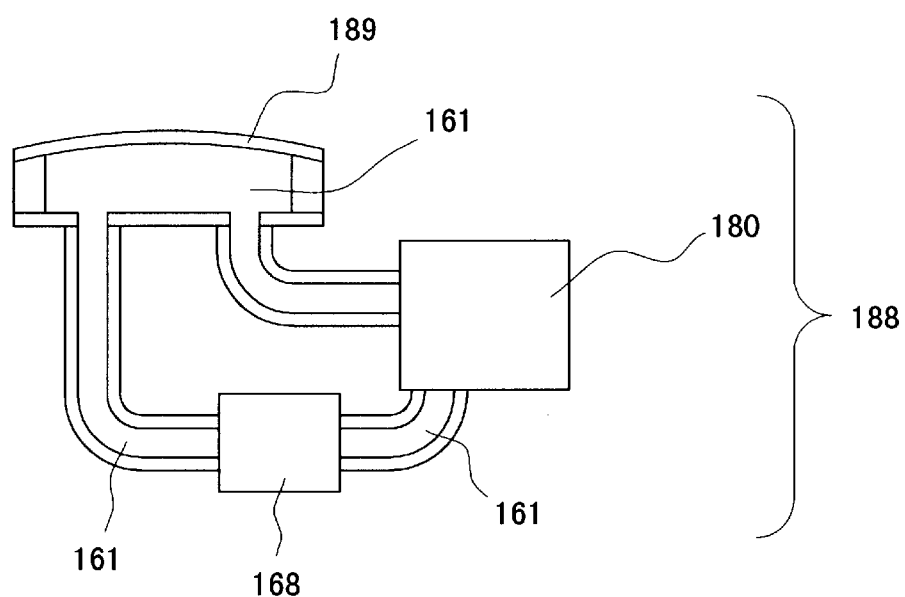
FIG. 29 is a view showing schematically another embodiment of the deformable mirror applicable to the focal-length adjusting unit of the present invention.

FIG. 29 shows a deformable mirror 188 in which a fluid 161 is taken in and out by a micropump 180 to deform the lens surface, in another embodiment of the deformable mirror applicable to the focal-length adjusting unit of the present invention. According to this embodiment, there is the merit that the lens surface can be considerably deformed.

The micropump 180 is a small-sized pump, for example, made by a micromachining technique and is constructed so that it is operated with an electric power. The fluid 161 is sandwiched between a reflecting surface 189 and the substrate. Reference numeral 168 denotes a liquid tank. The fluid 161 is sandwiched between a reflecting film 189 and the substrate. Reference numeral 168 denotes a liquid tank. As examples of pumps made by the micromachining technique, there are those which use thermal deformations, piezoelectric substances, and electrostatic forces.

Figure 30:
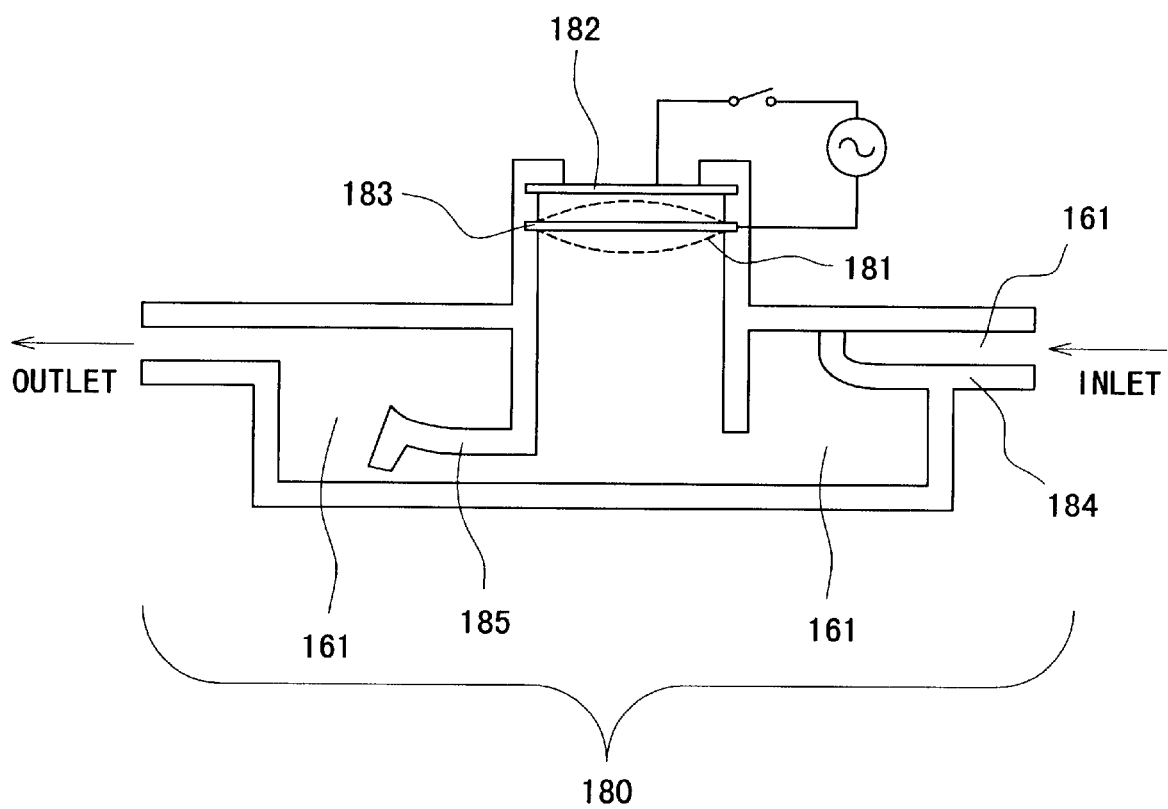
FIG. 30 is a view showing schematically one embodiment of a micropump applicable to the focal-length adjusting unit of the present invention.

FIG. 30 shows one embodiment of a micropump applicable to the focal-length adjusting unit of the present invention. In the micropump 180 of this embodiment, a vibrating plate 181 is vibrated by the electrostatic force or the electric force of the piezoelectric effect. In this figure, an example where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the deformable mirror 188 of this embodiment, the reflecting film 189 is deformed into a concave or convex surface in accordance with the amount of the fluid 161, and thereby the deformable mirror functions. The deformable mirror 181 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 28, it is desirable that the boosting transformer or the piezoelectric transformer is used to constitute the control system.

If the thin film 409a for reflection is also provided in a portion which is not deformed, it can be used as a reference surface when the profile of the deformable mirror is measured by an interferometer, which is convenient.

Figure 31:
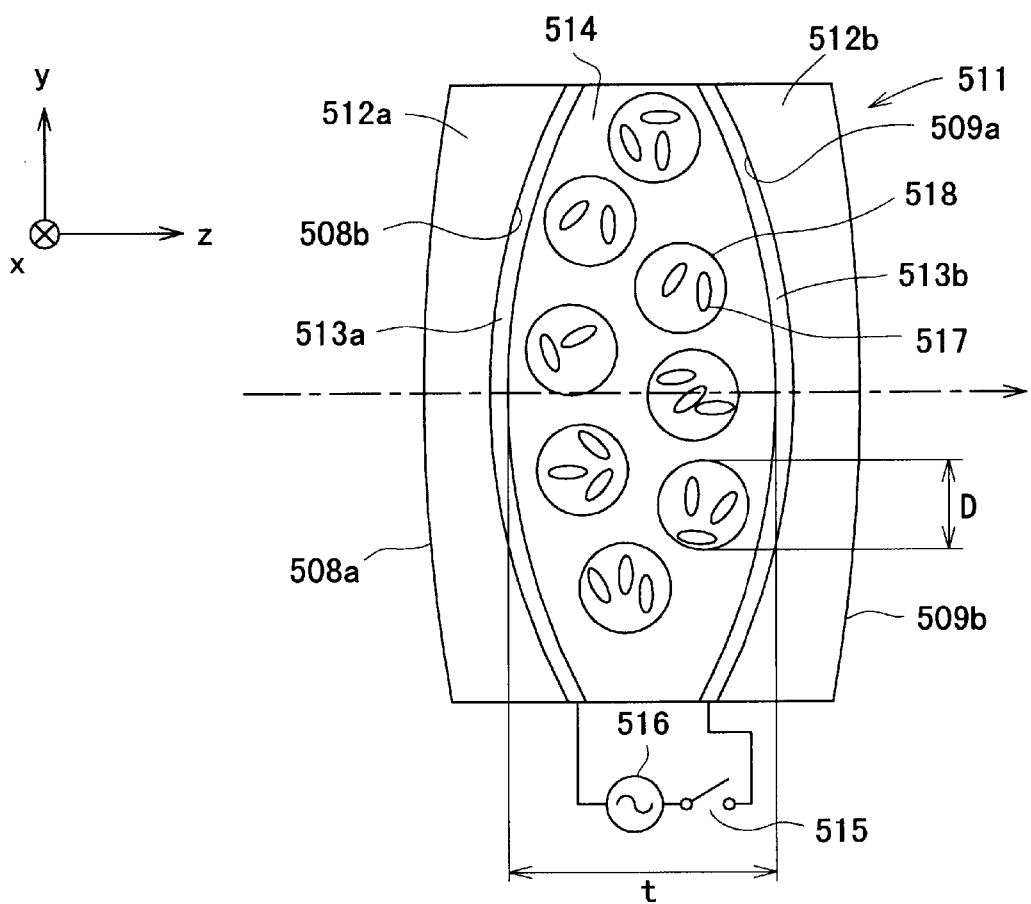
FIG. 31 is a view showing the principle of a variable focal-length lens applicable to the focal-length adjusting unit of the present invention.

Subsequently, reference is made to the variable focal-length lens applicable to the focal-length adjusting unit of the present invention. In FIG. 31, a variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and its volume is equal to the sum of volumes occupied by macromolecules and the liquid crystal molecules 517 which constitute the macromolecular cells 517.

Here, for the size of each of the macromolecular cells 518, for example, in the case of a sphere, when an average diameter is denoted by D and the wavelength of light used is denoted by λ, the average diameter D is chosen to satisfy the following condition:

$$2 \text{ nm} \leq D \leq \lambda/5 \tag{1}$$

That is, the size of each of the liquid crystal molecules 517 is at least about 2 nm and thus the lower limit of the average diameter D is set to 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference between the refractive indices of the macromolecules and the liquid crystal molecules 517 will cause light to be scattered at the interfaces of the macromolecular cells 518 and will render the liquid crystal layer 514 opaque. Hence, the upper limit of the diameter D should be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t.

Figure 32:
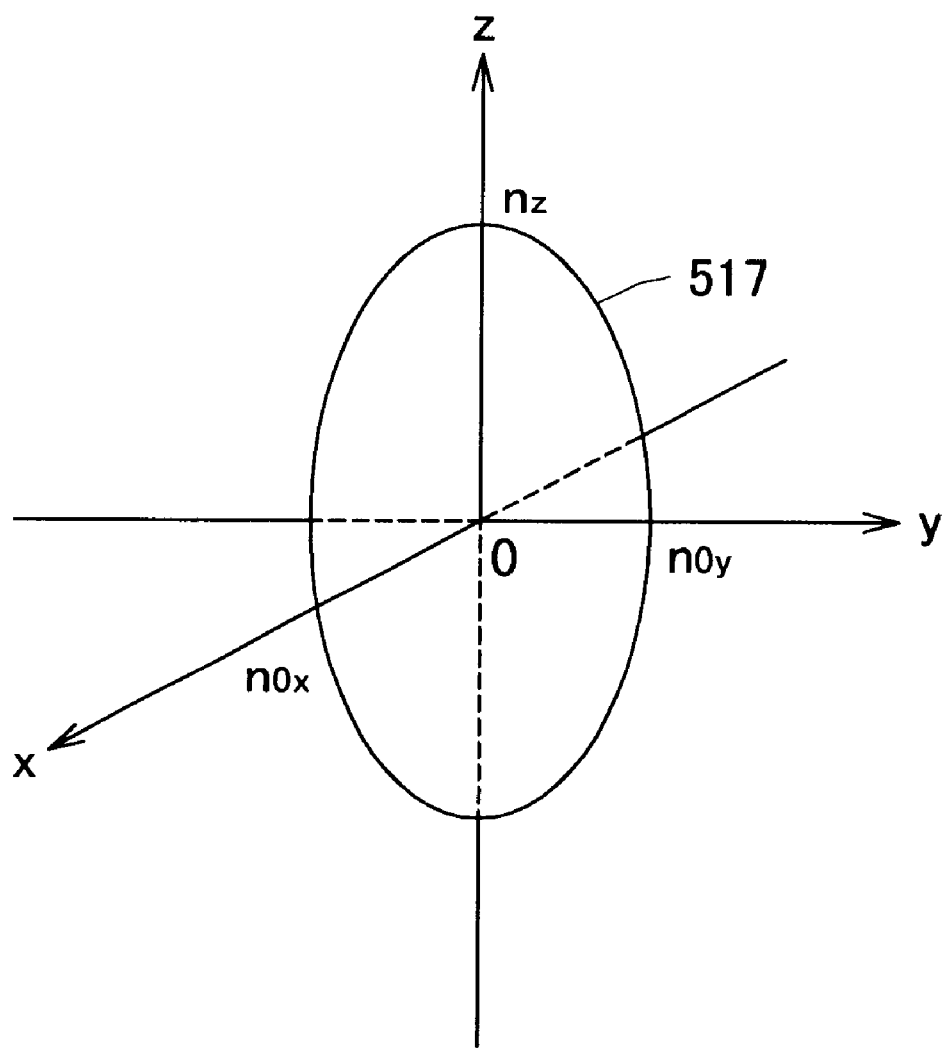
FIG. 32 is a view showing the index ellipsoid of a nematic liquid crystal of uniaxial anisotropy.

In the liquid crystal molecules 517, for example, uniaxial nematic liquid crystal molecules are used. The index ellipsoid of each of the liquid crystal molecules 517 is as shown in FIG. 32. That is, $$n_{ox} = n_{oy} = n_o \tag{2}$$

where $n_o$ is the refractive index of an ordinary ray and $n_{ox}$ and $n_{oy}$ are refractive indices in directions perpendicular to each other in a plane including ordinary rays.

Figure 33:
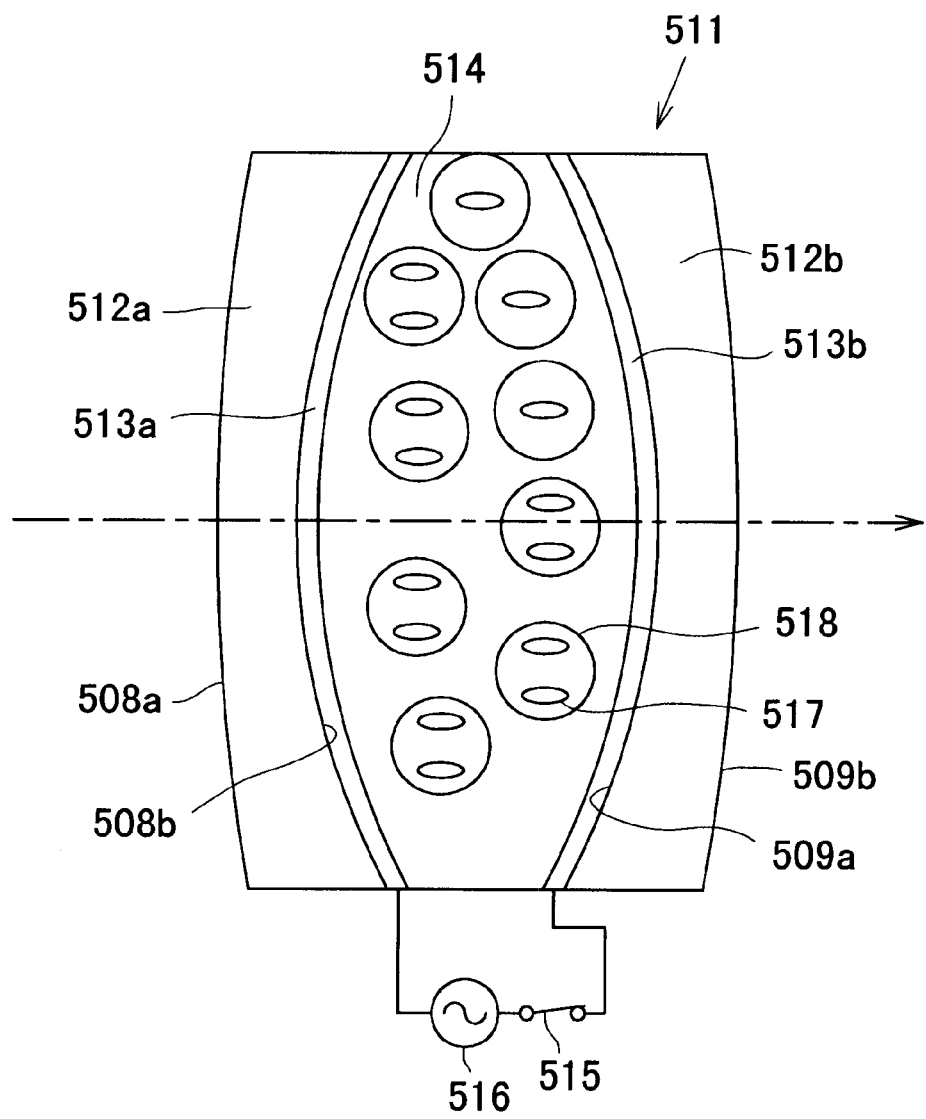
FIG. 33 is a view showing a state where an electric field is applied to a macromolecular dispersed liquid crystal layer in FIG. 31.

Here, in the case where the switch 515, as shown in FIG. 31 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 33, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 34:
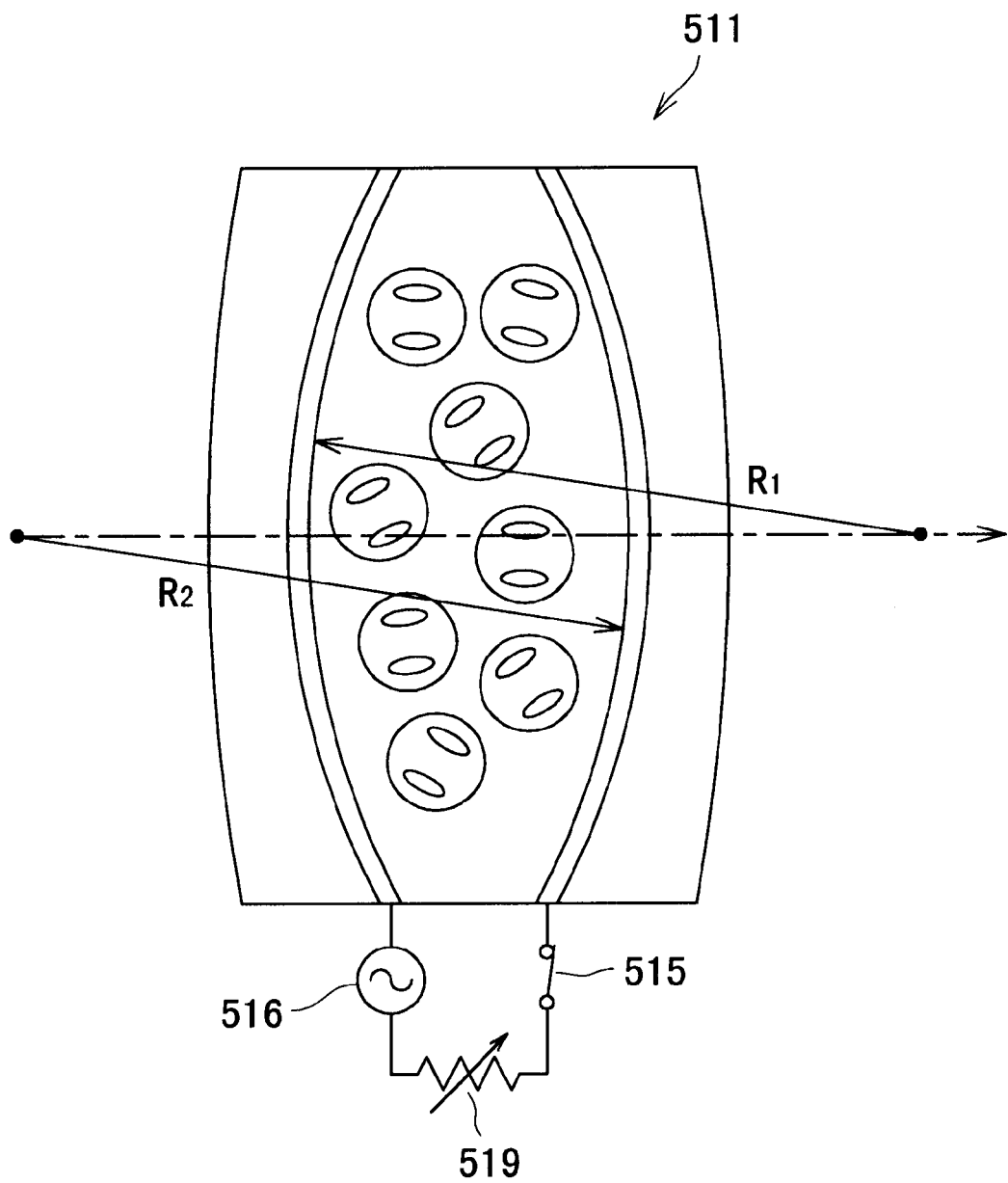
FIG. 34 is a view showing one example where a voltage applied to the macromolecular dispersed liquid crystal layer in FIG. 31 can be changed.

The voltage applied to the macromolecular dispersed liquid crystal layer 514, for example, as shown in FIG. 34, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 31, that is, in the case where the electric field is not applied to the macromolecular dispersed liquid crystal layer 514, when the refractive index in the direction of the major axis of the index ellipsoid, as shown in FIG. 32, is denoted by $n_z$, an average refractive index $n_{LC}'$ of the liquid crystal molecules 517 is roughly given by $$(n_{ox}+n_{oy}+n_z)/3 = n_{LC}' \tag{3}$$

Also, when the refractive index $n_z$ is expressed as a refractive index $n_e$ of an extraordinary ray, an average refractive index $n_{LC}$ where Equation (2) is established is given by $$(2n_o+n_e)/3 = n_{LC} \tag{4}$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1-ff)n_p \tag{5}$$

Thus, as shown in FIG. 34, when the radii of curvature of the inner surfaces of the lenses 512a and 512b, that is, the surfaces on the side of the liquid crystal layer 514, are represented by $R_1$ and $R_2$, a focal length $f_1$ of the variable focal-length lens 511 is given by $$1/f_1 = (n_A-1)(1/R_1 - 1/R_2) \tag{6}$$

Also, when the center of curvature is located on the image side, it is assumed that the radius of curvature $R_1$ or $R_2$ is positive. Refraction caused by the outer surface of each of the lenses 512a and 512b is omitted. That is, the focal length of the lens of only the liquid crystal layer 514 is given by Equation (6).

When the average refractive index of ordinary rays is expressed as $$(n_{ox}+n_{oy})/2 = n_o' \tag{7}$$

a refractive index $n_B$ of the liquid crystal layer 514 in the case of FIG. 33, namely, in the case where the electric field is applied to the liquid crystal layer 514, is given by $$n_B = ff \cdot n_o' + (1-ff)n_p \tag{8}$$

and thus a focal length $f_2$ of the lens of only the liquid crystal layer 514 in this case is given by $$1/f_2 = (n_B-1)(1/R_1 - 1/R_2) \tag{9}$$

Also, the focal length where a lower voltage than in FIG. 33 is applied to the liquid crystal layer 514 is a value between the focal length $f_1$ given by Equation (6) and the focal length $f_2$ by Equation (9).

From Equations (6) and (9), a change rate of the focal length by the liquid crystal layer 514 is given by $$|(f_2-f_1)/f_2| = |(n_B-n_A)/(n_B-1)| \tag{10}$$

Thus, in order to increase the change rate, it is only necessary to increase the value of $|(n_B-n_A)|$. Here, $$n_B - n_A = ff(n_o' - n_{LC}') \tag{11}$$

and hence if the value of $|n_o'-n_{LC}'|$ is increased, the change rate can be raised. Practically, since the refractive index $n_B$ is about 1.3–2, the value of $|n_o'-n_{LC}'|$ is chosen so as to satisfy the following condition:

$$0.01 \leq |n_o'-n_{LC}'| \leq 10 \tag{12}$$

In this way, when ff=0.5, the focal length obtained by the liquid crystal layer 514 can be changed by at least 0.5%, and thus an effective variable focal-length lens can be realized. Also, the value of $|n_o'-n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leq \lambda \cdot 15 \, \mu m \tag{13}$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, the values of the refractive indices $n_o'$ and $n_p$ are different from each other, the transmittance of the liquid crystal layer 514 will be degraded. In FIGS. 31 and 33, the transmittance of the liquid crystal layer 514 is improved on an average when the liquid crystal layer 514 satisfies the following equation:

$$n_p = (n_o' + n_{LC}')/2 \tag{14}$$

The variable focal-length lens 511 is used as a lens, and thus in both FIGS. 31 and 33, it is desirable that the transmittances are almost the same and high. For this, although there is a limit to the substances of the macromolecules and the liquid crystal molecules 517 constituting the macromolecular cells 518, it is only necessary, in practical use, to satisfy the following condition:

$$n_o' \leq n_p \leq n_{LC}' \tag{15}$$

When Equation (14) is satisfied, Condition (13) is moderated and it is only necessary to satisfy the following condition:

$$D \cdot t \leq \lambda \cdot 60 \, \mu m \tag{16}$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \ \mu m \cdot (1.585 - 1.45)^2 / (n_u - n_p)^2 \quad (17)$$

where $(n_u - n_p)^2$ is a value when one of $(n_{LC}' - n_p)^2$ and $(n_o' - n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq f\!f \leq 0.999 \quad (18)$$

On the other hand, the transmittance τ improves as the ratio ff becomes low, and hence Condition (17) may be moderated, preferably, as follows:

$$4 \times 10^{-6} [\mu m]^2 \leq D \cdot t \leq \lambda \cdot 45 \ \mu m \cdot (1.585 - 1.45)^2 / (n_u - n_p)^2 \quad (19)$$

Also, the lower limit of the thickness t, as is obvious from FIG. 31, corresponds to the diameter D, which is at least 2 nm as described above, and therefore the lower limit of D·t becomes $(2 \times 10^{-3} \ \mu m)^2$, namely $4 \times 10^{-6} \ [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's formula of reflection. As such, in practical use, the diameter D must be chosen so as to satisfy the following condition:

$$7 \ nm \leq D \leq 500\lambda \quad (20)$$

Figure 35:
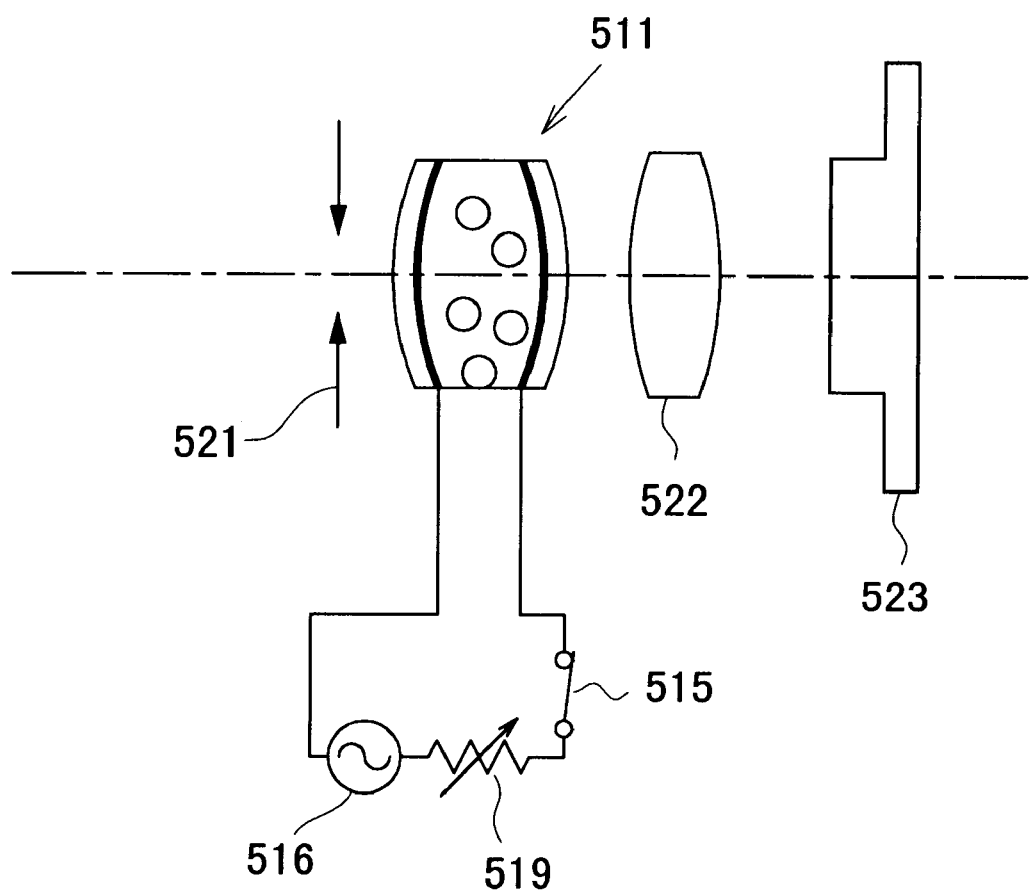
FIG. 35 is a view showing one example of an imaging optical system for digital cameras which uses a variable focal-length lens applicable to the focal-length adjusting unit of the present invention.

FIG. 35 shows an imaging optical system for digital cameras using the variable focal-length lens 511 of FIG. 34. In this imaging optical system, an image of an object (not shown) is formed on a solid-state image sensor 523, such as a CCD, through a stop 521, the variable focal-length lens 511, and a lens 522. Also, in FIG. 35, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens. Whereby, without moving the variable focal-length lens 511 and the lens 522 along the optical axis, it becomes possible to perform continuous focusing with respect to the object distance, for example, from the infinity to 600 nm.

Figure 36:
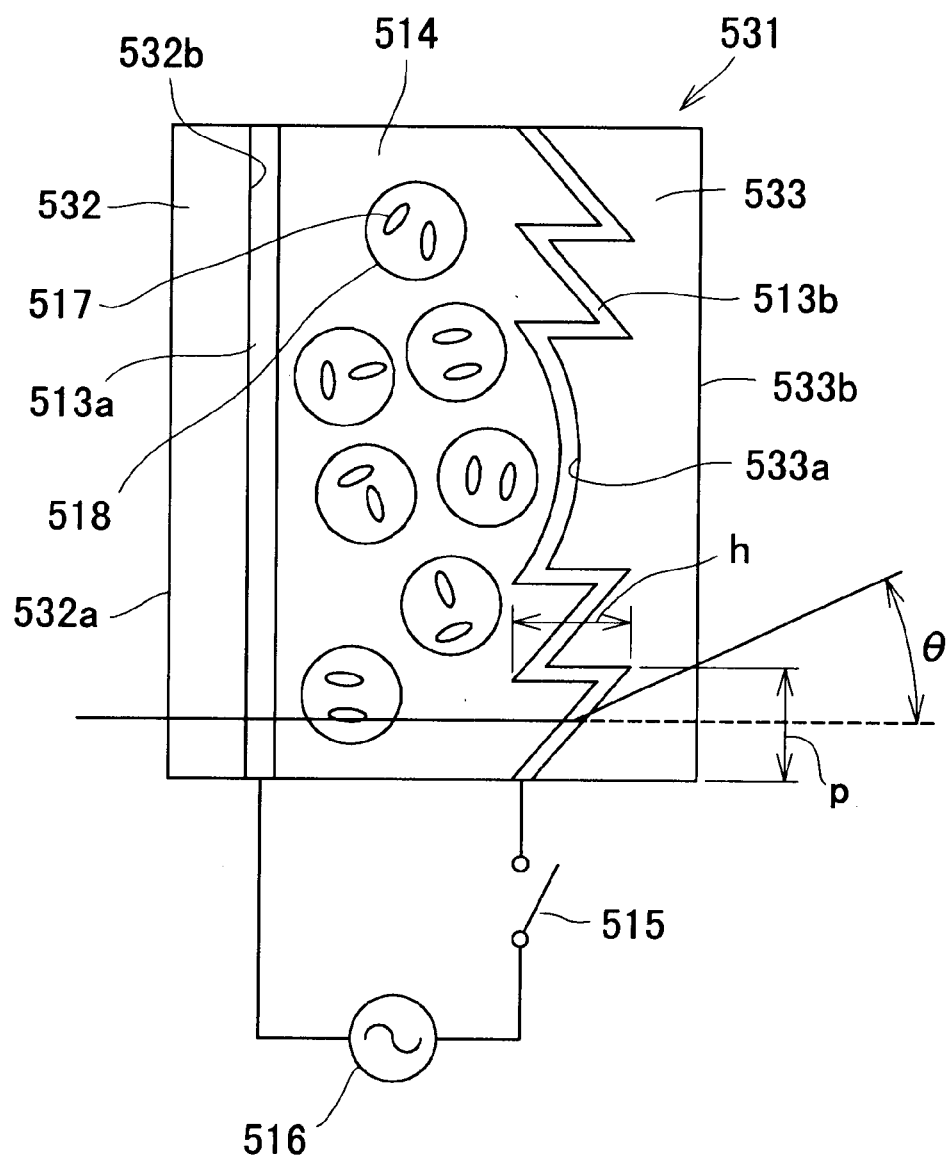
FIG. 36 is a view showing one example of a variable focal-length diffraction optical element applicable to the focal-length adjusting unit of the present invention.

FIG. 36 shows one example of a variable focal-length diffraction optical element applicable to the focal-length adjusting unit of the present invention. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 31, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current electric field is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m\lambda \quad (21)$$

and emerges therefrom. When the depth of the groove is denoted by h, the refractive index of the transparent substrate 533 is denoted by $n_{33}$, and an integer is denoted by k, a diffraction efficiency becomes 100% at a wavelength λ and the production of flare can be prevented by satisfying the following equations:

$$h(n_A - n_{33}) = m\lambda \quad (22)$$

$$h(n_B - n_{33}) = k\lambda \quad (23)$$

Here, the difference in both sides between Equations (22) and (23) is given by $$h(n_A - n_B) = (m-k)\lambda \quad (24)$$

Therefore, when it is assumed that λ=500 nm, $n_A$=1.55, and $n_B$=1.5, $$0.05 \ h = (m-k) \cdot 500 \ nm$$

and when m=1 and k=0, $$h = 10000 \ nm = 10 \ \mu m$$

In this case, the refractive index $n_{33}$ of the transparent substrate 533 is obtained as 1.5 from Equation (22). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In the embodiment, it is only necessary that Equations (22)–(24) are set in practical use to satisfy the following conditions:

$$0.7 \ m\lambda \leq h(n_A - n_{33}) \leq 1.4 \ m\lambda \quad (25)$$

$$0.7 \ k\lambda \leq h(n_A - n_{33}) \leq 1.4 \ k\lambda \quad (26)$$

$$0.7(m-k)\lambda \leq h(n_A - n_B) \leq 1.4(m-k) \qquad (27)$$

A variable focal-length lens using a twisted nematic liquid crystal is also available. FIGS. 37 and 38 show variable focal-length spectacles 550 in this case. A variable focal-length lens 551 has lenses 552 and 553, orientation films 539a and 539b provided through transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that an alternating-current electric field is applied to the twisted nematic liquid crystal layer 554.

In this structure, when the voltage applied to the twisted nematic liquid crystal layer 554 is increased, liquid crystal molecules 555, as illustrated in FIG. 38, exhibit a homeotropic orientation, in which the refractive index of the liquid crystal layer 554 is lower and the focal length is longer than in a twisted nematic condition of FIG. 37 in which the applied voltage is low.

A spiral pitch P of the liquid crystal molecules 555 in the twisted nematic condition of FIG. 37 must be made nearly equal to, or much smaller than, the wavelength $\lambda$ of light, and thus is set to satisfy the following condition:

$$2 \text{ nm} \leq P \leq 2 \lambda/3 \qquad (28)$$

Also, the lower limit of this condition depends on the sizes of the liquid crystal molecules, while the upper limit is necessary for the behavior of the liquid crystal layer 554 as an isotropic medium under the condition of FIG. 37 when incident light is natural light. If the upper limit of the condition is overstepped, the variable focal-length lens 551 is changed to a lens in which the focal length varies with the direction of deflection. Hence, a double image is formed and only a blurred image is obtained.

Figure 39A:
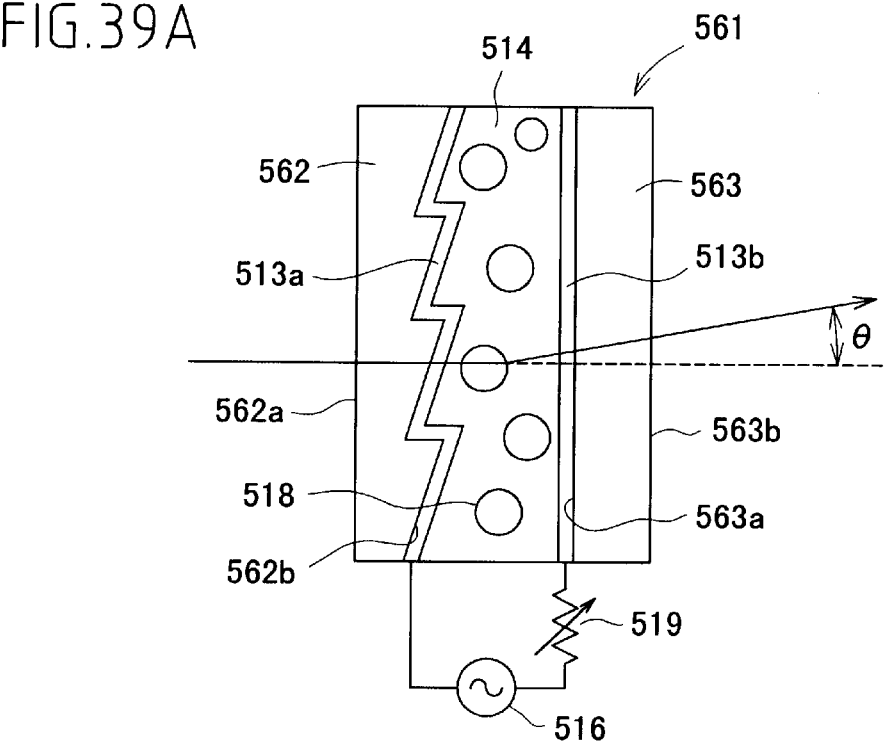
FIGS. 39A and 39B are views showing two examples of variable deflection-angle prisms, each of which is applicable to the focal-length adjusting unit of the present invention.
Figure 39B:
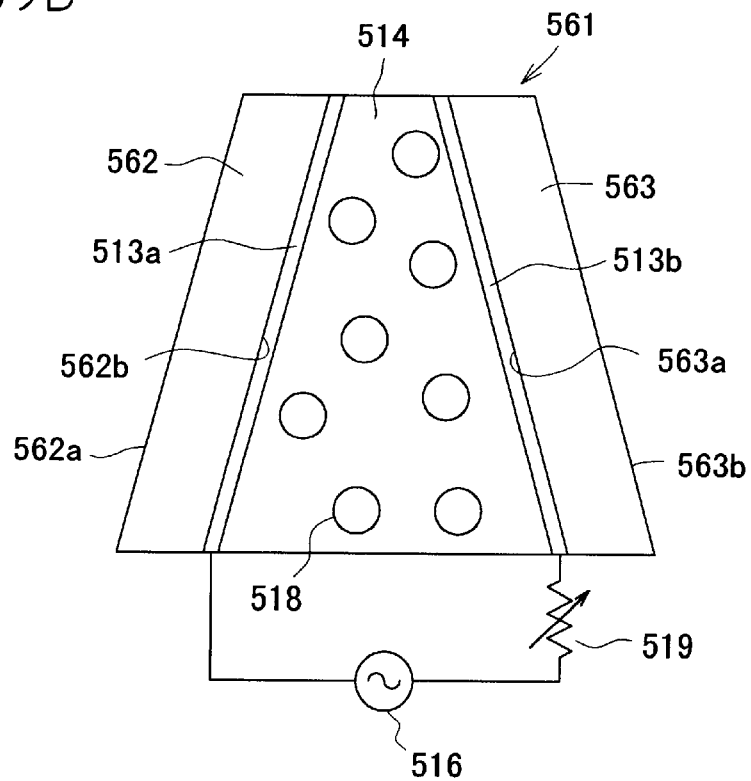

FIG. 39A shows a variable deflection-angle prism applicable to the focal-length adjusting unit of the present invention. A variable deflection-angle prism 561 includes a first transparent substrate prism 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 31, is provided, through the transparent electrodes 513a and 513b, between the transparent substrate 562 and the transparent substrate 563 on the exit side. The transparent electrodes 513a and 513b are connected to the alternating-current power supply 516 through the variable resistor 519. Whereby, the alternating-current electric field is applied to the liquid crystal layer 514 so that the deflection angle of light transmitted through the variable deflection-angle prism 561 is controlled. Also, in FIG. 39A, the inner surface 562b of the transparent substrate 562 is configured into the Fresnel form, but as shown in FIG. 39B, the inner surfaces of the transparent substrates 562 and 563 may be configured into the shape of an ordinary prism whose surfaces are relatively inclined, or may be configured into a diffraction grating shape shown in FIG. 36. In the case of the latter, Equations (21)–(24) and Conditions (25)–(27) are also applied.

Figure 40:
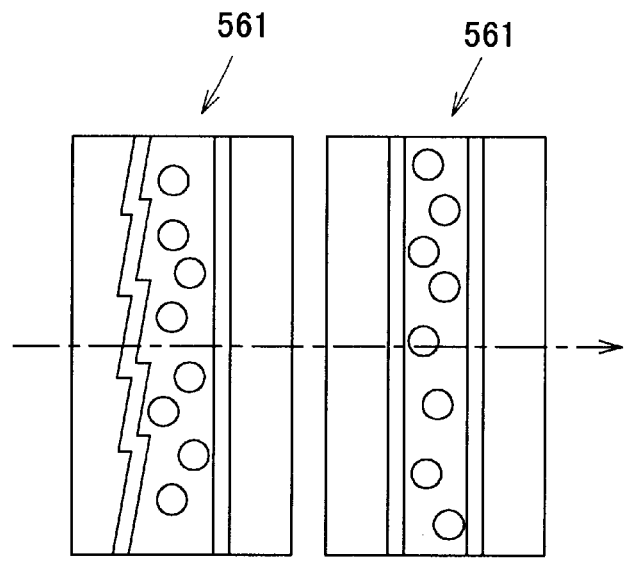
FIG. 40 is a view for explaining the applications of the variable deflection-angle prisms shown in FIGS. 39A and 39B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical, but in order to further improve its performance, it is desirable that two variable deflection-angle prisms 561 are arranged so that the direction of deflection is varied and as shown in FIG. 40, the refraction angle is changed in vertical and lateral directions. Also, in FIGS. 39A, 39B, and 40, the liquid crystal molecules are not shown.

Figure 41:
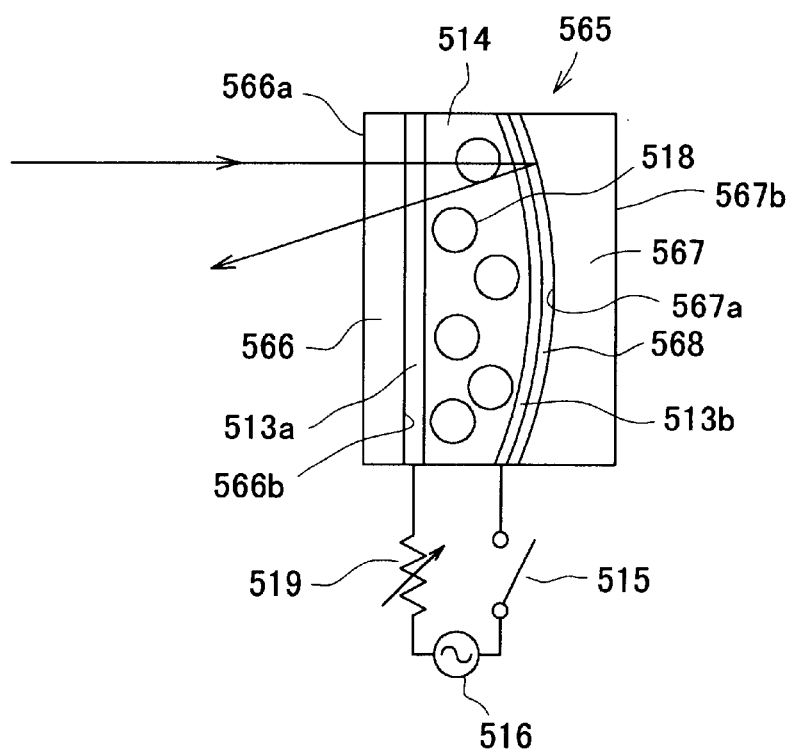
FIG. 41 is a view showing one example of a variable focal-length mirror as the variable focal-length lens applicable to the focal-length adjusting unit of the present invention.

FIG. 41 shows a variable focal-length mirror as the variable focal-length lens applicable to the focal-length adjusting unit of the present invention. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited and the transparent electrode 513b is provided on the reflecting film 568. Between the transparent electrodes 513a and 513b, as in FIG. 31, the macromolecular dispersed liquid crystal layer 514 is sandwiched so that the transparent electrodes 513a and 513b are connected to the alternating-current power supply 516 through the switch 515 and the variable resistor 519, and the alternating-current electric field is applied to the macromolecular dispersed liquid crystal layer 514. Also, in FIG. 41, the liquid crystal molecules are not shown.

According to the above structure, since a ray of light incident on the transparent substrate 566 is passed again through the liquid crystal layer 514 by the reflecting film 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, Conditions mentioned above can be used. Moreover, the inner surface of the transparent substrate 566 or 567, as shown in FIG. 36, can also be configured into the diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 512a and 512b, the transparent substrate 532, the lens 538, one of the lenses 552 and 553, the transparent substrate 563 of FIG. 39A, one of the transparent substrates 562 an 563 of FIG. 39B, or one of the transparent substrates 566 and 567 may be eliminated.

Figure 42:
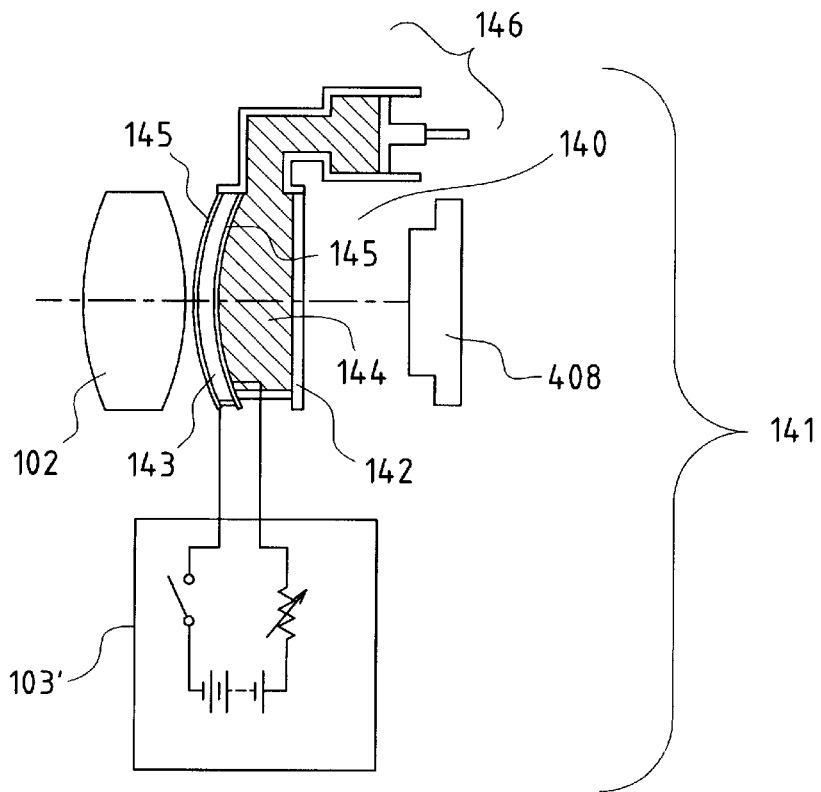
FIG. 42 is a view showing schematically an imaging unit, in another embodiment, applicable to the focal-length adjusting unit of the present invention.

FIG. 42 shows an imaging unit 141 using a variable focal-length lens 140, in another embodiment, applicable to the focal-length adjusting unit of the present invention. The imaging unit 141 can be used as the imaging system of the present invention.

In this embodiment, a lens 102 and the variable focal-length lens 140 constitute an imaging lens, and the imaging lens and the solid-state image sensor 408 constitute the imaging unit 141. The variable focal-length lens 140 is constructed with a light-transmitting fluid or jelly-like substance 144 sandwiched between a transparent member 142 and a soft transparent substance 143 such as piezoelectric synthetic resin.

As the fluid or jelly-like substance 144, silicon oil, elastic rubber, jelly, or water can be used. Transparent electrodes 145 are provided on both surfaces of the transparent substance 143, and when the voltage is applied through a circuit 103', the transparent substance 143 is deformed by the piezoelectric effect of the transparent substance 143 so that the focal length of the variable focal-length lens 140 is changed.

Thus, according to the embodiment, even when the object distance is changed, focusing can be performed without moving the optical system with a motor, and as such the embodiment excels in compact and lightweight design and low power consumption.

In FIG. 42, reference numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the deformable mirror surface, which is favorable. It is good practice to use a transparent piezoelectric substance for the variable focal-length lens.

Figure 43:
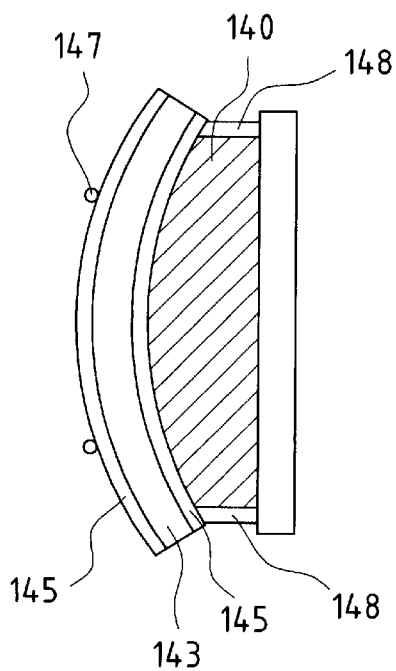
FIG. 43 is an explanatory view showing a modified example of the variable focal-length lens in the embodiment of FIG. 42.

In FIG. 42, instead of using the cylinder 146, the variable focal-length lens 140, as shown in FIG. 43, may be designed to use supporting members 147.

Figure 44:
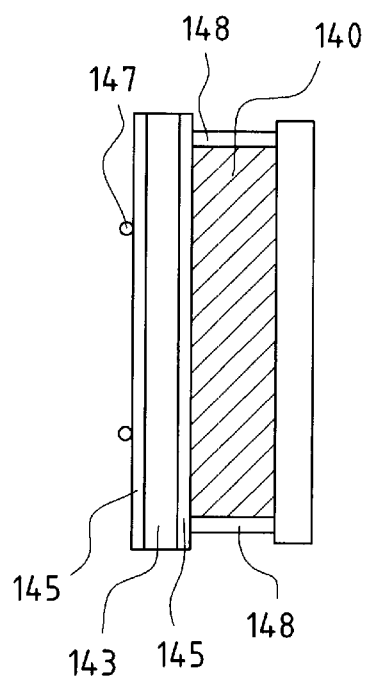
FIG. 44 is an explanatory view showing a state where the variable focal-length lens of FIG. 43 is deformed.

The supporting members 147 are designed to fix the periphery of a part of the transparent substance 143 sandwiched between the transparent electrodes 145. According to the embodiment, even when the voltage is applied to the transparent substance 143 and thereby the transparent substance 143 is deformed, as shown in FIG. 44, the volume of the entire variable focal-length lens 140 remains unchanged. As such, the cylinder 146 becomes unnecessary. Also, in FIGS. 43 and 44, reference numeral 148 designates a deformable member, which is made with an elastic body, accordion-shaped synthetic resin, or metal.

In each of the examples shown in FIGS. 42 and 43, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 45:
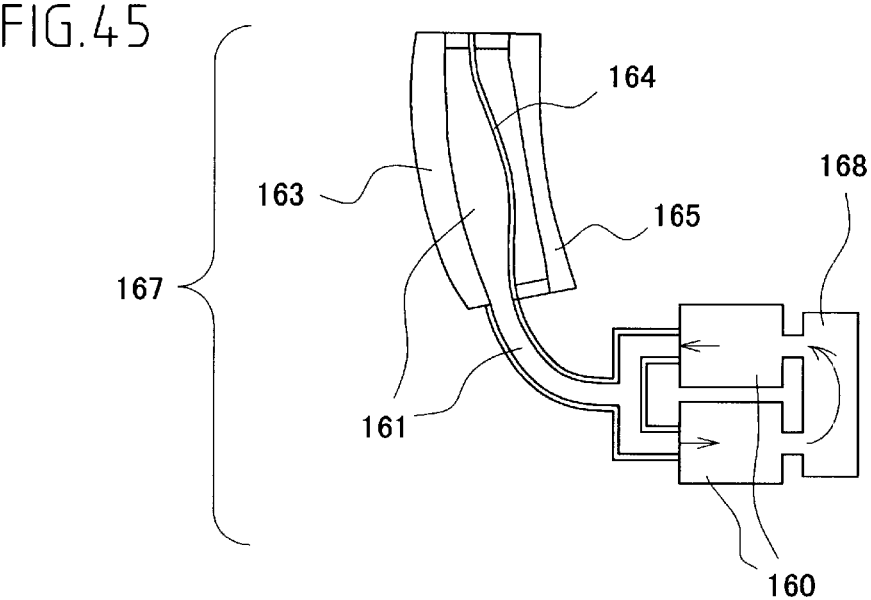
FIG. 45 is a view showing schematically another embodiment of a variable focal-length lens applicable to the focal-length adjusting unit of the present invention.

FIG. 45 shows a variable focal-length lens 162 in which the fluid 161 is taken in and out by a micropump 160 to deform the lens surface, in another embodiment of the variable focal-length lens applicable to the focal-length adjusting unit of the present invention.

The micropump 160 is a small-sized pump, for example, made by a micromachining technique and is constructed so that it is operated with an electric power. The fluid 161 is sandwiched between a transparent substrate 163 and an elastic body 164. In FIG. 45, reference numeral 165 represents a transparent substrate for protecting the elastic body 164 and this substrate is not necessarily required.

As examples of pumps made by the micromachining technique, there are those which use thermal deformations, piezoelectric substances, and electrostatic forces.

It is only necessary to use the micropump 180 shown in FIG. 30 as two micropumps, for example, as in the micropump 160 used in the variable focal-length lens 167 of FIG. 45.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 46:
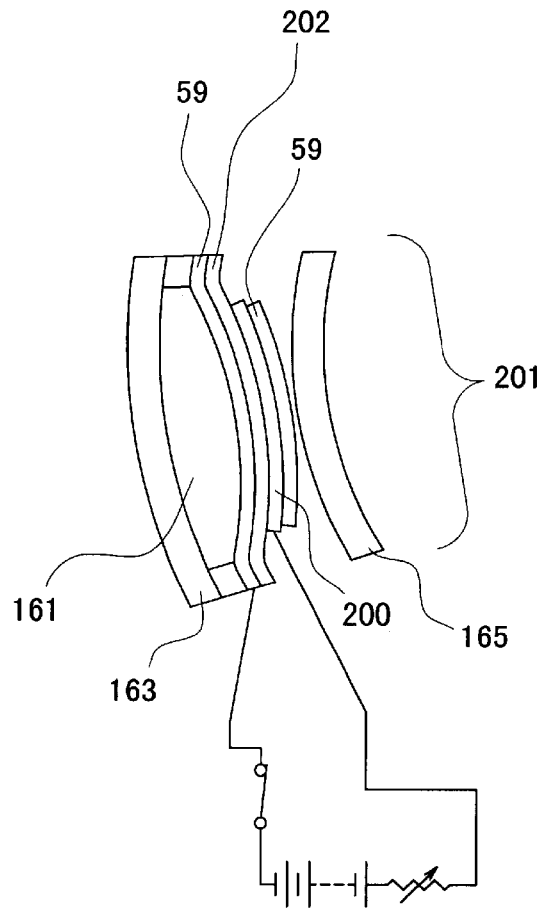
FIG. 46 is a view showing schematically a variable focal-length lens, in another embodiment, of a variable optical-property element applicable to the focal-length adjusting unit of the present invention.

FIG. 46 shows a variable focal-length lens 201 using a piezoelectric substance 200 in another embodiment of a variable optical-property element applicable to the focal-length adjusting unit of the present invention.

The same substance as the transparent substance 143 is used for the piezoelectric substance 200, which is provided on a soft transparent substrate 202. It is desirable that synthetic resin or an organic substance is used for the substrate 202.

In this embodiment, the voltage is applied to the piezoelectric substance 200 through two transparent electrodes 59, and thereby the piezoelectric substance 200 is deformed so that the function of a convex lens is exercised in FIG. 46.

Figure 47:
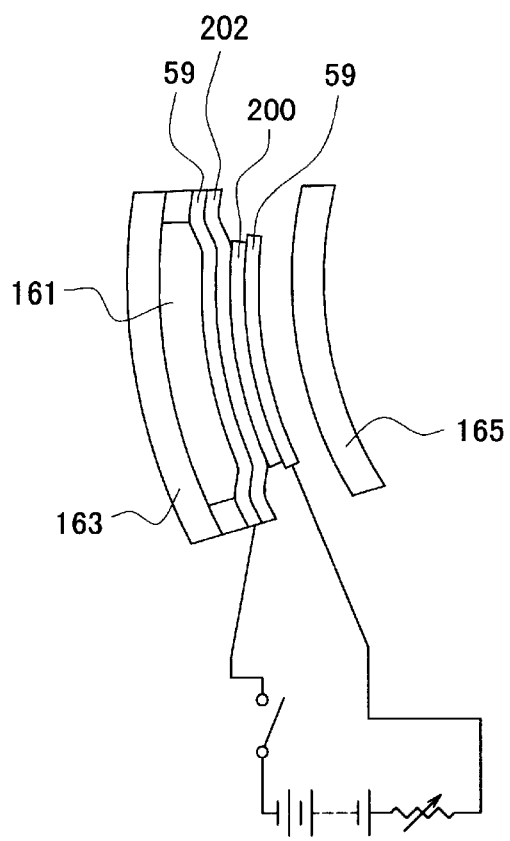
FIG. 47 is an explanatory view showing a state where the variable focal-length lens of FIG. 46 is deformed.

The substrate 202 is previously configured into a convex form, and at least one of the two transparent electrodes 59 is caused to differ in size from the substrate 202, for example, one electrode 59 is made smaller than the substrate 202. In doing so, when the applied voltage is removed, the opposite, preset portions of the two transparent electrodes 59, as shown in FIG. 47, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

The embodiment has the great merit that a portion of the substrate retaining the fluid 161 is deformed by the piezoelectric substance so as to dispense with the liquid tank 168. The transparent substrates 163 and 165 may be constructed with lenses or plane surfaces, and the same may be said of the embodiment of FIG. 45.

Figure 48:
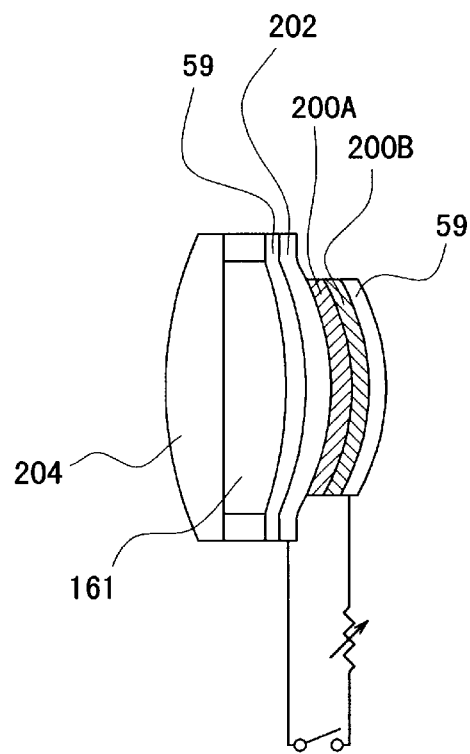
FIG. 48 is a view showing schematically a variable focal-length lens, in still another embodiment, of the variable optical-property element applicable to the focal-length adjusting unit of the present invention.

FIG. 48 shows a variable focal-length lens using two thin plates 200A and 200B made with piezoelectric substances in still another embodiment of the variable optical-property element applicable to the focal-length adjusting unit of the present invention.

The variable focal-length lens of this embodiment has the merit that the thin plate 200A is reversed in direction of the substance with respect to the thin plate 200B, and thereby the amount of deformation is increased so that a wide variable focal-length range can be obtained. Also, in FIG. 48, reference numeral 204 denotes a lens-shaped transparent substrate.

Even in the embodiment, the transparent electrode 59 on the right side of the figure is configured to be smaller than the substrate 202.

In the embodiments of FIGS. 46-48, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 49:
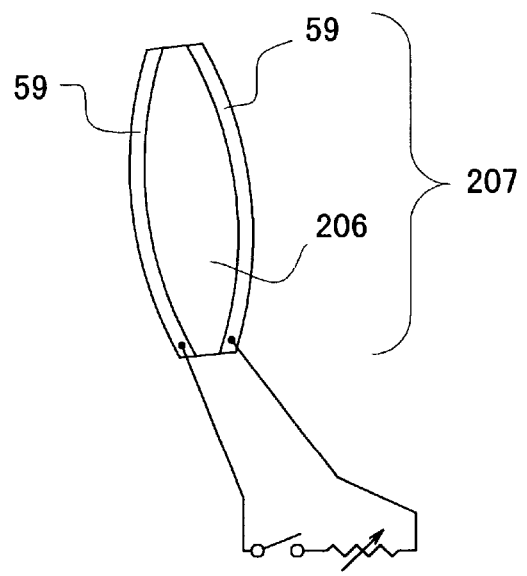
FIG. 49 is a view showing schematically another embodiment of the variable focal-length lens applicable to the focal-length adjusting unit of the present invention.

FIG. 49 shows another embodiment of the variable focal-length lens applicable to the focal-length adjusting unit of the present invention. A variable focal-length lens 207 of this embodiment uses an electrostrictive substance 206 such as silicon rubber or acrylic elastomer.

Figure 50:
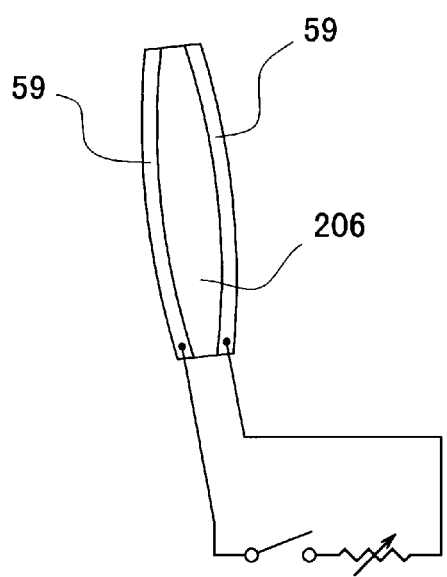
FIG. 50 is an explanatory view showing the deformation of the variable focal-length lens in the embodiment of FIG. 49.

According to the embodiment, when the voltage is low, the electrostrictive substance 206, as depicted in FIG. 49, acts as a convex lens, while when the voltage is increased, the electrostrictive substance 206, as depicted in FIG. 50, expands in a vertical direction and contracts in a lateral direction, and thus the focal length is increased. In this way, the electrostrictive substance 206 operates as the variable focal-length lens. According to the variable focal-length lens of the embodiment, there is the merit that since a large power supply is not required, power consumption is minimized.

Figure 51:
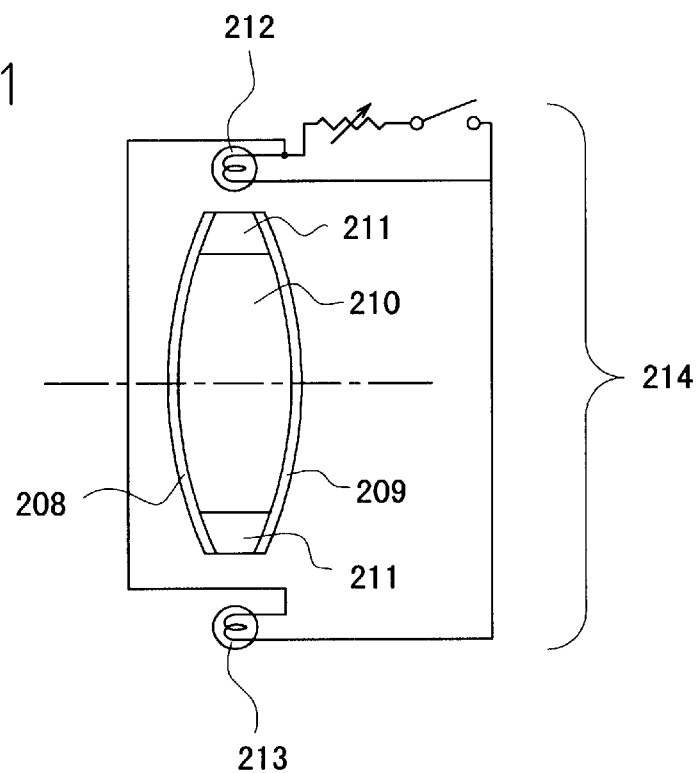
FIG. 51 is a view showing schematically a variable focal-length lens, in a further embodiment, of the variable optical-property element applicable to the focal-length adjusting unit of the present invention.

FIG. 51 shows a variable focal-length lens using a photonical effect in a further embodiment of the variable optical-property element applicable to the focal-length adjusting unit of the present invention. A variable focal-length lens 214 of this embodiment is designed so that azobenzene 210 is sandwiched between transparent elastic bodies 208 and 209 and is irradiated with ultraviolet light through a transparent spacer 211. In FIG. 51, reference numerals 212 and 213 represent ultraviolet light sources, such as ultraviolet LEDs or ultraviolet semiconductor lasers, of central wavelengths $\lambda_1$ and $\lambda_2$, respectively.

Figure 52A:
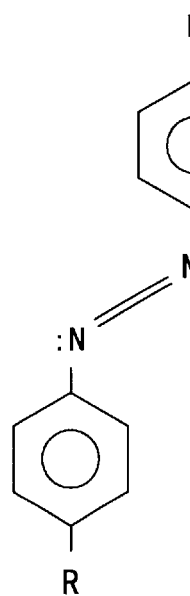
FIGS. 52A and 52B are explanatory views showing the structures of azobenzene used in the variable focal-length lens in the embodiment of FIG. 51.
Figure 52B:
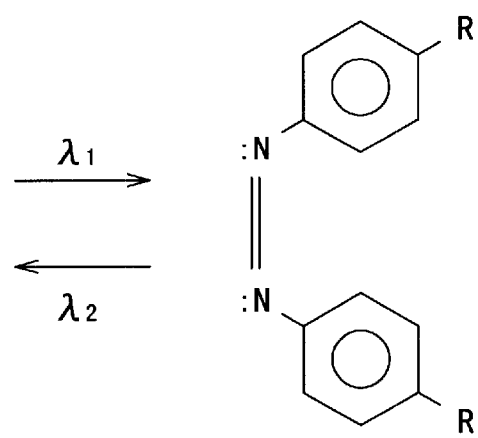

In the embodiment, trans-type azobenzene 210 shown in FIG. 52A, when irradiated with ultraviolet light of the central wavelength $\lambda_1$, changes to cis-type azobenzene shown in FIG. 52B to reduce its volume. Consequently, the thickness of the variable focal-length lens 214 is decreased, and the function of the convex lens is impaired.

On the other hand, when the cis-type azobenzene 210 is irradiated with ultraviolet light of the central wavelength $\lambda_2$, it changes to the trans-type azobenzene to increase the volume. Consequently, the thickness of the variable focal-length lens 214 is increased, and the function of the convex lens is improved.

In this way, the optical element 214 of the embodiment acts as the variable focal-length lens. In the variable focal-length lens 214, since the ultraviolet light is totally reflected at interface between each of the transparent elastic bodies 208 and 209 and air, the light does not leak through the exterior and high efficiency is obtained.

In the variable focal-length lens of each of the embodiments mentioned above, each of the transparent electrodes 145, 59, 508a, 509a, 513a, and 513b may be divided into a plurality of segments. By applying different voltages to individual divided transparent electrodes, it becomes possible to carry out not only the focusing, zoom, and magnification change of the optical apparatus, but also shake compensation, compensation for degradation of optical performance by manufacturing errors, and correction for aberration.

Subsequently, a description will be given of examples of various division patterns of the transparent electrode used in the variable focal-length lens applicable to the focal-length adjusting unit of the present invention, with reference to FIGS. 53–56.

Figure 53:
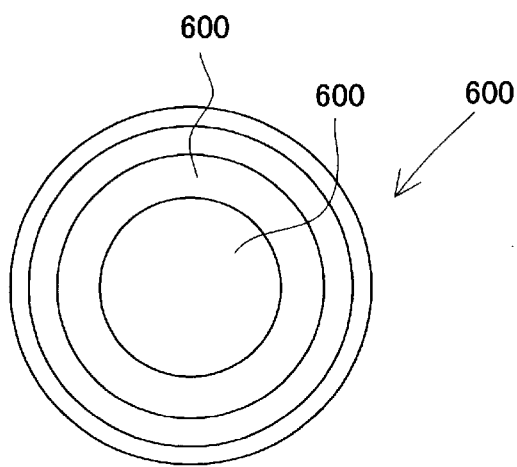
FIG. 53 is an explanatory view showing one example of division of a transparent electrode used in the variable focal-length lens applicable to the focal-length adjusting unit of the present invention.

FIG. 53 shows an example where a transparent electrode 600 is concentrically divided. A zone narrows progressively in going from the center to the periphery. It is for this reason that correction for aberration is facilitated.

Figure 54:
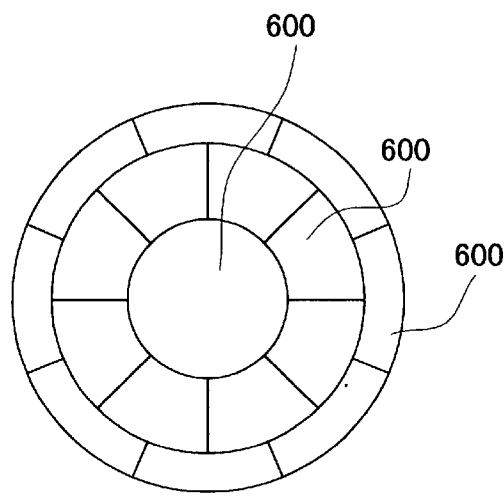
FIG. 54 is an explanatory view showing another example of division of a transparent electrode used in the variable focal-length lens applicable to the focal-length adjusting unit of the present invention.

In FIG. 54, each zone is further divided so that three boundaries of the electrodes are converged. By doing so, the shape of the piezoelectric substance 200 is smoothly changed, and hence a lens with less aberration is obtained.

Figure 55:
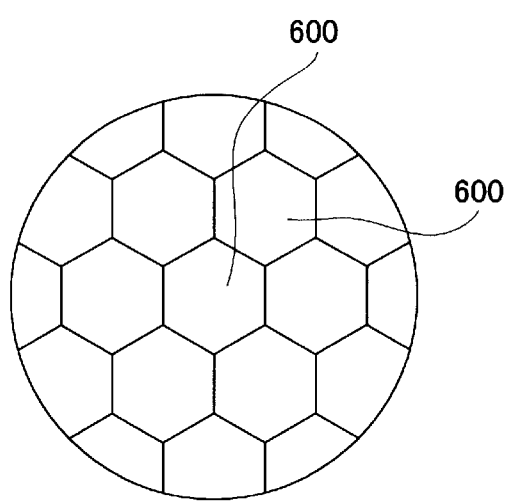
FIG. 55 is an explanatory view showing still another example of division of a transparent electrode used in the variable focal-length lens applicable to the focal-length adjusting unit of the present invention.

In FIG. 55, the transparent electrode 600 is divided into hexagons so that, for the same reason as in the above description, three boundaries of the electrodes are converged.

It is advantageous for correction for aberration that individual divided electrodes 600A, 600B, 600C, ... in FIGS. 54 and 55 have almost the same area. Thus, it is desirable that an area ratio of an electrode with the largest area to an electrode with the smallest area, of the divided electrodes, is set within 100:1.

Figure 56:
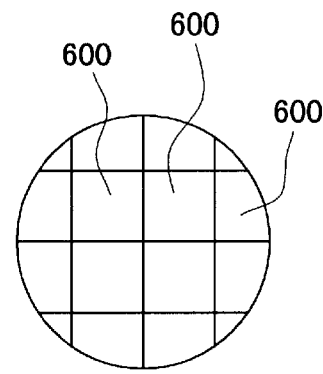
FIG. 56 is an explanatory view showing a further example of division of a transparent electrode used in the variable focal-length lens applicable to the focal-length adjusting unit of the present invention.

The divided electrodes, as in FIGS. 53–55, are arrayed so that the central electrode 600A is surrounded by others. In a circular lens, this is particularly advantageous for correction for aberration. The boundaries of the transparent electrodes which are converged may be set so that mutual angles are larger than 90°. Also, as shown in FIG. 56, the electrode may be divided into lattice-like segments. Such a division pattern has the merit that fabrication is easy.

In order to completely correct aberration or the shake of the optical system, it is desirable that the number of divided electrodes is as large as possible. At least 7 divided electrodes are required to correct second-order aberration; at least 9 divided electrodes to correct third-order aberration; at least 13 divided electrodes to correct fourth-order aberration; at least 16 divided electrodes to correct fifth-order aberration; and at least 25 divided electrodes to correct seventh-order aberration. Also, the second-order aberration refers to components in the x and y directions of tilt, astigmatism, and coma. However, if at least 3 divided electrodes are available for a lowcost product, considerable aberration or a sharp shape can be corrected.

The focal-length adjusting unit of the present invention is applicable to an electronic camera, such as a digital camera, camcorder, or TV camera, a general imaging apparatus, and a general optical apparatus. Each of the embodiments of the present invention cites the example where it is applied to the electronic camera, but, of course, is applicable to a conventional camera in which the object image is exposed on a silver halide film.

Finally, the definitions of terms employed in the present invention will be explained below.

An optical apparatus used in the present invention refers to an apparatus including an optical system or optical elements. The optical apparatus need not necessarily function by itself. That is, it may be thought of as a part of an apparatus.

The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a portable phone.

The illumination device includes, for example, a stroboscopic lamp for cameras, a headlight for cars, a light source for endoscopes, or a light source for microscopes.

The signal processing device refers to, for example, a potable phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface can be defined as follows: Any surface is satisfactory which has a shape such as aspherical, planar, or rotational symmetrical aspherical surface; a spherical, planar, or rotational symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, such a surface is generally referred as to an extended surface.

The variable optical-property element includes a variable focal-length lens, a deformable mirror, a deflection prism in which a surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a portable phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

What is claimed is:

1. An optical device comprising:
   a distance-measuring unit that comprises a distance-measuring sensor and a distance-measuring circuit and detects an amount of defocus to an object;
   at least two optical elements that are located in an optical path for distance measurement and introduce incident light from the object into an image sensor or the distance-measuring sensor, at least one of the optical elements being a variable optical-property element that is capable of changing a deflection of light in accordance with an applied voltage or an applied current, another at least one of the optical elements being an optical element that is disposed between the variable optical-property element and the image sensor or the distance-measuring sensor; and
   a voltage applying means or a current applying means that applies a voltage or a current in accordance with a distance-measuring output of the distance-measuring unit, to change an imaging performance of the variable optical-property element,
   wherein preceding a distance measurement made by the distance-measuring unit, a light-deflecting function of the variable optical-property element being set to a predetermined value.

2. An optical device comprising:
   a distance-measuring unit that comprises a distance-measuring sensor and a distance-measuring circuit and detects an amount of defocus to an object;
   at least two optical elements that are located in an optical path for distance measurement and deflect incident light from the object to introduce the light into an image sensor or the distance-measuring sensor, at least one of the optical elements being a variable mirror that is capable of changing a light-deflecting function of a reflecting surface thereof in accordance with an applied voltage or an applied current, another at least one of the optical elements being a mirror that is disposed between the variable mirror and the image sensor or the distance-measuring sensor; and
   a voltage applying means or a current applying means that applies a voltage or a current in accordance with a distance-measuring output of the distance-measuring unit, to change the light-deflecting function of the reflecting surface of the variable mirror,
   wherein preceding a distance measurement made by the distance-measuring unit the reflecting surface of the variable mirror being set to have a predetermined light-deflecting function.

3. An optical device comprising:
   a distance-measuring unit, that comprises a distance-measuring sensor and a distance-measuring circuit and detects an amount of defocus to an object;
   at least two optical elements that are located in an optical path for distance measurement and introduce incident light from the object into an image sensor or the distance-measuring sensor, at least one of the optical elements being a variable focal-length lens that is capable of changing a refraction of light in accordance with an applied voltage or an applied current, another at least one of the optical elements being an optical element that is disposed between the variable focal-length lens and the image sensor or the distance-measuring sensor; and
   a voltage applying means or a current applying means that applies a voltage or a current in accordance with a distance-measuring output of the distance-measuring unit, to change the refraction of light by the variable focal-length lens,
   wherein preceding a distance measurement made by the distance-measuring unit, a refracting function of the variable focal-length lens being set to a predetermined value.

4. An optical device comprising:
   a distance-measuring unit that comprises a distance-measuring sensor and a distance-measuring circuit and detects an amount of defocus to an object;
   at least two optical elements that are located in an optical path of a photographing optical system and deflect incident light from the object to introduce the light into an image sensor or the distance-measuring sensor, at least one of the optical elements being a variable mirror that is capable of changing a light-deflecting function of a reflecting surface thereof in accordance with an applied voltage or an applied current, another at least one of the optical elements being a mirror that is disposed between the variable mirror and the image sensor or the distance-measuring sensor; and
   a voltage applying means or a current applying means that applies a voltage or a current in accordance with a distance-measuring output of the distance-measuring unit, to change the light-deflecting function of the reflecting surface of the variable mirror, wherein preceding a distance measurement made by the distance-measuring unit, the reflecting surface of the variable mirror being set to have a predetermined light-deflecting function.

5. An optical device according to claim 2 or 4, further comprising a memory for setting the variable mirror to have a predetermined shape.

6. An optical device according to claim 2 or 4, wherein the optical device is configured for a single-lens reflex camera of exchangeable lens type.

7. An optical device according to claim 2 or 4, wherein the variable mirror is used in a body of a single-lens reflex camera of exchangeable lens type.

8. An optical device according to claim 3, further comprising a memory for imparting a predetermined refracting power to the variable focal-length lens.

9. An optical device according to claim 3, wherein the optical device is configured for a single-lens reflex camera of exchangeable lens type.

10. An optical device according to claim 3, wherein the variable focal-length lens is used in a body of a single-lens reflex camera of exchangeable lens type.

11. An optical device in which at least two optical elements that refract or reflect a light beam from an object are located in an optical path of a photographing optical system so that the light beam from the object passing the photographing optical system is imaged on an image sensor, at least one of the optical elements being constructed as a variable optical-property element that changes a direction of deflection of a ray of light in accordance with an applied voltage or current and another at least one of the optical elements being configured as an optical element that is disposed between the variable optical-property element and the image sensor so that a focal length of the photographing optical system is adjusted by a change of the direction of deflection of the ray of light by the variable optical-property element, wherein a memory means that stores at least one of an infinite position adjusting value and an inclination adjusting value for the variable optical-property element is provided and an amount of focal-length adjustment of the photographing optical system is corrected by the adjusting value stored in the memory means when the focal length of the photographing optical system is adjusted.

12. An optical device in which at least two optical elements that deflect a light beam from an object are located in an optical path of a photographing optical system so that the light beam from the object passing the photographing optical system is imaged on an image sensor, at least one of the optical elements being constructed as a variable mirror that changes a light-deflecting function of a reflecting surface thereof in accordance with an applied voltage or current and another at least one of the optical elements being configured as a mirror that is disposed between the variable mirror and the image sensor so that a focal length of the photographing optical system is adjusted by a change in the light-deflecting function of the reflecting surface of the variable mirror, wherein a memory means that stores at least one of an infinite position adjusting value and an inclination adjusting value for the variable mirror is provided and an amount of focal-length adjustment of the photographing optical system is corrected by the adjusting value stored in the memory means when the focal length of the photographing optical system is adjusted.

13. An optical device in which a plurality of optical elements that deflect a light beam from an object a plurality of times are located in an optical path of a photographing optical system so that the light beam from the object passing the photographing optical system is imaged on an image sensor, at least one of the optical elements being constructed as a variable mirror that changes a light-deflecting function of a reflecting surface thereof in accordance with an applied voltage and another at least one of the optical elements being configured as a mirror that is disposed between the variable mirror and the image sensor so that a focal length of the photographing optical system is adjusted by a change in the light-deflecting function of the reflecting surface of the variable mirror, wherein a memory means that stores at least one of an infinite position adjusting value and an inclination adjusting value for the variable mirror is provided and an amount of focal-length adjustment of the photographing optical system is corrected by adjusting value stored in the memory means when the focal length of the photographing optical system is adjusted.

14. An optical device in which at least two optical elements that refract a light beam from an object are located in an optical path of a photographing optical system so that the light beam from the object passing the photographing optical system is imaged on an image sensor, at least one of the optical elements being constructed as a variable focal-length lens that changes a refracting power thereof in accordance with an applied voltage or current and another at least one of the optical elements being configured as an optical element that is disposed between the variable focal-length lens and the image sensor so that a focal length of the photographing optical system is adjusted by a change in the refracting power of the variable focal-length lens, wherein a memory means that stores at least one of an infinite position adjusting value and an inclination adjusting value for the variable focal-length lens is provided and an amount of focal-length adjustment of the photographing optical system is corrected by the adjusting value stored in the memory means when the focal length of the photographing optical system is adjusted.

15. An optical device according to any one of claims 11–14, wherein the optical device is configured for a single-lens reflex camera.

16. An optical device according to any one of claims 11–14, wherein the optical device is configured for a single-lens reflex camera of exchangeable lens type.

17. An optical device comprising:

a distance-measuring unit that detects an amount of defocus to an object by using a light beam from the object passing a photographing lens upon the light beam from the object passing the photographing lens being introduced to be imaged on an image-pickup medium;

a plurality of mirrors that are located in an optical path of the photographing lens and reflect incident light from the object a plurality of times to introduce the light into the image-pickup medium, at least one of the plurality of mirrors being constructed as a variable mirror that is capable of changing a light-deflecting function of a reflecting surface thereof in accordance with an applied voltage or an applied current, another at least one of the plurality of mirrors being configured as a mirror that is disposed between the variable mirror and the image-pickup medium; and a voltage applying means or a current applying means that applies a voltage or a current in accordance with a distance-measuring output of the distance-measuring unit, wherein preceding a distance measurement made by the distance-measuring unit, the reflecting surface of the variable mirror being set to have a predetermined light-deflecting function.

18. An optical device in which a plurality of mirrors that reflect, when a light beam from an object passing a photographing lens is introduced to be imaged on an image-pickup medium, the light beam from the object a plurality of times are located in an optical path of the photographing lens, at least one of the mirrors being constructed as a variable mirror that changes a light-deflecting function of a reflecting surface thereof in accordance with an applied voltage or an applied current and another at least one of the mirrors being configured as a mirror that is disposed between the variable mirror and the image-pickup medium so that a focal length of the photographing lens is adjusted by a change in the light-deflecting function of the reflecting surface of the variable mirror, wherein a memory means that stores at least one of an infinite position adjusting value and an inclination adjusting value for the variable mirror is provided and an amount of focal-length adjustment of the photographing lens is corrected by the adjusting value stored in the memory means when the focal length of the photographing lens is adjusted.

19. An optical device comprising:

a distance-measuring unit that comprises a distance-measuring sensor and a distance-measuring circuit and detects an amount of defocus to an object;

at least two optical elements that are located in an optical path for distance measurement and introduce incident light from the object into an image sensor or the distance-measuring sensor, at least one of the optical elements being a variable optical-property element that is capable of changing a diffraction of light in accordance with an applied voltage or an applied current, another at least one of the optical elements being an optical element that is disposed between the image sensor or the distance-measuring sensor and the variable optical-property element and refracts or reflects the incident light; and a voltage applying means or a current applying means that applies a voltage or a current in accordance with a distance-measuring output of the distance-measuring unit, to change a diffracting power of the variable optical-property element, wherein preceding a distance measurement made by the distance-measuring unit, a diffracting function of the variable optical-property element being set to a predetermined value.

20. An optical device according to claim 19, further comprising a memory for setting the variable optical-property element to have a predetermined shape.

21. An optical device according to claim 19, wherein the optical device is configured for a single-lens reflex camera of exchangeable lens type.

22. An optical device according to claim 1, wherein the variable optical-property element is used in a body of a single-lens reflex camera of exchangeable lens type.

23. An optical device in which at least two optical elements that introduce by refraction or reflection a light beam from an object passing an optical system are located in an optical path of the optical system so that the light beam from the object is imaged on an image-pickup medium, at least one of the optical elements being constructed as a variable optical-property element that changes a direction of deflection of a ray of light in accordance with an applied voltage or current and another at least one of the optical elements being disposed between the variable optical-property element and the image-pickup medium so that a focal length of the optical system is adjusted by a change of the direction of deflection of the ray of light by the variable optical-property element, wherein a memory means that stores at least one of an infinite position adjusting value and an inclination adjusting value for the variable optical-property element is provided and an amount of focal-length adjustment of the optical system is corrected by the adjusting value stored in the memory means when the focal length of the optical system is adjusted.

24. An optical device comprising:

a distance-measuring unit that comprises a light-receiving element and a distance-measuring circuit and detects an amount of defocus to an object;

at least two optical elements that are located in an optical path for distance measurement and deflect incident light from the object to introduce the light into the light-receiving element, at least one of the optical elements being a variable optical-property element that is capable of changing a deflection of light in accordance with an applied voltage or an applied currents, another at least one of the optical elements being an optical element that is disposed between the variable optical-property element and the light-receiving element; and a voltage applying means or a current applying means that applies a voltage or a current in accordance with a distance-measuring output of the distance-measuring unit, to change an imaging performance of the variable optical-property element, wherein preceding a distance measurement made by the distance-measuring unit, a light-deflecting function of the variable optical-property element being set to a predetermined value.

25. An optical device comprising:

a distance-measuring unit that comprises a light-receiving element and a distance-measuring circuit and detects an amount of defocus to an object;

at least two optical elements that are located in an optical path of a photographing optical system and deflect incident light from the object to introduce the light into the light-receiving element, at least one of the optical elements being a variable optical-property element that is capable of changing a deflection of light in accordance with an applied voltage or an applied current, another at least one of the optical elements being an optical element that is disposed between the variable optical-property element and the light-receiving element; and a voltage applying means or a current applying means that applies a voltage or a current in accordance with a distance-measuring output of the distance-measuring unit, to change an imaging performance of the variable optical-property element, wherein preceding a distance measurement made by the distance-measuring unit, a light-deflecting function of the variable optical-property element being set to a predetermined value.

26. An optical device provided with a control arrangement to perform focus adjustment using a light beam from an object passing a photographing optical system upon locating in the photographing optical system a variable optical-property element that is capable of changing an imaging performance of the photographing optical system and then to perform photographing, the control arrangement being capable of carrying out the following:
- a process of imaging the light beam from the object on an image sensor by the photographing optical system under a condition where an imaging performance of the variable optical-property element in the photographing optical system is initialized;
- a distance-measurement-and-calculation process of performing a distance measurement and calculation on a basis of an image signal obtained by the image sensor and detecting an amount of defocus caused by the photographing optical system;
- a focus-adjustment process of applying a voltage or a current to an electrode of the variable optical-property element on a basis of the detected amount of defocus, to change the imaging performance of the variable optical-property element so that an amount of defocus caused by the photographing optical system in photographing becomes zero; and
- a process of performing photographing by introducing the light beam from the object onto the image sensor using the photographing optical system with the imaging performance of the variable optical-property element being changed in the focus-adjustment process.

27. An optical device in which at least two optical elements that refract or reflect a light beam from an object are located in an optical path of an optical system, at least one of the optical elements being configured, for changing a direction of deflection of a ray of light in accordance with an applied voltage or current, to form an optical unit as being mounted on a movable electrode of a plate spring actuator that has the movable electrode, which is displaceable, and a fixed electrode, which is fixed in reference to the movable electrode, so that a focal length of the optical system is adjusted by a change of the direction of deflection of the ray of light caused by a displacement of the optical element mounted on the movable electrode following a displacement of the movable electrode in accordance with the applied voltage or current,
- wherein a memory means that stores at least one of an infinite position adjusting value and an inclination adjusting value for the optical unit is provided and an amount of focal-length adjustment of the optical system is corrected by the adjusting value stored in the memory means when the focal length of the optical system is adjusted.

28. An optical device comprising:
- a distance-measuring unit that comprises a light-receiving element and a distance-measuring circuit and detects an amount of defocus to an object;
- at least two optical elements that are located in an optical path for distance measurement and deflect incident light from the object to introduce the light into the light-receiving element;
- an optical unit having a plate spring actuator that has a movable electrode, which is displaceable, and a fixed electrode, which is fixed in reference to the movable electrode, at least one of the optical elements being mounted on the movable electrode, the optical unit being capable of displacing the movable electrode and the optical element mounted thereon in accordance with an applied voltage or an applied current, to change a deflection of light; and
- a voltage applying means or a current applying means that applies a voltage or a current to the optical unit, to displace the optical element mounted on the movable electrode in accordance with a distance-measuring output of the distance-measuring unit,
- wherein preceding a distance measurement made by the distance-measuring unit, a light-deflecting function of the optical unit being set to a predetermined value.

29. An optical device according to any one of claims 1, 2, 3, 4, 11, 12, 13, 14, 17, 18, 19, 23, 24, 25, 27 or 28, wherein a mode of detecting a focus by forming an image of the object photographed by a photographing optical system on an image sensor and changing a focal length of a deformable mirror or a variable focal-length lens until a high-frequency component of the image of the object is maximized is applied to a distance-measuring process, a focal-length adjusting process, or a focal-length detecting process.

30. An optical device according to any one of claims 1, 2, 3, 4, 11, 12, 13, 14, 17, 18, 19, 23, 24 or 25, wherein a variable optical-property element driven by any of an electrostatic force, electromagnetic force, piezoelectric effect, electrostriction, and fluid is used.

31. An optical device according to any one of claims 1, 2, 3, 4, 11, 12, 13, 17, 18, 19, 23, 24 or 25, wherein a deformable mirror that has a deformable reflecting film fabricated by using an organic substance is provided.

32. An optical device according to any one of claims 1, 3, 11, 14, 19, 24 or 25, wherein the optical element that is disposed between the variable optical-property element and the sensor is a plane parallel plate.

33. An optical device according to any one of claims 1, 11, 19, 23, 24 or 25, wherein the variable optical-property element is a deformable mirror.

34. An optical device according to claim 1 or 24, wherein the optical device further comprises a light source for distance measurement and projects light from the light source on the object for distance measurement.

35. An optical device comprising:
- a distance-measuring unit that comprises a distance-measuring circuit and detects an amount of defocus to an object using incident light from the object passing a photographing optical system;
- at least two optical elements that are located, for photographing, in an optical path of the photographing optical system and deflect and then image on an image sensor a light beam from the object, at least one of the optical elements being constructed as a variable optical-property element that is capable of changing a deflection of the light beam from the object in accordance with a change in shape or refractive index thereof and leaves the light beam from the object, which passes the photographing optical system for photographing, to be free from separation by position passed by rays in the light beam; and
- a supply means that supplies what is selected among a group including a voltage, a current and fluid via which an imaging performance of the variable optical-property element is changed, to change a shape or a refractive index of the variable optical-property element in accordance with a distance-measuring output of the distance-measuring unit so that the amount of defocus approaches zero,
- preceding a distance measurement made by the distance-measuring unit, a light-deflecting function of the variable optical-property element being set to a predetermined value.

36. An optical device comprising:
- a distance-measuring unit that comprises a distance-measuring circuit and detects an amount of defocus to an object using incident light from the object passing a photographing optical system;
- at least two optical elements that are disposed, for photographing, in an optical path of the photographing optical system and deflect and then image on an image sensor a light beam from the object, at least one of the optical elements being constructed as a variable optical-property element that is capable of changing a deflection of the light beam from the object in accordance with an applied voltage or an applied current and leaves the light beam from the object, which passes the photographing optical system for photographing, to be free from separation by position passed by rays in the light beam; and
- a voltage applying means or a current applying means that applies a voltage or a current to each electrode of the variable optical-property element, to change an imaging performance of the variable optical-property element in accordance with a distance-measuring output of the distance-measuring unit so that the amount of defocus approaches zero,
- wherein preceding a distance measurement made by the distance-measuring unit, a light-deflecting function of the variable optical-property element being set to a predetermined value.

37. An optical device according to claim 35 or 36, wherein the variable optical-property element is a deformable mirror that is capable of changing a shape of a reflecting surface thereof, to deflect the light beam from the object.

38. An optical device according to claim 35 or 36, wherein the variable optical-property element is a variable focal-length mirror that is capable of changing a refraction of light, to deflect the light beam from the object.

39. An optical device according to claim 35 or 36, wherein the variable optical-property element is a variable focal-length lens that is capable of changing a refraction of light, to deflect the light beam from the object.

40. An optical device according to claim 35 or 36, wherein the variable optical-property element is a variable focal-length lens that is capable of changing a shape of a lens surface thereof which the light beam from the object passes, to deflect the light beam from the object.

41. An optical device according to claim 35 or 36, wherein the variable optical-property element is a variable optical-property element that is capable of changing a diffraction of light, to deflect the light beam from the object.

42. An optical device according to claim 35 or 36, wherein the variable optical-property element is a variable deflection-angle prism that is capable of changing a deflection angle of light, to deflect the light beam from the object.

43. An optical device according to claim 35 or 36, wherein a transparent substrate formed as a plane parallel plate is disposed between the variable optical-property element and the image sensor.

44. An optical device according to claim 35 or 36, wherein a plane parallel plate is disposed between the variable optical-property element and the image sensor.

45. An optical device according to claim 35 or 36, wherein another optical element is disposed between the variable optical-property element, which constitutes at least one of the at least two optical elements imaging the light beam from the object on the image sensor, and the image sensor.

46. An optical device according to claim 35 or 36, wherein another optical element is disposed between the variable optical-property element, which constitutes at least one of the at least two optical elements imaging the light beam from the object on the image sensor, and a light-receiving surface of the image sensor.

47. An optical device according to claim 46, wherein the optical element disposed between the variable optical-property element and the light-receiving surface of the image sensor is a plane parallel plate that transmits the light beam from the object.

48. An optical device according to claim 35 or 36, wherein setting of the light-deflecting function of the variable optical-property element to the predetermined value preceding the distance measurement made by the distance-measuring unit is based on an adjusting value stored in the memory means, which stores at least one of an infinite position adjusting value and an inclination adjusting value for the variable optical-property element.

49. An optical device according to claim 36, wherein a change of the imaging performance of the variable optical-property element, which is caused by a voltage or a current applied to each electrode of the variable optical-property element, is performed as a focal length adjustment based on an adjusting value stored in the memory means, which stores at least one of an infinite position adjusting value and an inclination adjusting value for the variable optical-property element.

50. An optical device comprising:
- a distance-measuring unit that comprises a distance-measuring circuit and detects an amount of defocus to an object using incident light from the object passing an optical system;
- at least two optical elements that are located in an optical path of the optical system and deflect and then image on a light-receiving element a light beam from the object, at least one of the optical elements being constructed as a variable optical-property element that is capable of changing a deflection of the light beam from the object in accordance with an applied voltage or an applied current and leaves the light beam from the object, which passes the optical system, to be free from separation by position passed by rays in the light beam; and
- a voltage applying means or a current applying means that applies a voltage or a current to each electrode of the variable optical-property element, to change an imaging performance of the variable optical-property element in accordance with a distance-measuring output of the distance-measuring unit so that the amount of defocus becomes zero,
- preceding a distance measurement made by the distance-measuring unit, a light-deflecting function of the variable optical-property element being set to a predetermined value.

51. An optical device according to claim 50, wherein another optical element is disposed between the variable optical-property element, which constitutes at least one of the at least two optical elements, and the light-receiving element.

52. An optical device according to claim 50, wherein another optical element is disposed between the variable optical-property element, which constitutes at least one of the at least two optical elements, and a light-receiving surface of the light-receiving element.

53. An optical device according to claim 52, wherein the optical element disposed between the variable optical-property element and the light-receiving surface of the light-receiving element is a plane parallel plate that transmits the light beam from the object.

54. An optical device comprising:
   at least two optical elements that are located, for photographing, in an optical path of a photographing optical system and refract or reflect a light beam from an object, at least one of the optical elements being constructed as a variable optical-property element that is capable of changing a direction of deflection of a ray of light from the object in accordance with a change in shape or refractive index thereof and leaves the light beam from the object, which passes the photographing optical system for photographing, to be free from separation by position passed by rays in the light beam; and
   a memory means that stores at least one of an infinite position adjusting value and an inclination adjusting value for the variable optical-property element,
   wherein focus adjustment of the photographing optical system is performed by changing a shape or a refractive index of the variable optical-property element on a basis of each adjusting value stored in the memory means in the focus adjustment of the photographing optical system, to change the direction of deflection of a ray of light from the object.

55. An optical device in which at least two optical elements that refract or reflect a light beam from an object are located, for photographing, in an optical path of a photographing optical system, at least one of the optical elements being constructed as a variable optical-property element that is capable of changing a direction of deflection of a ray of light from the object in accordance with an applied voltage or current and leaves the light beam from the object, which passes the photographing optical system for photographing, to be free from separation by position passed by rays in the light beam, focus adjustment of the photographing optical system being made by a change of the direction of deflection of a ray of light by the variable optical-property element,
   wherein a memory means that stores at least one of an infinite position adjusting value and an inclination adjusting value for the variable optical-property element is provided and the direction of deflection of a ray of light is changed via the variable optical-property element on a basis of each adjusting value stored in the memory means in the focus adjustment of the photographing optical system, to correct an amount of the focus adjustment of the photographing optical system.

56. An optical device comprising:
   at least two optical elements that are located in an optical path of an optical system and refract or reflect a light beam from an object, at least one of the optical elements being constructed as a variable optical-property element that is capable of changing a direction of deflection of a ray of light from the object in accordance with a change in shape or refractive index thereof and leaves the light beam from the object, which passes the optical system, to be free from separation by position passed by rays in the light beam; and
   a memory means that stores at least one of an infinite position adjusting value and an inclination adjusting value for the variable optical-property element,
   wherein focal-length adjustment of the photographing optical system is performed by changing a shape or a refractive index of the variable optical-property element on a basis of each adjusting value stored in the memory means in the focal-length adjustment of the photographing optical system, to change the direction of deflection of a ray of light from the object.

57. An optical device comprising:
   at least two optical elements that are located in an optical path of an optical system and refract or reflect a light beam from an object, at least one of the optical elements being constructed as a variable optical-property element that is capable of changing a direction of deflection of a ray of light from the object in accordance with an applied voltage or current and leaves the light beam from the object, which passes the optical system, to be free from separation by position passed by rays in the light beam; and
   a memory means that stores at least one of an infinite position adjusting value and an inclination adjusting value for the variable optical-property element,
   wherein focal-length adjustment of the photographing optical system is performed by changing the direction of deflection of the variable optical-property element on a basis of each adjusting value stored in the memory means in the focal-length adjustment of the photographing optical system, to change the direction of deflection of a ray of light from the object.

58. An optical device according to any one of claims 54–57, wherein the variable optical-property element is selected among a group including a deformable mirror that is capable of changing a shape of a reflecting surface thereof, a variable focal-length mirror that is capable of changing a refraction of light, a variable focal-length lens that is capable of changing a refraction of light, a variable focal-length lens that is capable of changing a shape of a lens surface thereof transmitting the light beam, a variable optical-property element that is capable of changing a diffraction of light, and a variable deflection-angle prism that is capable of changing a deflection angle of light.

59. An optical device according to any one of claims 54–57, further comprising a light-receiving element on which the light beam from the object passing the optical system, in which the at least two optical elements are located, is imaged, focal-length adjustment being made upon detecting, on a basis of an image signal obtained by the light-receiving element, a state where a high-frequency component is substantially maximized.

60. An optical device according to claim 59, wherein another optical element is disposed between the variable optical-property element that constitutes at least one of the at least two optical elements, which form an image on the light-receiving surface, and the light receiving surface.

61. An optical device according to claim 59, wherein another optical element is disposed between the variable optical-property element that constitutes at least one of the at least two optical elements, which form an image on the light-receiving surface, and a light-receiving surface of the light receiving surface.

62. An optical device according to claim 61, wherein the another optical element disposed between the variable optical-property element and the light-receiving surface of the light-receiving element is a plane parallel plate that transmits the light beam from the object.

63. An optical device provided with a control arrangement to perform focus adjustment using a light beam from an object passing a photographing optical system upon locating in the photographing optical system a variable optical-property element that is capable of changing an imaging performance of the photographing optical system and then to perform photographing, the control arrangement being capable of the following:
   a process of imaging the light beam from the object on an image sensor by the photographing optical system under a condition where an imaging performance of the variable optical-property element in the photographing optical system is initialized;

a process of detecting an amount of defocus of the photographing optical system on a basis of an image signal obtained by the image sensor;

a focus-adjustment process of applying a voltage or a current to each electrode of the variable optical-property element on a basis of the detected amount of defocus, to change the imaging performance of the variable optical-property element so that an amount of defocus caused by the photographing optical system in photographing becomes zero; and a process of performing photographing by introducing the light beam from the object onto the image sensor using the photographing optical system with the imaging performance of the variable optical-property element being changed in the focus-adjustment process.

64. An optical device provided with a control arrangement to perform focus adjustment using a light beam from an object passing a photographing optical system upon locating in the photographing optical system a variable optical-property element that is capable of changing an imaging performance of the photographing optical system and then to perform photographing, the control arrangement being capable of:

a process of imaging the light beam from the object on a distance-measunng sensor by the photographing optical system under a condition where an imaging performance of the variable optical-property element in the photographing optical system is initialized;

a distance-measurement-and-calculation process of performing a distance measurement and calculation on a basis of an image signal obtained by the distance-measuring sensor and detecting an amount of defocus caused by the photographing optical system;

a focus-adjustment process of applying a voltage or a current to each electrode of the variable optical-property element on a basis of the detected amount of defocus, to change the imaging performance of the variable optical-property element so that an amount of defocus caused by the photographing optical system in photographing becomes zero; and a process of performing photographing by introducing the light beam from the object onto an image sensor using the photographing optical system with the imaging performance of the variable optical-property element being changed in the focus-adjustment process.

65. An optical-device control procedure to perform focus adjustment using a light beam from an object passing a photographing optical system upon locating in the photographing optical system a variable optical-property element that is capable of changing an imaging performance of the photographing optical system and then to perform photographing, the control procedure comprising:

a process of imaging the light beam from the object on an image sensor by the photographing optical system under a condition where an imaging performance of the variable optical-property element in the photographing optical system is initialized;

a distance-measurement-and-calculation process of performing a distance measurement and calculation on a basis of an image signal obtained by the image sensor and detecting an amount of defocus caused by the photographing optical system;

a focus-adjustment process of applying a controlled voltage or current to an electrode of the variable optical-property element on a basis of the detected amount of defocus, to change the imaging performance of the variable optical-property element so that an amount of defocus caused by the photographing optical system in photographing becomes zero; and a photographing process of performing photographing by introducing the light beam from the object onto the image sensor using the photographing optical system with the imaging performance of the variable optical-property element being changed in the focus-adjustment process.

66. An optical-device control procedure to perform focus adjustment using a light beam from an object passing a photographing optical system upon locating in the photographing optical system a variable optical-property element that is capable of changing an imaging performance of the photographing optical system and then to perform photographing, the control procedure comprising:

a process of imaging the light beam from the object on an image sensor by the photographing optical system under a condition where an imaging performance of the variable optical-property element in the photographing optical system is initialized;

a detection process of detecting an amount of defocus on a basis of an image signal obtained by the image sensor;

a focus-adjustment process of applying a controlled voltage or a current to an electrode of the variable optical-property element on a basis of the detected amount of defocus, to change the imaging performance of the variable optical-property element so that an image of the object is formed on the image sensor in photographing; and a photographing process of performing photographing by introducing the light beam from the object onto the image sensor using the photographing optical system with the imaging performance of the variable optical-property element being changed in the focus-adjustment process.

67. An optical-device control procedure to perform focus adjustment using a light beam from an object passing a photographing optical system upon locating in the photographing optical system a variable optical-property element that is capable of changing an imaging performance of the photographing optical system and then to perform photographing, the control procedure comprising:

a process of imaging the light beam from the object on a distance-measuring sensor by the photographing optical system under a condition where an imaging performance of the variable optical-property element in the photographing optical system is initialized;

a distance-measurement-and-calculation process of performing a distance measurement and calculation on a basis of an image signal obtained by the distance-measuring sensor and detecting an amount of defocus caused by the photographing optical system;

a focus-adjustment process of applying a controlled voltage or current to an electrode of the variable optical-property element on a basis of the detected amount of defocus, to change the imaging performance of the variable optical-property element so that an amount of defocus caused by the photographing optical system in photographing becomes zero; and a process of performing photographing by introducing the light beam from the object onto an image sensor using the photographing optical system with the imaging performance of the variable optical-property element being changed in the focus-adjustment process.

68. An optical device provided with a control arrangement to perform focus adjustment by imaging on an image-pickup medium a light beam from an object passing an optical system upon locating in the optical system a variable optical-property element that is capable of changing an imaging performance of the optical system, the control arrangement being capable of:

a process of imaging the light beam from the object on the image-pickup medium by the optical system under a condition where an imaging performance of the variable optical-property element in the optical system is initialized;

a detection process of detecting an amount of defocus caused by the optical system or a distance to the object on a basis of an image signal obtained by the image-pickup medium; and a focus-adjustment process of supplying at least one selected among a group including a voltage, a current and fluid on a basis of a detected value obtained in the detection process, to change the imaging performance of the variable optical-property element so that an image of the object is formed on an image sensor in photographing;

wherein the focus-adjustment procedure is completed when the light beam from the object is introduced onto the image sensor by the optical system with the imaging performance of the variable optical-property element being changed in the focus-adjustment process.

69. An optical device according to claim 26, 63, 64 or 68, further comprising a light source for distance measurement, light being projected on the object from the light source for distance measurement.

70. An optical-device control procedure according to claim 65, 66 or 67, further comprising a process of projecting light on the object from a light source for distance-measurement that is included in the optical device, to obtain the light beam from the object.

71. An optical device according to claim 26, 63, 64 or 68, wherein the imaging performance of the variable optical-property element is changed by changing a shape of the variable optical-property element via the voltage or current applied to the variable optical-property element.

72. An optical device according to claim 26, 63, 64 or 68, wherein the imaging performance of the variable optical-property element is changed by changing a refractive index of the variable optical-property element via the voltage or current applied to the variable optical-property element.

73. An optical device according to claim 26, 63, 64 or 68, wherein a process of referring, on a basis of the amount of defocus, to an adjusting value in preliminarily stored data for adjustment and a determination process of determining a voltage or a current to be applied to each electrode of the variable optical-property element on a basis of the adjusting value as referred to in the data for adjustment follow the process of detecting the amount of defocus caused by the photographing optical system, and then the voltage or current determined in the determination process is applied to each electrode of the variable optical-property element.

74. An optical device according to claim 26, 63, 64 or 68, wherein a photometry process using the light beam from the object passing the photographing optical system follows the focus-adjustment process for changing the imaging performance of the variable optical-property element.

75. An optical device according to claim 73, wherein the adjusting value is a correcting value to adjust a difference between a value of the voltage or current to be applied when the imaging performance of the variable optical-property element is initialized according to a sequence control and a value of the voltage or current applied to a driving section of the variable optical-property element when the imaging performance is adjusted via an observation optical system of the optical device.

76. An optical device according to claim 26, 63, 64 or 68, wherein the optical device is provided with a release button, and when the release button is half-pushed, the light beam from the object is imaged under the condition where the imaging performance of the variable optical-property element is initialized, and the focus-adjustment process of changing the imaging performance of the variable optical-property element is completed before the release button is fully pushed.

77. An optical-device control process according to claim 65, 66 or 67, wherein the optical device is provided with a release button, and when the release button is half-pushed, the light beam from the object is imaged under the condition where the imaging performance of the variable optical-property element is initialized, and the focus-adjustment process of changing the imaging performance of the variable optical-property element is completed before the release button is fully pushed.

* * * * *